(12) United States Patent
Kim et al.

(10) Patent No.: US 10,611,336 B2
(45) Date of Patent: *Apr. 7, 2020

(54) METHOD AND DEVICE FOR SHARING FUNCTIONS OF SMART KEY

(71) Applicant: SAMSUNG ELECTRONICS CO., LTD., Suwon-si (KR)

(72) Inventors: Young-jae Kim, Seoul (KR); Myung-jin Eom, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,595

(22) Filed: Feb. 18, 2018

(65) Prior Publication Data

US 2018/0170308 A1 Jun. 21, 2018

Related U.S. Application Data

(63) Continuation of application No. 14/658,875, filed on Mar. 16, 2015, now Pat. No. 9,896,061.

(30) Foreign Application Priority Data

| Mar. 15, 2014 | (KR) | ......................... 10-2014-0030662 |
| Jul. 31, 2014 | (KR) | ......................... 10-2014-0098479 |
| Jan. 7, 2015 | (KR) | ......................... 10-2015-0002022 |

(51) Int. Cl.
*G07C 9/00* (2020.01)
*B60R 25/00* (2013.01)
*B60R 25/24* (2013.01)

(52) U.S. Cl.
CPC .............. *B60R 25/00* (2013.01); *B60R 25/24* (2013.01); *G07C 9/00309* (2013.01);
(Continued)

(58) Field of Classification Search
CPC ... B60R 25/00; B60R 25/24; B60R 2325/205; G07C 9/00309; G07C 2009/00753;
(Continued)

(56) References Cited

U.S. PATENT DOCUMENTS

| 6,449,651 | B1 | 9/2002 | Dorfman |
| 7,490,045 | B1 * | 2/2009 | Flores .................... G06Q 10/10 |
| | | | 702/62 |

(Continued)

FOREIGN PATENT DOCUMENTS

| KR | 1020100021818 A | 2/2010 |
| KR | 1020120012887 A | 2/2012 |

(Continued)

OTHER PUBLICATIONS

Communication dated Jun. 9, 2015, issued by the International Searching Authority in counterpart International Application No. PCT/KR2015/002499.

*Primary Examiner* — Yong Hang Jiang
(74) *Attorney, Agent, or Firm* — Sughrue Mion, PLLC

(57) ABSTRACT

A device for providing information about a smart key for use in vehicles includes a communicator which receives information about at least one function, performed by the smart key, of controlling a vehicle; and a controller which sets a usage restriction for the at least one function. The communicator may provide information about the at least one function including the usage restriction to an external device.

18 Claims, 49 Drawing Sheets

(52) U.S. Cl.
CPC .............. *B60R 2325/205* (2013.01); *G07C 2009/00865* (2013.01); *G07C 2209/04* (2013.01)

(58) Field of Classification Search
CPC ...... G07C 2009/00865; G07C 2209/04; G07C 9/00174
USPC .......................................................... 340/5.6
See application file for complete search history.

(56) References Cited

U.S. PATENT DOCUMENTS

| | | | | |
|---|---|---|---|---|
| 8,547,213 | B2* | 10/2013 | Ota | G08C 17/00 340/426.13 |
| 9,026,785 | B2 | 5/2015 | Ha et al. | |
| 2003/0144828 | A1 | 7/2003 | Lin | |
| 2004/0039911 | A1* | 2/2004 | Oka | G06F 21/10 713/175 |
| 2006/0095347 | A1* | 5/2006 | Melucci | G06Q 10/087 705/28 |
| 2008/0126929 | A1* | 5/2008 | Bykov | G06F 9/451 715/700 |
| 2010/0042847 | A1 | 2/2010 | Jung et al. | |
| 2012/0159152 | A1* | 6/2012 | Ha | H04L 63/06 713/155 |
| 2012/0280791 | A1 | 11/2012 | Kim | |
| 2012/0289254 | A1 | 11/2012 | Dishneau | |
| 2012/0331162 | A1 | 12/2012 | Jung et al. | |
| 2013/0124006 | A1 | 5/2013 | Anantha et al. | |

FOREIGN PATENT DOCUMENTS

| | | |
|---|---|---|
| KR | 1020120070373 A | 6/2012 |
| KR | 1020130006950 A | 1/2013 |
| KR | 20130131151 A * | 12/2013 |

* cited by examiner

METHOD AND DEVICE FOR SHARING FUNCTIONS OF SMART KEY

CROSS-REFERENCE TO RELATED APPLICATIONS

This application is a continuation application of U.S. patent application Ser. No. 14/658,875, filed on Mar. 16, 2015, which claims priority from Korean Patent Application No. 10-2014-0030662, filed on Mar. 15, 2014 in the Korean Intellectual Property Office (KIPO), Korean Patent Application No. 10-2014-0098479, filed on Jul. 31, 2014 in the KIPO, and Korean Patent Application No. 10-2015-0002022, filed on Jan. 7, 2015 in the KIPO, the disclosures of which are incorporated herein in their entireties by reference.

BACKGROUND

1. Field

Apparatuses and methods consistent with exemplary embodiments relate to sharing functions of a smart key.

2. Description of the Related Art

With developments in data communication technology, smart keys capable of controlling an operation of a to-be-controlled device by using a signal, without physical contact, have come into widespread use. In the case of emergency situations, such as loss of a smart key, the demand for a technique capable of copying functions of a smart key to another device is increasing.

However, when functions of a smart key are copied to another device capable of controlling an operation of the to-be-controlled device, a user other than the user of the smart key may inadvertently control the to-be-controlled device.

Accordingly, a method of setting restrictions on the usage of a function of a smart key in order to prevent a user of a duplicate smart key from accessing functions of the original smart key is in demand.

SUMMARY

Aspects of one or more exemplary embodiments provide a method and device for sharing functions of a smart key. Aspects of one or more exemplary embodiments also provide a non-transitory computer-readable recording medium having recorded thereon a computer program, which, when executed by a computer, performs the method. Additional aspects will be set forth in part in the description which follows and, in part, will be apparent from the description, or may be learned by practice of exemplary embodiments.

According to an aspect of an exemplary embodiment, there is provided a device for providing information about a smart key, the device including: a communicator configured to receive information about at least one function, performed by the smart key, for controlling a vehicle; and a controller configured to set a usage restriction for the at least one function, wherein the communicator is configured to provide, to an external device, information about the at least one function including the set usage restriction.

The controller may be configured to set the usage restriction for the at least one function according to a user input received via a user input unit, and to add the set usage restriction to the received information about the at least one function.

The communicator may be configured to receive, from the external device, a usage history of the at least one function, when the external device attempts to use the at least one function based on the provided information about the at least one function.

The device may further include an output unit configured to output the received usage history on a screen of the device.

The communicator may be configured to receive, from the external device, a request to change the set usage restriction; and the controller may be configured to determine, according to a user input received via a user input unit, whether to accept the received request to change the set usage restriction.

The device may further include a storage configured to store the changed usage restriction when the controller accepts the received request to change the set usage restriction.

The usage restriction may include at least one of: a first condition that specifies a time period during which the external device is allowed to use the at least one function; a second condition that specifies a distance between the smart key and the external device within which the external device is allowed to use the at least one function; a third condition that specifies one or more users who are allowed to use the at least one function; a fourth condition that specifies a type of the at least one function that the external device is allowed to use; and a fifth condition that specifies a number of times that the external device is allowed to use the at least one function.

The first condition may include the time period as starting from a time point when the information about the at least one function is provided to the external device, or a preset time interval.

The second condition may include, as the specified distance, an area within a preset radius of a location of the device or an area within a preset radius of a location of the external device when the information about the at least one function is provided to the external device.

The communicator may be configured to receive the information about the at least one function from the smart key or from a portion of the smart key detachable from the smart key.

According to an aspect of another exemplary embodiment, there is provided a method of providing information about a smart key, the method including: receiving information about at least one function, performed by the smart key, for controlling a vehicle; setting a usage restriction for the at least one function; and providing, to an external device, information about the at least one function including the set usage restriction.

The setting the usage restriction may include setting the usage restriction for the at least one function according to a received user input.

The method may further include: receiving, from the external device, a usage history of the at least one function, when the external device attempts to use the at least one function based on the provided information about the at least one function.

The method may further include: outputting the received usage history on a screen of the device.

The method may further include: receiving, from the external device, a request to change the set usage restriction;

and determining according to a received user input, whether to accept the received request to change the set usage restriction.

The usage restriction may include at least one of: a first condition that specifies a time period during which the external device is allowed to use the at least one function; a second condition that specifies a distance within which the external device is allowed to use the at least one function; a third condition that specifies one or more users who are allowed to use the at least one function; a fourth condition that specifies a type of the at least one function that the external device is allowed to use; and a fifth condition that specifies a number of times that the external device is allowed to use the at least one function.

The first condition may include the time period as starting from a time point when the information about the at least one function is provided to the external device, or a preset time interval.

The second condition may include, as the specified distance, an area within a preset radius of a location of the device or an area within a preset radius of a location of the external device when the information about the at least one function is provided to the external device.

According to an aspect of another exemplary embodiment, there is provided a non-transitory computer-readable recording medium having recorded thereon a computer program, which, when executed by a computer, performs the method.

According to an aspect of another exemplary embodiment, there is provided a device for controlling a vehicle by using information about a smart key, the device including: a communicator configured to receive information about at least one function, performed by the smart key, for controlling a vehicle; and a controller configured to identify a usage restriction included in the received information about the at least one function and to control an operation of the vehicle according to the identified usage restriction.

The communicator may be configured to: receive the information about the at least one function from an external device; and to transmit, to the external device, a usage history of the at least one function when the controller attempts to use the at least one function based on the received information about the at least one function.

The communicator may be configured to: receive the information about the at least one function from an external device; and to transmit, to the external device, a request to change the set usage restriction.

The usage restriction may include at least one of: a first condition that specifies a time period during which the device is allowed to use the at least one function; a second condition that specifies a distance between the smart key and the device within which the device is allowed to use the at least one function; a third condition that specifies one or more users who are allowed to use the at least one function; a fourth condition that specifies a type of the at least one function that the device is allowed to use; and a fifth condition that specifies a number of times that the device is allowed to use the at least one function.

The first condition may include the time period as starting from a time point when the information about the at least one function is provided to the device, or a preset time interval.

The second condition may include, as the specified distance, an area within a preset radius of a location of the device or an area within a preset radius of a location of the device when the information about the at least one function is provided to the device.

According to an aspect of another exemplary embodiment, there is provided a method of controlling a vehicle by using information about a smart key, the method including: receiving information about at least one function, performed by the smart key, for controlling a vehicle; identifying a usage restriction included in the received information about the at least one function; and controlling an operation of the vehicle according to the identified usage restriction.

According to an aspect of another exemplary embodiment, there is provided a non-transitory computer-readable recording medium having recorded thereon a computer program, which, when executed by a computer, performs the method.

According to an aspect of another exemplary embodiment, there is provided a device for providing information about a control device to an external device, the device including: a communicator configured to receive information about at least one function, performed by a control device, for controlling a controlled device; and a controller configured to set a usage restriction for the at least one function, wherein the communicator is configured to provide, to an external device, information about the at least one function including the set usage restriction to allow the external device to control the controlled device.

The controller may be configured to control the controlled device according to the received information about the at least one function, without the usage restriction set for the at least one function.

The controller may be configured to set the usage restriction for the at least one function according to a user input received via a user input unit, and to add the set usage restriction to the received information about the at least one function.

The communicator may be configured to receive, from the external device, a usage history of the at least one function, when the external device attempts to use the at least one function based on the provided information about the at least one function.

The communicator may be configured to receive, from the external device, a request to change the set usage restriction; and the controller may be configured to determine, according to a user input received via a user input unit, whether to accept the received request to change the set usage restriction.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION OF EXEMPLARY EMBODIMENTS

Figure 1:
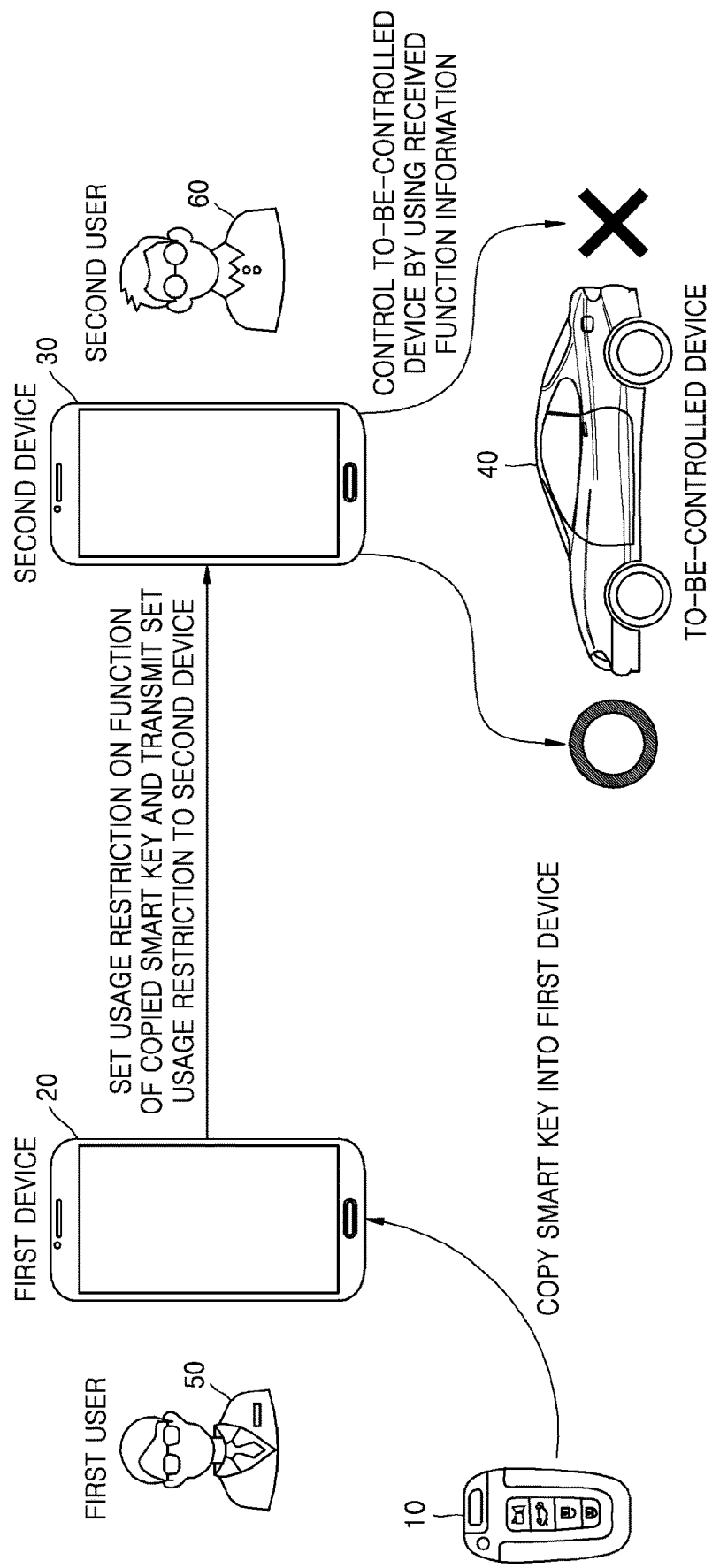
FIG. 1 is a schematic diagram for explaining an example of a method of sharing function information of a smart key, according to an exemplary embodiment.

Reference will now be made in detail to exemplary embodiments, examples of which are illustrated in the accompanying drawings, wherein like reference numerals refer to the like elements throughout. In this regard, exemplary embodiments may have different forms and should not be construed as being limited to the descriptions set forth herein. Accordingly, exemplary embodiments are merely described below, by referring to the figures, to explain aspects of the present description.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements. As used herein, the term "and/or" includes any and all combinations of one or more of the associated listed items. Expressions such as "at least one of," when preceding a list of elements, modify the entire list of elements and do not modify the individual elements of the list.

The term "gesture" denotes an action taken by a user to control a terminal. Examples of the gesture may include tap, touch & hold, double tap, drag, panning, flick, drag & drop, and hand shaking.

The term "outputting to a screen of a device" denotes displaying a specific screen image on the screen of the device. Accordingly, the phrase "outputting to a screen of a device" includes "display on the screen of the device".

Exemplary embodiments will now be described more fully with reference to the accompanying drawings.

FIG. 1 is a schematic diagram for explaining an example of a method of sharing function information of a smart key, according to an exemplary embodiment.

In FIG. 1, a smart key 10, a first device 20, a second device 30, and a to-be-controlled device 40 (e.g., controlled device) are illustrated. Referring to FIG. 1, the first device 20 is owned by a first user 50, and the second device 30 is owned by a second user 60. However, it is understood that one or more other exemplary embodiments are not limited thereto. For example, according to another exemplary embodiment, both the first device 20 and the second device 30 may be owned by the first user 50.

The first device 20 and the second device 30 may transmit or receive data via wired or wireless communications, and may be devices that include data processing units (e.g., data processors). For example, the first device 20 and the second device 30 may be smartphones, tablet personal computers (PCs), wearable devices, PCs, smart devices, cards, or tags, or the like. Examples of the first device 20 and the second device 30 will be described below with reference to FIGS. 60 and 61.

The smart key 10 denotes a device capable of controlling the to-be-controlled device 40 without physical contact or combination with the to-be-controlled device 40. For example, when the to-be-controlled device 40 is a vehicle and a typical key is used, a user controls the vehicle by inserting the typical key into a key hole included in a door of the vehicle. However, the smart key 10 may control the vehicle via wireless communication. For example, a user may press a button on the smart key 10 or input a gesture to the smart key 10, and the smart key 10 may output a signal corresponding to a user input. In response to the signal output by the smart key 10, the vehicle performs a function corresponding to the signal.

For example, the smart key 10 may control an operation of the vehicle by using a Keyless Ignition method. When a user carrying a smart key configured for a Keyless Ignition method enters a vehicle, the user may start or stop the vehicle without inserting the smart key into a key hole of the vehicle. In other words, a transponder built in the smart key enables the vehicle to recognize the user, and thus the user may start or stop the vehicle. In this case, antennas for transmitting a low frequency (LF) signal may be provided inside and outside the vehicle. For example, an antenna may be provided on a door handle of the vehicle. In the present example, the LF signal denotes a signal having a frequency of about 125 kHz. When an LF signal is transmitted from an antenna provided on the vehicle to the smart key 10 and the smart key 10 is sufficiently close to the vehicle, the smart key 10 transmits an identifier (ID) thereof to a receiver provided on the vehicle via a radio frequency (RF) signal. In the present example, the RF signal denotes a signal having a frequency of 300 MHz or greater. When it is determined that the ID of the smart key 10 transmitted to the vehicle is accurate, the vehicle is unlocked. Accordingly, the user may control an operation of the vehicle by using the smart key 10.

For example, the vehicle may include a hardware component capable of transmitting and/or receiving a signal to or from the smart key 10 and controlling an operation of the vehicle in accordance with the signal received from the smart key 10. The hardware component included in the vehicle may include a module for transmitting an LF signal, a module for receiving an RF signal, a module for encrypting and/or decrypting all related data signals, a module for transmitting and/or receiving a related interface signal to or from other electronic control units (e.g., electronic controllers) included in the vehicle, and a control module.

As another example, the smart key 10 may control an operation of the vehicle via Bluetooth. In other words, the smart key 10 may be connected to the vehicle via Bluetooth and transmit, to the vehicle, a signal for controlling an operation of the vehicle.

The first device 20 and the second device 30, which will be described in further detail below, may support the same method as the method in which the smart key 10 controls an operation of the vehicle. For example, when it is assumed that the smart key 10 controls an operation of a vehicle by using a Keyless go or Keyless Ignition method, the first device 20 and the second device 30 may also control an operation of the vehicle by using a Keyless go or Keyless Ignition method. As another example, when it is assumed that the smart key 10 transmits, via Bluetooth, a signal for controlling an operation of a vehicle, the first device 20 and the second device 30 may also transmit, to the vehicle via Bluetooth, a signal for controlling an operation of the vehicle.

An example of the to-be-controlled device 40 is not limited to a vehicle, and various devices may be used as the to-be-controlled device 40. Examples of the to-be-controlled device 40 will be described below with reference to FIGS. 2-5.

An application for transmitting or receiving information about a function of the smart key 10 that is capable of controlling an operation of the to-be-controlled device 40 may be previously provided in the first device 20 and the second device 30. In this case, via the above-described application, the first device 20 may receive the information about the function capable of controlling an operation of the to-be-controlled device 40 from the smart key 10 and may transmit the received information to the second device 30. For example, when the to-be-controlled device 40 is a vehicle, the to-be-controlled device 40 may set the content and the like of conditions (for example, a period of time during which an operation of the vehicle can be controlled) to control an operation of the vehicle, and transmit the set conditions to another device. Via the above-described application, the first device 20 and the second device 30 may receive information about the vehicle (for example, at least one of a vehicle number, a serial number of the vehicle, a vehicle type, and a color of the vehicle) from the smart key 10 and transmit the received information to other devices.

The first device 20 receives, from the smart key 10, function information about at least one function capable of controlling an operation of the to-be-controlled device 40. The function information denotes information for performing the function capable of controlling an operation of the to-be-controlled device 40. Hence, when the first device 20 receives the function information from the smart key 10, the first device 20 may control an operation of the to-be-controlled device 40. In other words, the first device 20 may copy, from the smart key 10, at least one function capable of controlling an operation of the to-be-controlled device 40, and perform the copied function.

The function information includes information for generating a signal that is transmitted by the smart key 10 to control an operation of the to-be-controlled device 40. For example, assuming that the smart key 10 outputs a signal A to open a door of the to-be-controlled device 40, the first device 20 may receive function information from the smart key 10 and then generate and output the signal A. Accordingly, the first device 20 may open the door of the to-be-controlled device 40.

A function performed by the smart key 10 denotes an operation, performed by the smart key 10, of controlling an operation of the to-be-controlled device 40. For example, assuming that the to-be-controlled device 40 is a vehicle, a function performed by the smart key 10 may denote controlling one or more of various operations of the vehicle, such as opening or closing a door of the vehicle, starting the vehicle, turning on or off the headlights, or turning on or off an audio device, a navigation device, or an audio communication device built into the vehicle.

The first device 20 may receive the function information from the smart key 10 via wired and/or wireless communications. For example, the first device 20 may receive the function information from the smart key 10 via a data cable connected to the smart key 10. Furthermore, the first device 20 may receive the function information from the smart key 10 via wireless communications such as Near Field Communication (NFC), ZigBee, Bluetooth, or ultra-wideband (UWB) communication.

Based on a predetermined hardware device separated or distinct from the smart key 10, the function information may be transmitted from the smart key 10 to the first device 20, or a user of the first device 20 (i.e., the first user 50) may control the to-be-controlled device 40 by using the predetermined hardware device.

For example, when the predetermined hardware device separated from the smart key 10 is combined with the first device 20, the first device 20 may receive the function information from the smart key 10. For example, as a memory device separated from the smart key 10 is combined with the first device 20, the first device 20 may receive the function information from the smart key 10.

As another example, the first user 50 may control the to-be-controlled device 40 by using the predetermined hardware device separated from the smart key 10. For example, the first user 50 may control the to-be-controlled device 40 by using a portion of the smart key 10. A method in which the first user 50 controls the to-be-controlled device 40 by using a portion of the smart key 10 may be the same as a method in which the smart key 10 controls the to-be-controlled device 40. For example, the first user 50 may control the to-be-controlled device 40 by depressing a button included in the portion of the smart key 10 or inputting a gesture to the portion of the smart key 10. Examples in which the first device 20 receives the function information from the smart key 10 will be described below with reference to FIGS. 8-14.

When the first device 20 has received the function information of the smart key 10, the first device 20 may control all operations of the to-be-controlled device 40 without any restriction. Alternatively, the first device 20 may control only some of the operations of the to-be-controlled device 40. In other words, the function information received by the first device 20 may include preset usage restrictions.

For example, the function information may include information about only some signals from among all signals that can be output by the smart key 10 to control operations of the to-be-controlled device 40. In other words, the function information may include information for the first device 20 to control only some functions of the to-be-controlled device 40. The function information may also include information that sets restrictions for controlling a function of the to-be-controlled device 40 with respect to a period of time, a distance, a number of times, a state of the to-be-controlled device 40, and the like.

The first device 20 may set a usage restriction for a function capable of controlling an operation of the to-be-controlled device 40. The first device 20 transmits function information including the usage restriction to the second device 30. For example, according to a received user input, the first device 20 may set a usage restriction for each of the functions capable of controlling operations of the to-be-controlled device 40 and add the usage restrictions to the function information received from the smart key 10.

The usage restriction may be a condition that limits the second device 30 to using only some of all functions capable of controlling operations of the to-be-controlled device 40, or may be a condition that limits the environment where the second device 30 is able to control an operation of the to-be-controlled device 40. For example, the condition that limits the environment may include a condition that limits a period of time during which the second device 30 is allowed to use functions capable of controlling operations of the to-be-controlled device 40. The usage restriction may also include a condition that limits how far the second device 30 may be from the to-be-controlled device 40 when using the functions capable of controlling operations of the to-be-controlled device 40. The usage restriction may also include a condition that specifies approved users who are allowed to use the functions capable of controlling operations of the to-be-controlled device 40. The usage restriction may also include a condition that limits the types of functions of the smart key 10 that are allowed to be used by the second device 30. The usage restriction may also include a condition that limits the number of times the second device 30 is allowed to use the functions capable of controlling operations of the to-be-controlled device 40.

The above-described usage restrictions are only examples, and usage restrictions according to one or more other exemplary embodiments are not limited thereto. In other words, any usage restriction that may be imposed when the second device 30 uses the functions of the smart key 10 may be implemented. Examples in which the first device 20 sets a usage restriction will be described below with reference to FIGS. 15-28.

By way of example, the first device 20 may transmit the function information of the smart key 10 to the second device 30 via wired and/or wireless communications. As another example, the first device 20 may transmit function information of a smart key to a server, and the server may transmit the function information of the smart key to the second device 30. As another example, when a hardware device (for example, a memory device) separated from the first device 20 is combined with the second device 30, the second device 30 may receive the function information from the first device 20. As another example, the first user 50 may provide a hardware device (for example, a portion of the smart key 10) separated from the smart key 10 to the second user 60, and the second user 60 may control the to-be-controlled device 40 by using the received hardware device. Examples in which the first device 20 transmits function information to the second device 30 will be described below with reference to FIGS. 29-34.

The second device 30 controls the to-be-controlled device 40 by using the function information received from the first device 20. When the function information received from the first device 20 includes usage restrictions, there may be a restriction as to when or how the second device 30 may control the to-be-controlled device 40.

For example, the to-be-controlled device 40 is a vehicle and the usage restriction is a condition that the second device 30 may use the functions capable of controlling operations of the to-be-controlled device 40 only during a time period, such as from 7:00 pm to 7:30 pm on Jun. 23, 2014. In this case, the second device 30 is able to control an operation of the vehicle by, for example, opening or closing a door of the vehicle or starting the vehicle, at 7:13 pm, Jun. 23, 2014, but the second device 30 is not able to control an operation of the vehicle at 7:32 pm, Jun. 23, 2014. In other words, the second device 30 is able to control the vehicle by outputting, for example, a signal for opening or closing a door of the vehicle and a signal for starting the vehicle, at 7:13 pm, Jun. 23, 2014, but the second device 30 is unable to output these signals at 7:32 pm, Jun. 23, 2014 and is thus unable to control the vehicle at this time. Examples in which the second device 30 controls the to-be-controlled device 40 will be described below with reference to FIGS. 35-52.

If the second device 30 attempts to use at least one of the functions capable of controlling operations of the to-be-controlled device 40, the first device 20 may receive a function-usage history of the second device 30. The function-usage history may be included in a notification alerting the first device 20 of any attempt by the second device 30 to use a function capable of controlling an operation of the to-be-controlled device 40, or may be a notification that notifies the first device 20 that the second device 30 has used a function capable of controlling an operation of the to-be-controlled device 40 after the second device 30 uses the function. When the first device 20 has received the function-usage history, the first device 20 may output the received function-usage history to a screen thereof. An example in which the first device 20 receives a function-usage history of the second device 30 will be described below with reference to FIG. 53.

In response to the function information including the usage restriction received from the first device 20, the second device 30 may request the first device 20 to change the usage restriction. For example, assuming that a usage restriction set by the first device 20 is a condition that allows the second device 30 to control an operation of the to-be-controlled device 40 only one time, the second device 30 may request the first device 20 to set the usage restriction to allow the second device 30 to control an operation of the to-be-controlled device 40 twice. At this time, when the first device 20 accepts the request of the second device 30, the second device 30 may control the to-be-controlled device 40 according to the newly set usage restriction. Examples in which the second device 30 requests the first device 20 to change a preset usage restriction will be described below with reference to FIGS. 54 and 55.

According to the description above with reference to FIG. 1, a single second device 30 receives the function information from the first device 20, and the user of the first device 20 (i.e., the first user 50) and a user of the second device 30 (i.e., the second user 60) are different users. However, it is understood that one or more other exemplary embodiments are not limited thereto.

For example, according to another exemplary embodiment, the first device 20 may transmit the function information to devices that belong to different users. An example in which a plurality of devices that receive function information from the first device 20 belong to different users will be described below with reference to FIG. 56.

According to another exemplary embodiment, the first device 20 may transmit the function information to a plurality of devices that belong to the same user. An example in which a plurality of devices that receive function information from the first device 20 belong to the same user will be described below with reference to FIG. 57.

According to still another exemplary embodiment, the first device 20 may transmit the function information to different devices that belong to the first user 50. In other words, the user of the first device 20 may be the same as the users of the devices that receive the function information from the first device 20. An example in which the first device 20 transmits the function information to other devices owned by the first user 50 will be described below with reference to FIG. 58.

According to yet another exemplary embodiment, without intervention from the smart key 10, the first device 20 may receive the function information from a manufacturing company of the to-be-controlled device 40, set usage restrictions in the function information, and transmit the function information including the usage restrictions to the second device 30. An example in which the first device 20 receives function information from the manufacturing company of the to-be-controlled device 40 will be described below with reference to FIG. 59.

According to another exemplary embodiment, without intervention from the first device 20, the second device 30 may receive the function information from the smart key 10. An example in which the second device 30 receives function information from the smart key 10 will be described below with reference to FIG. 60.

The to-be-controlled device 40 of which operations can be controlled by the smart key 10 is not limited to a vehicle. As described above, various devices may be the to-be-controlled device 40. Examples of the to-be-controlled device 40 controllable by the smart key 10 will now be described with reference to FIGS. 2-5.

FIGS. 2-5 are views for explaining examples of a to-be-controlled device according to one or more exemplary embodiments.

Figure 2:
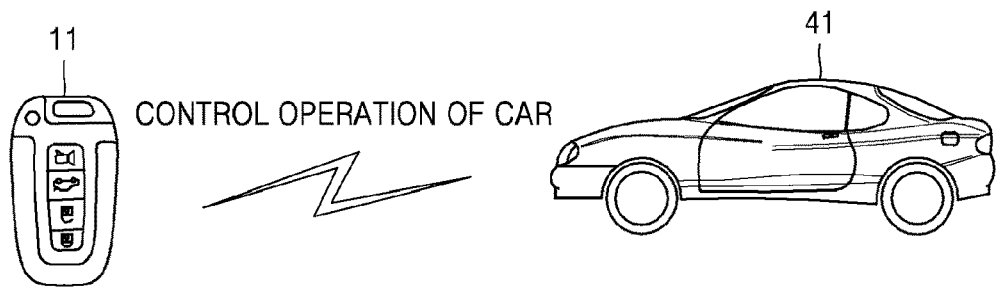
FIGS. 2-5 are views for explaining examples of a to-be-controlled device according to one or more exemplary embodiments.

Referring to FIG. 2, the to-be-controlled device may be a vehicle 41. In other words, the smart key 11 may control operations that can be performed by the vehicle 41. Examples of the operations that can be performed by the vehicle 41 are the same as or similar to those described above with reference to FIG. 1.

Figure 3:
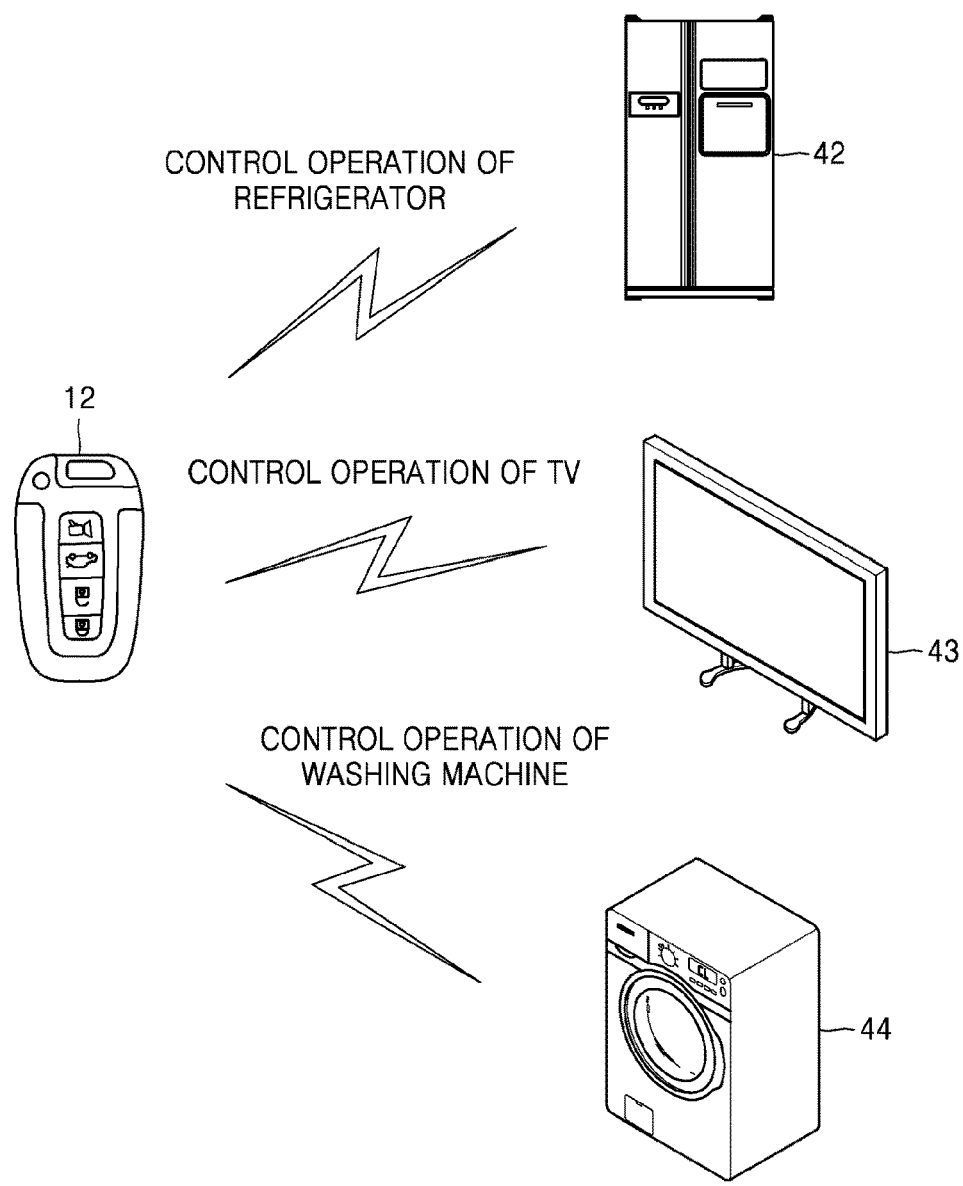

Referring to FIG. 3, home appliances 42, 43, and 44 may be to-be-controlled devices. Although a refrigerator 42, a television (TV) 43, and a washing machine 44 are illustrated in FIG. 3, it is understood that one or more other exemplary embodiments are not limited thereto. In other words, any electronic product capable of being installed in houses, offices, and the like may be a to-be-controlled device.

The smart key 12 may control operations that can be performed by the home appliances 42, 43, and 44. For example, if the to-be-controlled device is the refrigerator 42, the smart key 12 may control operations that can be performed by the refrigerator 42, such as opening or closing of a door, adjustment of an internal temperature, and turning on or off. As another example, if the to-be-controlled device is the TV 43, the smart key 12 may control operations that can be performed by the TV 43, such as a channel change, a volume adjustment, and turning on or off. As another example, if the to-be-controlled device is the washing machine 44, the smart key 12 may control operations that can be performed by the washing machine 44, such as a change of a washing mode, an adjustment of a washing time period, and turning on or off.

As illustrated in FIG. 3, the single smart key 10 may control a plurality of home appliances. However, in one or more other exemplary embodiments, separate smart keys may be provided to control the plurality of home appliances, respectively.

Figure 4:
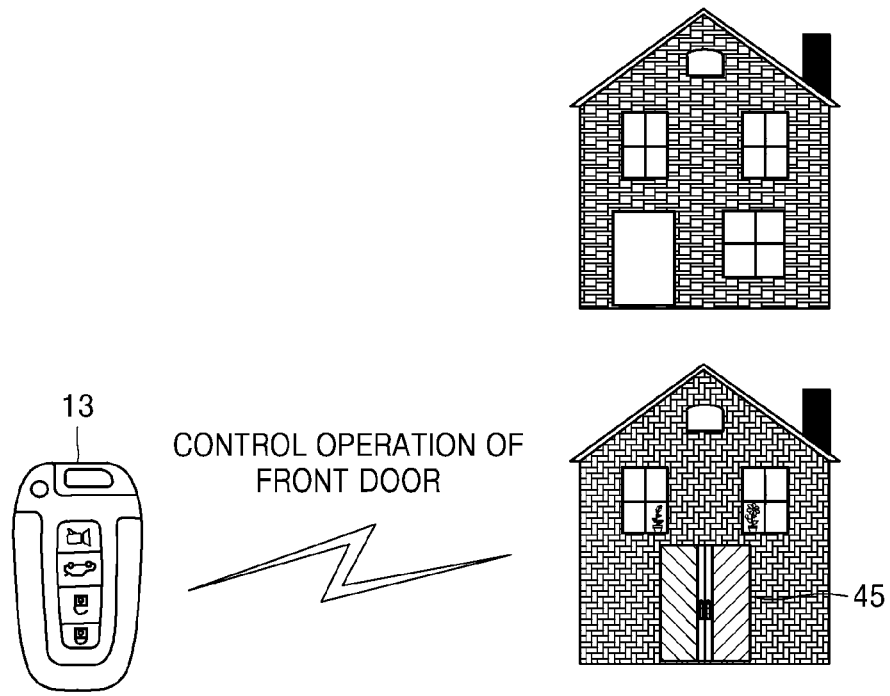

Referring to FIG. 4, the to-be-controlled device may be a front door 45 or a lock for the front door 45. For example, the smart key 13 may control operations that can be performed by the front door 45, such as opening or closing ad locking or unlocking of the front door 45.

Figure 5:
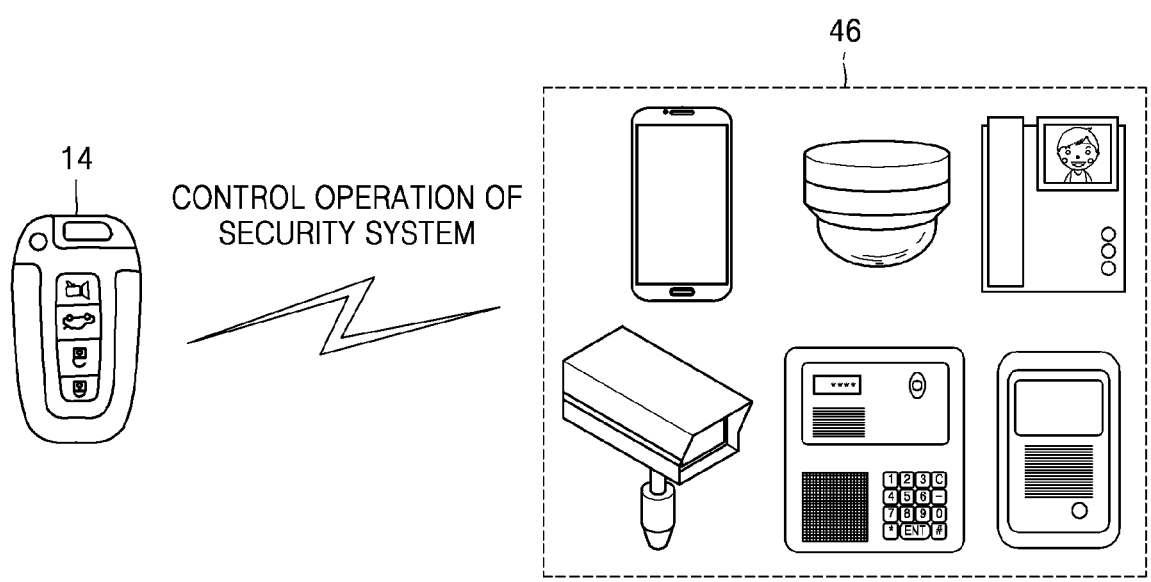

Referring to FIG. 5, devices included in a security system 46 may be to-be-controlled devices. For example, assuming that the security system 46 includes a photographing apparatus, the smart key 14 may control a photographing direction, a photographing angle, or the like of the photographing apparatus. As another example, assuming that the security system 46 includes an intercom phone, the smart key 14 may control an operation of the intercom phone. As another example, the smart key 14 may turn on or off each of the devices included in the security system 46.

Figure 6:
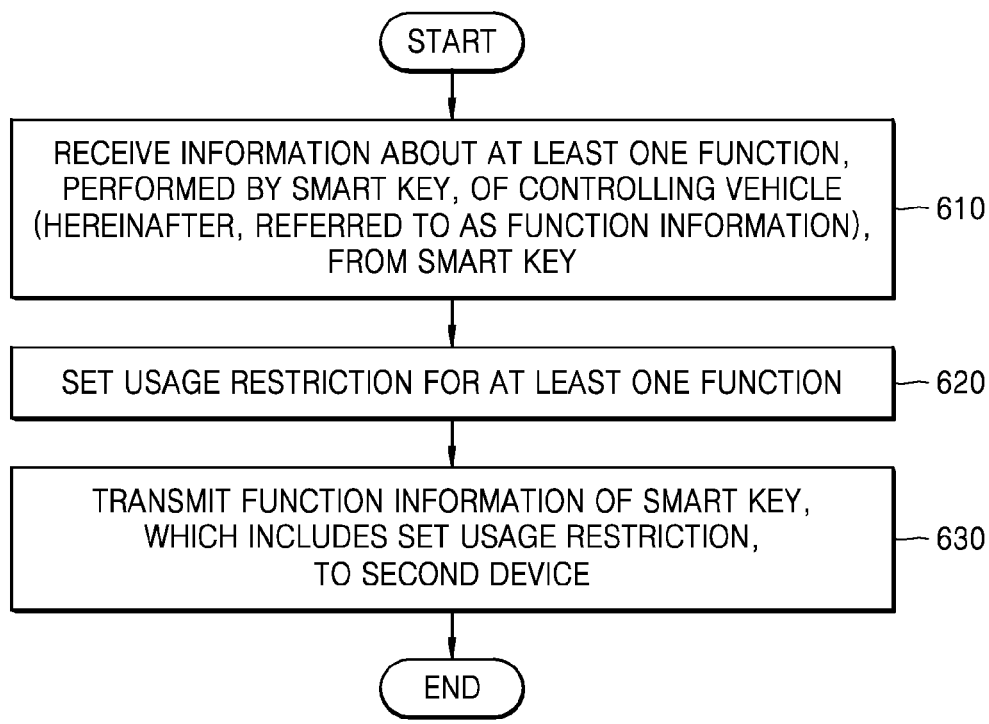
FIG. 6 is a flowchart of a method in which a first device transmits function information of a smart key to a second device, according to an exemplary embodiment.

FIG. 6 is a flowchart of a method in which a first device 20 transmits function information of a smart key 10 to a second device 30, according to an exemplary embodiment.

The method of FIG. 6 includes operations serially performed by the first device 20 of FIG. 1. It is understood that the above descriptions of the operations of the first device 20 of FIG. 1 may also apply to the method illustrated in FIG. 6.

In operation 610, the first device 20 receives information about at least one function, performed by the smart key 10, of controlling a vehicle (hereinafter, referred to as "function information"), from the smart key 10. For example, the first device 20 may receive the function information from the smart key 10 via wired and/or wireless communications. As another example, as a hardware device separated from the smart key 10 is combined with the first device 20, the first device 20 may receive the function information from the smart key 10. As another example, the first user 50 may control the to-be-controlled device 40 by using the predetermined hardware device separated from the smart key 10 (e.g., a portion of the smart key 10 that detaches from the smart key 10).

In operation 620, the first device 20 sets a usage restriction for the at least one function. For example, the first device 20 may set a usage restriction for each of the functions capable of controlling operations of the to-be-controlled device 40, according to a received user input, and add the usage restrictions to the function information received from the smart key 10. The usage restriction may be a condition that limits the second device 30 to using only some among all functions capable of controlling operations of the to-be-controlled device 40, or may be a condition that limits the environment where the second device 30 is able to use the functions capable of controlling operations of the to-be-controlled device 40.

If operation 620 is omitted from the method of FIG. 6 or no usage restriction is set, the second device 30 may use all of the functions capable of controlling operations of the to-be-controlled device 40, without any restriction.

In operation 630, the first device 20 transmits the function information of the smart key 10, which includes the usage restriction set in operation 620, to the second device 30. For example, the first device 20 may transmit the function information of the smart key 10 to the second device 30 via wired and/or wireless communications. As another example, as a hardware device separated from the first device 20 is combined with the second device 30, the second device 30 may receive the function information from the first device 20. As another example, the second user 60 may receive, from the first user 50, a hardware device separated from the smart key 10 and may control the to-be-controlled device 40 by using the received hardware device.

Although not shown in FIG. 6, the second device 30 may control an operation of the to-be-controlled device 40 by using the function information received from the first device 20.

Figure 7:
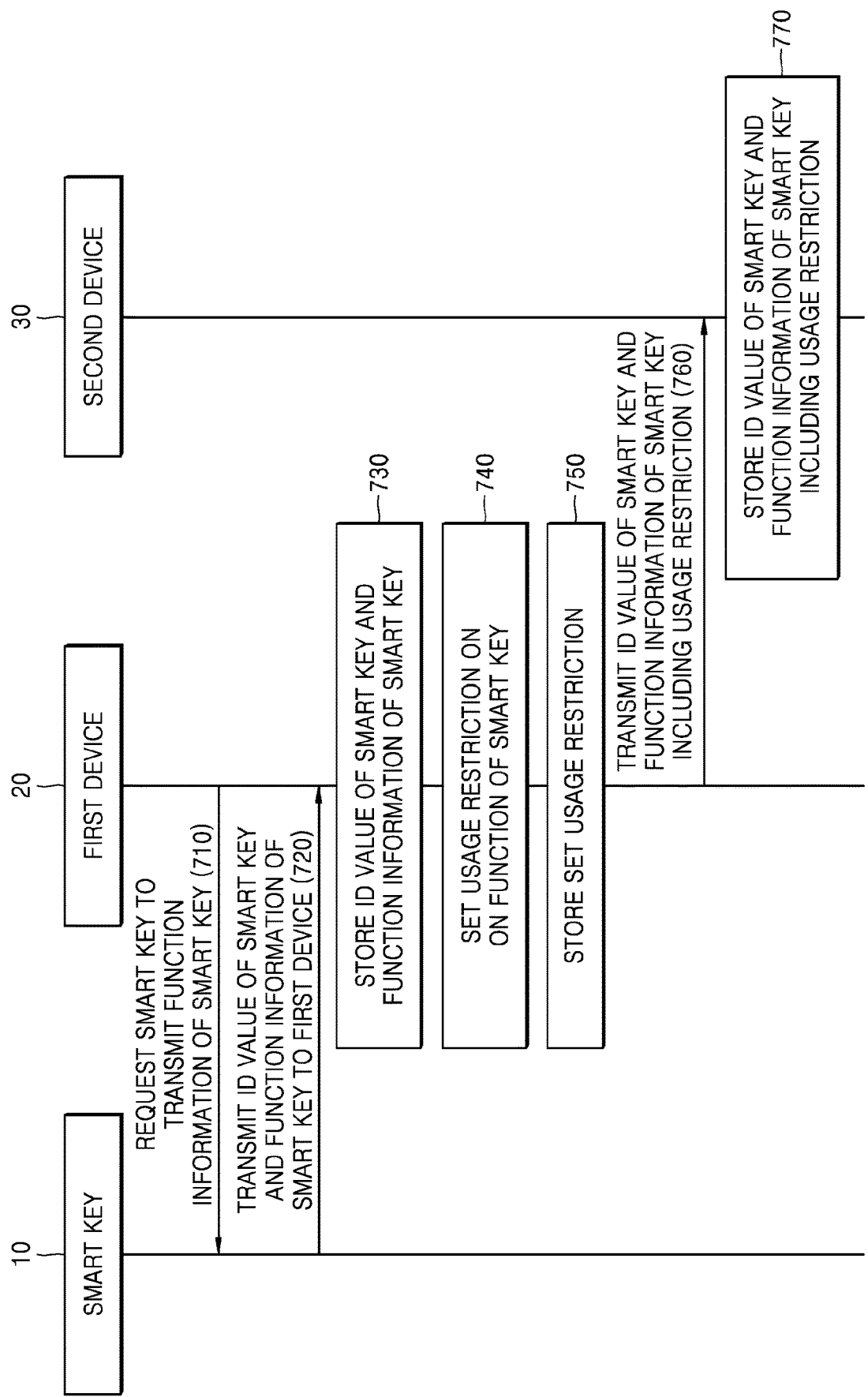
FIG. 7 is a flowchart of an example in which a first device receives function information from a smart key and transmits the function information including set usage restrictions to a second device, according to an exemplary embodiment.

FIG. 7 is a flowchart of an example in which a first device 10 receives function information from a smart key 10 and transmits the function information including set usage restrictions to a second device 30, according to an exemplary embodiment.

The example of FIG. 7 includes operations serially performed by the smart key 10, the first device 20, and the second device 30 of FIG. 1. Thus, the above descriptions of the operations of the smart key 10, the first device 20, and the second device 30 of FIG. 1 may also apply to the example illustrated in FIG. 7.

In operation 710, the first device 20 requests the smart key 10 to transmit the function information of the smart key 10. The operation, performed by the first device 20, of requesting the smart key 10 to transmit the function information may be performed in a situation where communication linkage between the first device 20 and the smart key 10 has been completed. For example, the first device 20 may connect wirelessly with the smart key 10 and then request the smart key 10 for the function information. The first device 20 may request the smart key 10 for the function information according to a user input received via a user input unit 6010 (see FIG. 62). As another example, when the first device 20 has performed communication linkage with the smart key 10, the smart key 10 may determine that the first device 20 is requesting the function information. The communication linkage denotes linkage via wired and/or wireless communications.

In operation 720, the smart key 10 transmits an ID value of the smart key 10 and the function information of the smart key 10 to the first device 20. At this time, the smart key 10 may transmit, to the first device 20, function information including usage restrictions or function information including no usage restrictions.

The ID value of the smart key 10 may be used when the first device 20 and the second device 30 store the function information of the smart key 10 or generate signals for controlling the to-be-controlled device 40. The ID value of the smart key 10 may be an ID value previously stored for the smart key 10 or may be an ID value arbitrarily generated by the first device 20. According to another exemplary embodiment, the smart key 10 may transmit an ID value of the smart key 10 and an ID value of the to-be-controlled device 40.

For example, the first device 20 and the second device 30 may use the ID value to distinguish the function information of the smart key 10 from function information of another smart key when storing the function information of the smart key 10. By way of example, if the ID value of a first smart key is 'KEY 1', the ID value of a second smart key is 'KEY 2', and the first device 20 has received function information from the first smart key and function information from the second smart key, the first device 20 stores the function information of the first smart key and the function information of the second smart key such that they are distinguished from each other. Accordingly, the first device 20 may map the ID value of 'KEY 1' with the function information of the first smart key and store the same, and map the ID value of 'KEY 2' with the function information of the second smart key and store the same.

As another example, the first device 20 and the second device 30 may use the ID value when generating signals for controlling the to-be-controlled device 40. Typically, the to-be-controlled device 40 performs an operation by sensing only a signal output by the smart key 10 corresponding to the to-be-controlled device 40. For example, a first to-be-controlled device 40 performs an operation by sensing a signal output by the first smart key, and a second to-be-controlled device 40 performs an operation by sensing a signal output by the second smart key. For example, a difference between the signals respectively output by the first smart key and the second smart key may be derived from a difference in amplitude or phase. As another example, since the signal output by the first smart key includes information about the ID value of the first smart key, and the signal output by the second smart key includes information about the ID value of the second smart key, a difference between the two signals may result.

By way of example, it is assumed that the ID value of a first smart key is 'KEY 1', the ID value of a second smart key is 'KEY 2', and the first device 20 has received function information from the first smart key and function information from the second smart key. It is also assumed that the first smart key controls the first to-be-controlled device 40. The first device 20 may generate a signal for controlling the first to-be-controlled device 40 by using the ID value of 'KEY 1'.

Examples in which the smart key 10 transmits the ID value of the smart key 10 and function information to the first device 20 will now be described with reference to FIGS. 8-10.

Figure 8:
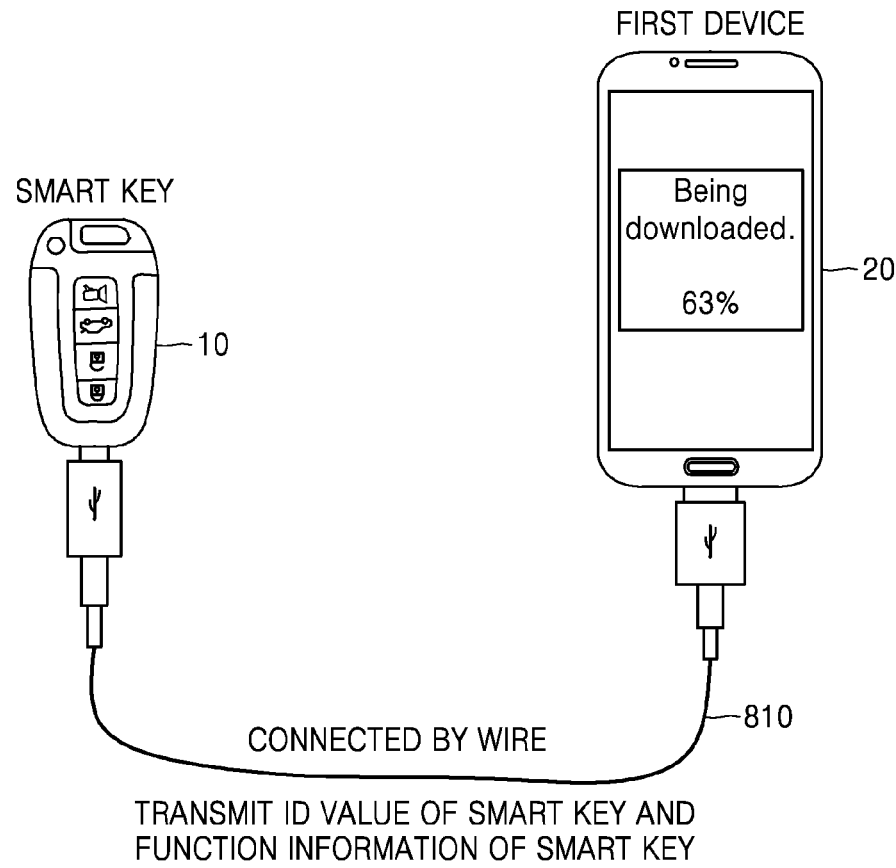
FIG. 8 illustrates an example in which a smart key transmits its identification (ID) value and function information to a first device, according to an exemplary embodiment.

FIG. 8 illustrates an example in which a smart key 10 transmits its ID value and function information to a first device 20, according to an exemplary embodiment.

Referring to FIG. 8, the smart key 10 and the first device 20 are connected to each other via a cable 810. Although the smart key 10 and the first device 20 are connected to each other via a universal serial bus (USB) cable in FIG. 8, it is understood that one or more other exemplary embodiments are not limited thereto. In other words, any method may be used in which the smart key 10 and the first device 20 are connected to each other by wire and perform data communication.

When the first device 20 requests the smart key 10 to transmit function information, the smart key 10 transmits its ID value and function information to the first device 20. The request of the first device 20 may be separately performed after the smart key 10 and the first device 20 are connected to each other. Alternatively, the request of the first device 20 may be made or implied by the connection between the smart key 10 and the first device 20. In other words, in response to the smart key 10 and the first device 20 connecting to each other, the ID value and the function information of the smart key 10 may be transmitted to the first device 20.

Figure 9:
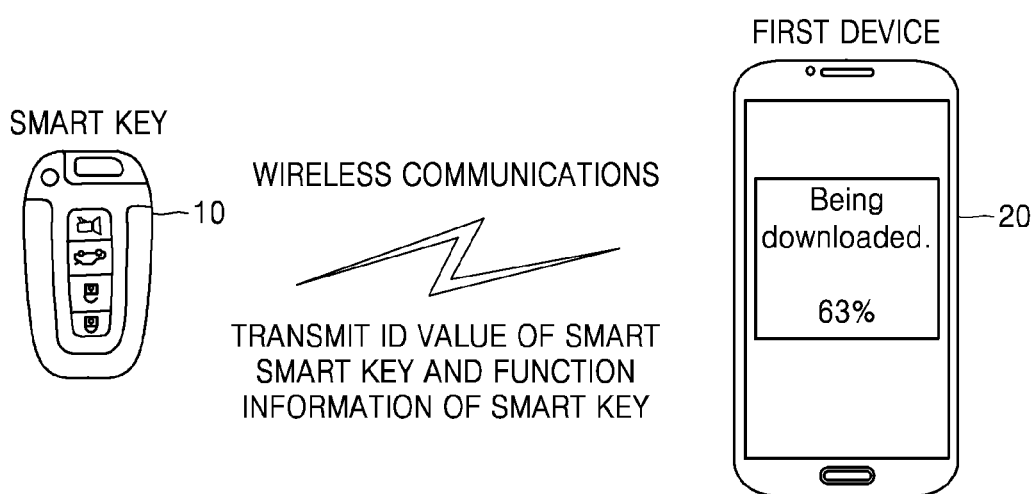
FIG. 9 illustrates another example in which a smart key transmits its ID value and function information to a first device, according to an exemplary embodiment.

FIG. 9 illustrates another example in which a smart key 10 transmits its ID value and function information to a first device 20, according to an exemplary embodiment.

Referring to FIG. 9, the smart key 10 and the first device 20 are connected to each other via wireless communications. Examples of the wireless communications may include, but are not limited to, NFC, ZigBee, Bluetooth, and UWB.

When the first device 20 requests the smart key 10 to transmit function information, the smart key 10 transmits its ID value and function information to the first device 20. As described above with reference to FIG. 8, the request of the first device 20 may be separately performed after the smart key 10 and the first device 20 are connected to each other, or the request of the first device 20 may be performed by virtue of the connection between the smart key 10 and the first device 20.

Figure 10:
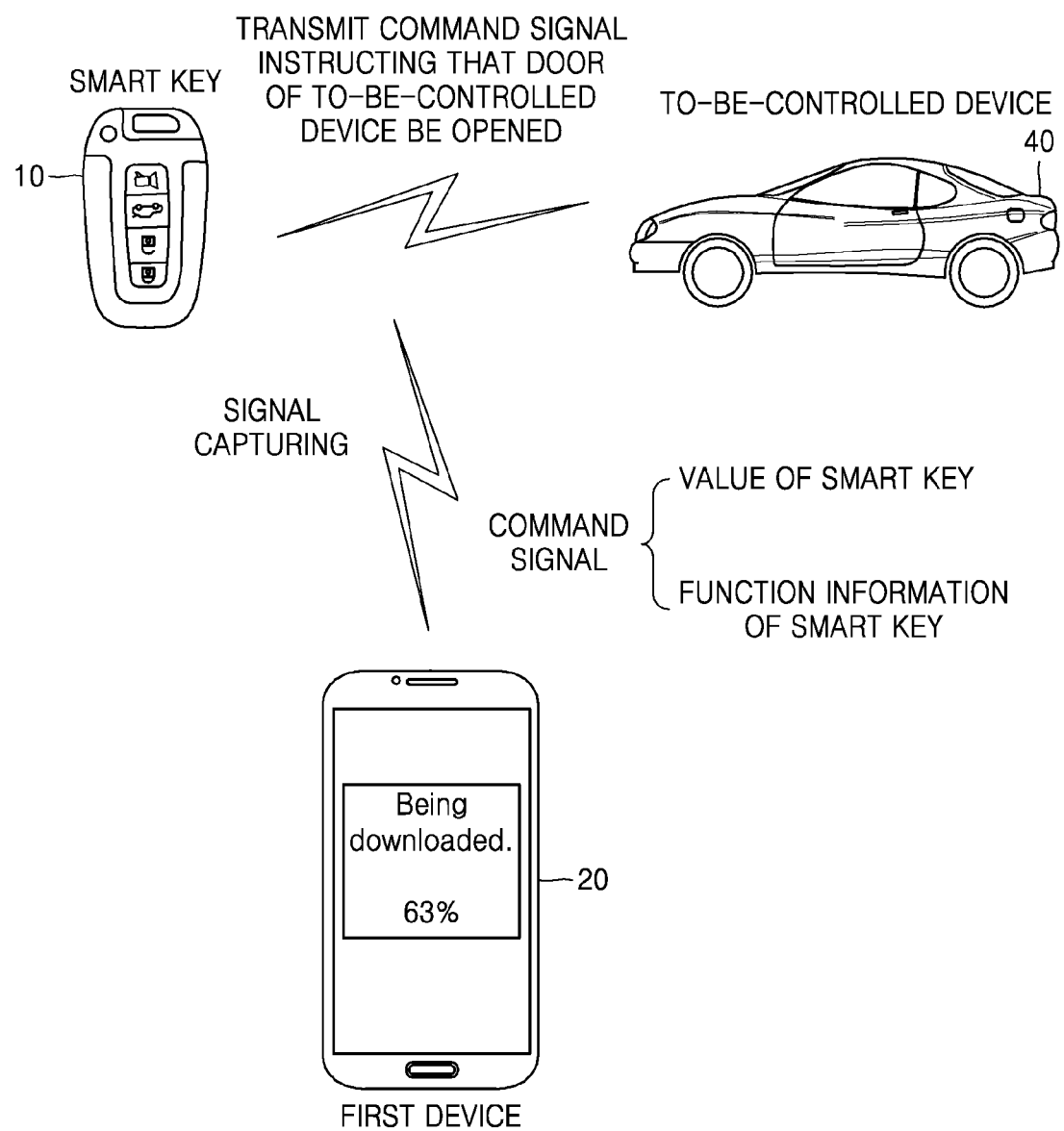
FIG. 10 illustrates another example in which a smart key transmits its ID value and function information to a first device, according to an exemplary embodiment.

FIG. 10 illustrates another example in which a smart key 10 transmits its ID value and function information to a first device 20, according to an exemplary embodiment.

Referring to FIG. 10, the smart key 10 outputs a signal for controlling an operation of the to-be-controlled device 40. For example, it is assumed that the smart key 10 outputs a signal instructing that a door of the to-be-controlled device 40 be opened. The signal output by the smart key 10 may be a radio frequency (RF) signal, although it is understood that one or more other exemplary embodiments are not limited thereto.

The first device 20 may acquire the function information of the smart key 10 by capturing the signal output by the smart key 10. If the signal output by the smart key 10 includes the ID value of the smart key 10, the first device 20 may acquire the ID value and the function information of the smart key 10 by capturing the signal.

Referring back to FIG. 7, in operation 730, the first device 20 stores the ID value of the smart key 10 and the function information of the smart key 10. The first device 20 may map the ID value of the smart key 10 with the function information of the smart key 10 and store the mapped ID value and function information, as described above with reference to operation 720 of FIG. 7. An example in which the first device 20 stores an ID value of the smart key 10 and function information of the smart key 10 will now be described with reference to FIG. 11.

Figure 11:
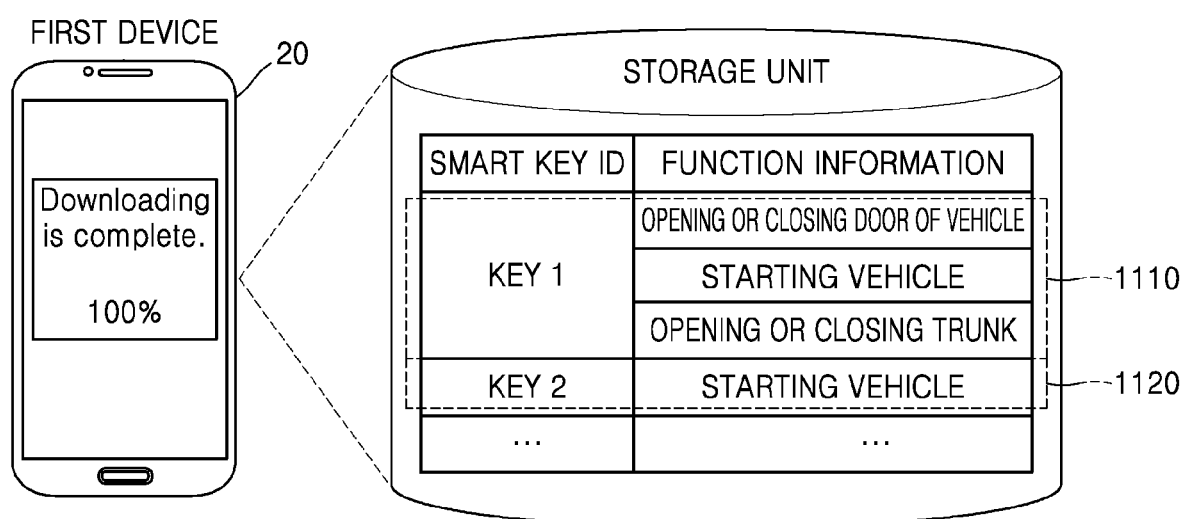
FIG. 11 illustrates an example in which a first device stores an ID value and function information of a smart key, according to an exemplary embodiment.

FIG. 11 illustrates an example in which a first device stores an ID value and function information of a smart key, according to an exemplary embodiment.

Referring to FIG. 11, the first device 20 and a storage unit (e.g., storage) included in the first device 20 are illustrated. The storage unit may correspond to a memory 6070, which will be described below with reference to FIG. 63, and may be a storage device separately included in the first device 20.

When having received the ID value and the function information from the smart key 10, the first device 20 stores the ID value and the function information in the storage unit. At this time, the first device 20 may map the ID value of the smart key 10 with the function information of the smart key 10 as indicated by reference numerals 1110 and 1120 and store a result of the mapping. Hence, even when receiving pieces of function information from a plurality of smart keys, the first device 20 may manage the pieces of function information of the plurality of smart keys such that the pieces of function information are distinguished from one another. The first device 20 may generate a signal for controlling the first to-be-controlled device 40, by using the ID value of the smart key 10.

For example, it is assumed that an ID value received from a first smart key is 'KEY 1' and an ID value received from a second smart key is 'KEY 2'. In this case, the first device 20 may map the ID value of 'KEY 1' with function information of the first smart key as indicated by reference numeral 1110 and store the mapping information, and map the ID value of 'KEY 2' with function information of the second smart key as indicated by reference numeral 1120 and store a result of the mapping.

Referring back to FIG. 7, in operation 740, the first device 20 sets a usage restriction for a function capable of controlling an operation of the to-be-controlled device 40. For example, according to a user input received via the user input unit 6010, the first device 20 may set a usage restriction for each of the functions capable of controlling operations of the to-be-controlled device 40. The usage restriction may be a condition that limits the second device 30 to using only some among all functions capable of controlling operations of the to-be-controlled device 40, or may be a condition that limits the environment where the second device 30 is able to use the functions capable of controlling operations of the to-be-controlled device 40.

In operation 750, the first device 20 stores the set usage restriction. Examples in which the first device 20 sets and stores a usage restriction will be described below with reference to FIGS. 15-28.

In operation 760, the first device 20 transmits the ID value of the smart key 10 and the function information of the smart key 10 to the second device 30. For example, when the first device 20 has received a transmission request from the second device 30, the first device 20 may transmit the ID value and the function information to the second device 30. As another example, the first device 20 may designate a second device 30 to which the ID value and the function information are to be transmitted, and may transmit the ID value and the function information to the designated second device 30 (for example, without first receiving a request from the second device 30).

As described above with reference to operation 740, when the first device 20 has set usage restrictions for the functions capable of controlling operations of the to-be-controlled device 40, the usage restrictions may be included in the function information that is transmitted to the second device 30. If operation 740 has not been performed or if no usage restrictions are set, the function information that is transmitted to the second device 30 may include no usage restrictions. In other words, when the second device 30 has received function information including no usage restrictions, the second device 30 may control operations of the to-be-controlled device 40 without any restriction (i.e., to a same extent that the first device 20 may control operations of the to-be-controlled device 40).

In operation 770, the second device 30 stores the ID value of the smart key 10 and the function information of the smart key 10 received from the first device 20. Examples in which the first device 20 transmits an ID value and function information to the second device 30 and the second device 30 stores the received ID value and function information will be described below with reference to FIGS. 29-37.

As described above with reference to FIG. 1, based on a predetermined hardware device separated from the smart key 10, the function information may be transmitted from the smart key 10 to the first device 20, or the user of the first device 20 (i.e., the first user 50) may control the to-be-controlled device 40. An example in which function information is transmitted from the smart key 10 to the first device 20, based on the predetermined hardware device separated from the smart key 10, will now be described with reference to FIGS. 12-14.

Figure 12:
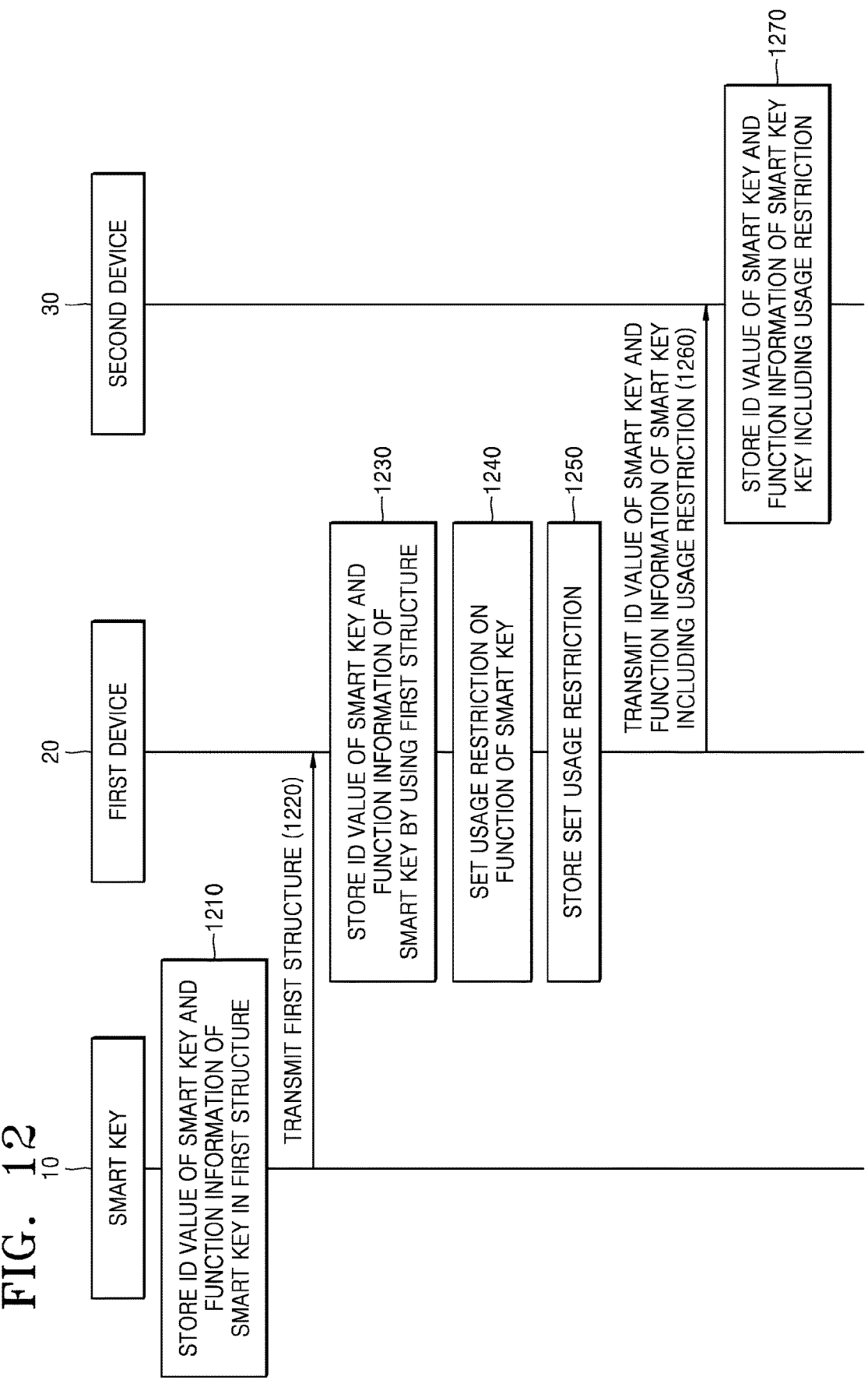
FIG. 12 is a flowchart of another example in which a first device receives function information from a smart key and transmits the function information including set usage restrictions to a second device, according to an exemplary embodiment.

FIG. 12 is a flowchart of another example in which a first device 20 receives function information from a smart key 10 and transmits the function information including set usage restrictions to a second device 30, according to an exemplary embodiment.

The example of FIG. 12 includes operations serially performed by the smart key 10, the first device 20, and the second device 30 of FIG. 1. Thus, the above descriptions of the operations of the smart key 10, the first device 20, and the second device 30 of FIG. 1 may also apply to the example illustrated in FIG. 12.

Operations 1230-1270 of FIG. 12 correspond to operations 730-770 of FIG. 7, respectively. Hence, redundant descriptions of operations 1230-1270 are omitted below.

In operation 1210, the smart key 10 stores an ID value of the smart key 10 and function information of the smart key 10 in a first structure. In operation 1220, the first structure is transmitted, provided, or connected to the first device 20.

The first structure may denote a device combined with (e.g., connectable to) the smart key 10 or a portion of the smart key 10 (e.g., a detachable portion of the smart key 10). For example, the first structure may be a separate memory device combined with the smart key 10 or a portion of the smart key 10.

Examples in which, when the first structure is a portion of the smart key 10 or a memory device, an ID value and function information of the smart key 10 are transmitted to the first device 20 will now be described with reference to FIGS. 13 and 14.

Figure 13:
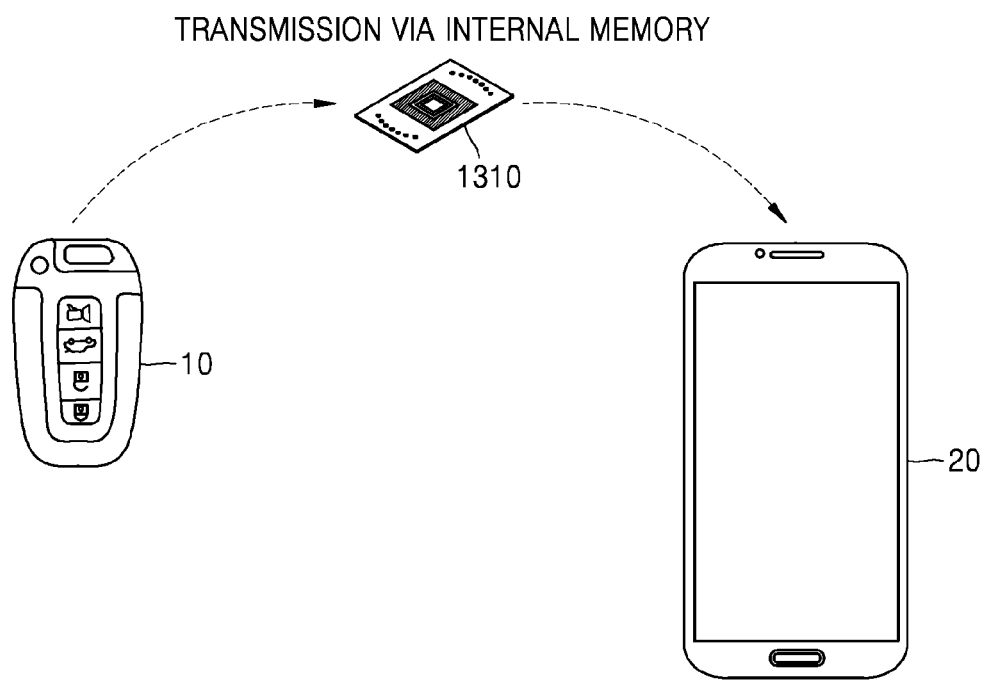
FIG. 13 illustrates an example in which, when a first structure according to an exemplary embodiment is a memory device, an ID value and function information of a smart key are transmitted to a first device.

FIG. 13 illustrates an example in which, when a first structure according to an exemplary embodiment is a memory device 1310, an ID value and function information of a smart key 10 are transmitted to a first device 20.

Referring to FIG. 13, the smart key 10, a memory device 1310 combined with the smart key 10, and the first device 20 are illustrated.

The smart key 10 may store an ID value of the smart key 10 and function information of the smart key 10 in the memory device 1310. In this case, the smart key 10 may store function information including a usage restriction or function information including no usage restrictions, in the memory device 1310. The usage restriction may be a condition that limits the first device 20 to using only some among all of the functions capable of controlling operations of the to-be-controlled device 40, or may be a condition that limits the environment where the first device 20 is able to use the functions capable of controlling operations of the to-be-controlled device 40.

The user of the first device 20 (i.e., the first user 50) may combine the memory device 1310 separated from the smart key 10 with the first device 20. Hence, the ID value and the function information of the smart key 10 may be transmitted to the first device 20.

Figure 14:
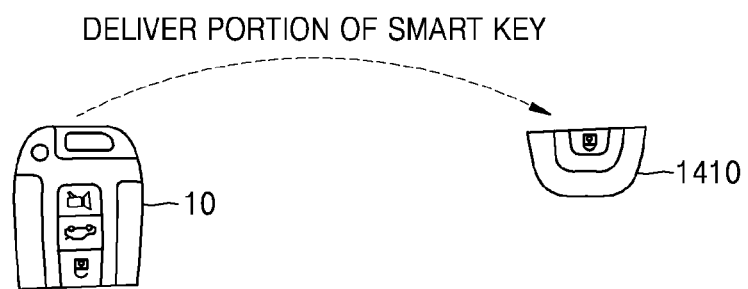
FIG. 14 illustrates an example in which, when a first structure according to an exemplary embodiment is a portion of a smart key, an ID value and function information of the smart key are transmitted to a first device.

FIG. 14 illustrates an example in which, when a first structure according to an exemplary embodiment is a portion 1410 of a smart key 10, an ID value and function information of the smart key 10 are transmitted to a first device 20.

Referring to FIG. 14, the smart key 10 and a portion 1410 of the smart key 10 are illustrated. As illustrated in FIG. 14, the portion 1410 may denote a physical portion of the smart key 10.

The portion 1410 may store the ID value and the function information of the smart key 10. In this case, the portion 1410 may store function information including a usage restriction or function information including no usage restrictions. In other words, the portion 1410 may be set such that only some of the functions capable of controlling operations of the to-be-controlled device 40 may be used, or such that the functions capable of controlling operations of the to-be-controlled device 40 may be used only in a certain environment (for example, a restriction regarding a period of time, a distance, a number of times, etc.). Alternatively, the portion 1410 may be set such that the functions capable of controlling operations of the to-be-controlled device 40 may be used without any restriction.

The user of the first device 20 (i.e., the first user 50) may control an operation of the to-be-controlled device 40 by using the portion 1410. The first user 50 may give the portion 1410 to another user (for example, the second user 60), and the other user may control an operation of the to-be-controlled device 40 by using the received portion 1410. In this case, operations 1230-1270 of FIG. 12 may be omitted.

According to the description above with reference to operations 740 and 750 of FIG. 7 (corresponding to operations 1240 and 1250 of FIG. 12), the first device 20 may set the usage restriction for the function capable of controlling an operation of the to-be-controlled device 40, and store the set usage restriction. Examples in which the first device 20 sets and stores usage restrictions will now be described with reference to FIGS. 15-28.

Figure 15:
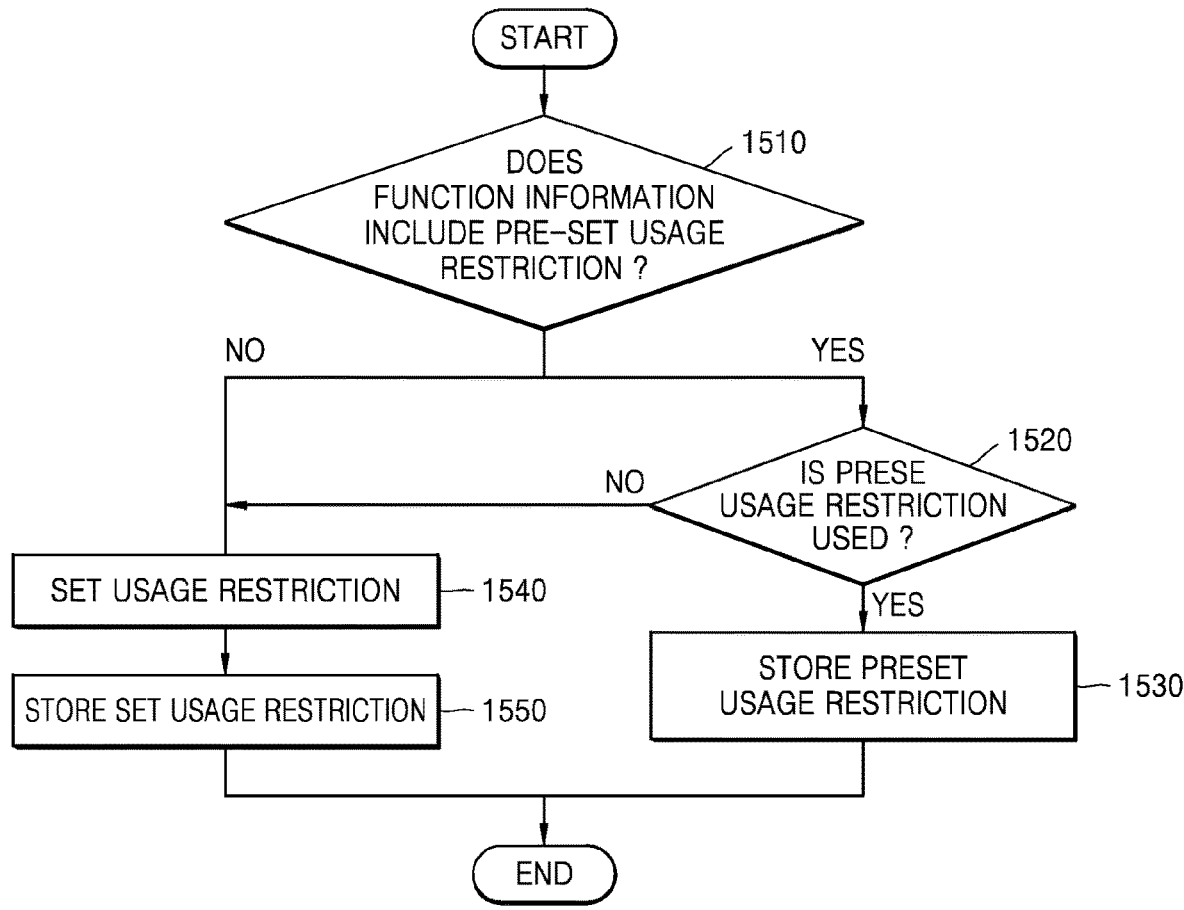
FIG. 15 is a flowchart of an example in which a first device according to an exemplary embodiment sets a usage restriction for a function capable of controlling an operation of a to-be-controlled device and stores the set usage restriction.

FIG. 15 is a flowchart of an example in which a first device 20 according to an exemplary embodiment sets a usage restriction for a function capable of controlling an operation of a to-be-controlled device 40 and stores the set usage restriction.

The example of FIG. 15 includes operations serially performed by the first device 20 of FIG. 1. Thus, the above descriptions of the operations of the first device 20 of FIG. 1 may also apply to the example illustrated in FIG. 15.

In operation 1510, the first device 20 determines whether function information includes a pre-set usage restriction. In other words, the first device 20 determines whether a usage restriction is set in function information received from the smart key 10. As described above with reference to operation 720 of FIG. 7 and operation 1210 of FIG. 12, a usage restriction for the function capable of controlling an operation of the to-be-controlled device 40 may be previously set in the function information transmitted to the first device 20 or in the first structure. Accordingly, the first device 20 may determine whether the function information received from the smart key 10 includes a set usage restriction.

If the first device 20 determines that the function information includes a preset usage restriction, the method proceeds to operation 1520. Otherwise, the method proceeds to operation 1540.

In operation 1520, the first device 20 determines whether to use the preset usage restriction. For example, the first device 20 may determine whether to use the preset usage restriction, according to a user input received via the user input unit 6010. If the first device 20 determines that the preset usage restriction is to be used, the method proceeds to operation 1530. Otherwise, the method proceeds to operation 1540.

An example in which the first device 20 determines whether to use a preset usage restriction will now be described with reference to FIG. 16.

Figure 16:
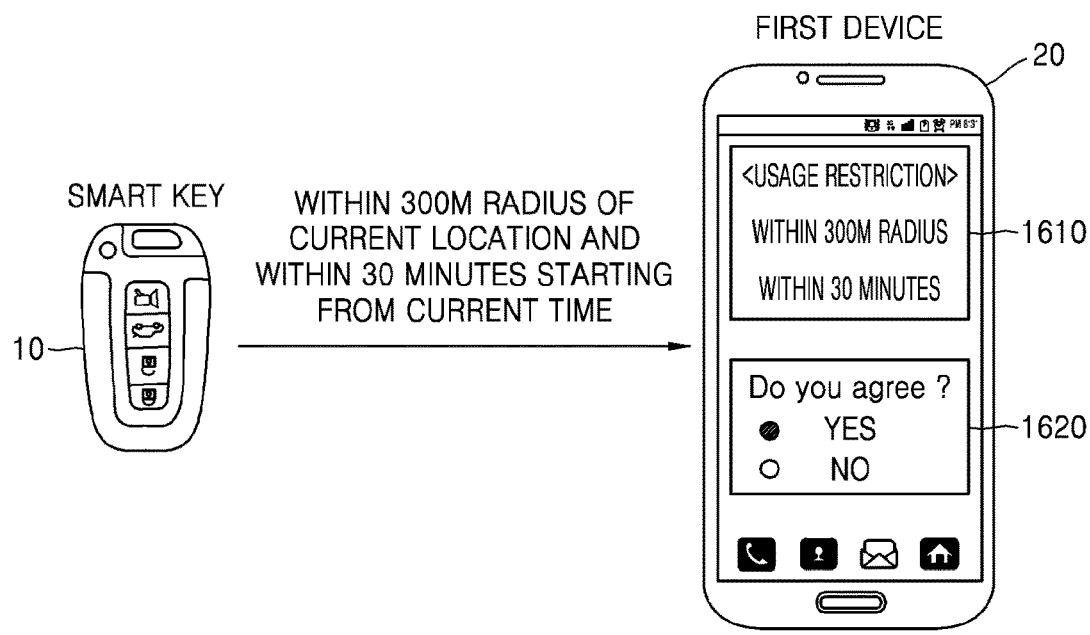
FIG. 16 is a view for explaining an example in which a first device according to an exemplary embodiment determines whether to use a preset usage restriction.

FIG. 16 is a view for explaining an example in which a first device 20 according to an exemplary embodiment determines whether to use a preset usage restriction.

A usage restriction may be previously set in the function information transmitted from the smart key 10 to the first device 20. For example, the preset usage restriction may be 'within a 300 m radius of a to-be-controlled device 40 (i.e., a location where a function capable of controlling an operation of the to-be-controlled device 40 is to be used)' and 'within 30 minutes starting from a current time (i.e., the time at which a function capable of controlling an operation of the to-be-controlled device 40 is to be used)'.

The first device 20 may enable the first user 50 to recognize details of a preset condition 1610, by outputting the preset condition 1610 to a screen thereof. The first device 20 may output, to the screen thereof, an object 1620 asking whether to use the preset condition 1610. For example, the object 1620 may be an icon, a pop-up window, or the like. At this time, when a user input representing that the preset condition 1610 is to be used has been received via the user input unit 6010, the first device 20 may determine that the preset condition 1610 is to be used.

Referring back to FIG. 15, in operation 1530, the first device 20 stores the preset usage restriction. In other words, the first device 20 stores the usage restriction received from the smart key 10, in a storage unit included therein.

In operation 1540, the first device 20 sets a usage restriction. In other words, when no usage restrictions are set in the function information received from the smart key 10 or it is determined that the preset usage restriction will not be used, the first device 20 sets a new usage restriction. For example, according to a user input received via the user input unit 6010, the first device 20 may set a usage restriction for each of the functions capable of controlling operations of the to-be-controlled device 40.

The usage restriction may be a condition that limits the second device 30 to using only some of all of the functions capable of controlling operations of the to-be-controlled device 40. Alternatively, the usage restriction may be a condition that limits the environment where the second device 30 is able to use the functions capable of controlling operations of the to-be-controlled device 40. For example, the usage restriction may include a condition that limits a period of time during which the second device 30 is allowed to use the functions capable of controlling operations of the to-be-controlled device 40. The usage restriction may also include a condition that limits a distance at which the second device 30 is allowed to use the functions capable of controlling operations of the to-be-controlled device 40. Furthermore, the usage restriction may also include a condition that limits the type of the second device 30 that is allowed to use the functions capable of controlling operations of the to-be-controlled device 40. The usage restriction may also include a condition that limits the types of functions capable of controlling operations of the to-be-controlled device 40 that are allowed to be used by the second device 30. The usage restriction may also include a condition that limits the number of times the second device 30 is allowed to use the functions capable of controlling operations of the to-be-controlled device 40.

Examples in which the first device 20 sets a usage restriction will now be described with reference to FIGS. 17-26.

Figure 17:
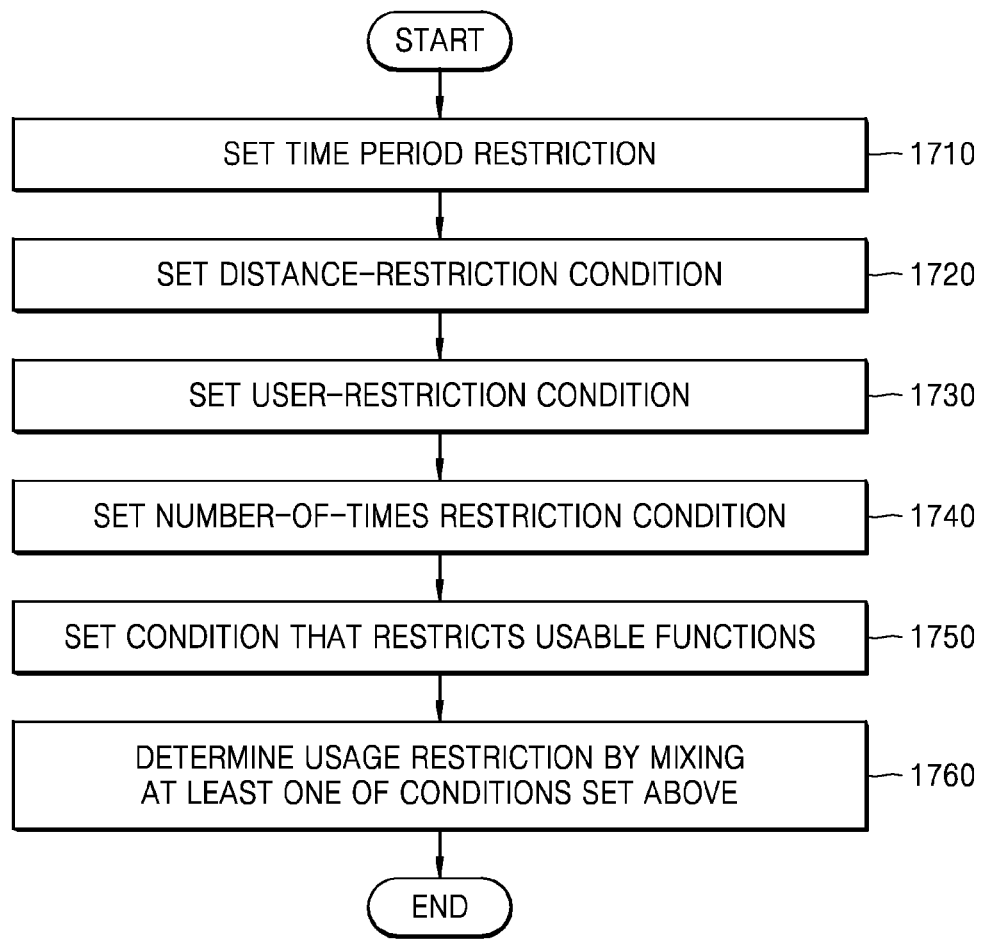
FIG. 17 is a flowchart of an example in which a first device sets a usage restriction, according to an exemplary embodiment.

FIG. 17 is a flowchart of an example in which a first device 20 sets a usage restriction, according to an exemplary embodiment.

The example of FIG. 17 includes operations serially performed by the first device 20 of FIG. 1. Thus, the above descriptions of the operations of the first device 20 of FIG. 1 may also apply to the example illustrated in FIG. 17.

In operation 1710, the first device 20 may set a time period restriction. The time period restriction may denote a condition that limits a period of time during which the second device 30 is allowed to use the functions capable of controlling operations of the to-be-controlled device 40.

For example, the time period restriction may denote a period of time starting from a time point at which function information has been transmitted to the second device 30. In this case, and by way of example, assuming that a time point at which function information has been transmitted to the second device 30 is 6:54:23 pm, Jun. 24, 2014 and a time period restriction is 10 minutes, the second device 30 may control the to-be-controlled device 40 only during a time period from 6:54:23 pm, Jun. 24, 2014 to 7:04:23 pm, Jun. 24, 2014.

As another example, the time period restriction may denote a preset certain period of time. For example, assuming that the time period restriction is a period of time ranging from 8:00:00 pm on Jun. 24, 2014 to 10:00:00 pm on Jun. 24, 2014, the second device 30 is able to control the to-be-controlled device 40 at 8:13:26 pm on Jun. 24, 2014, whereas the second device 30 is unable to control the to-be-controlled device 40 at 10:01:57 pm on Jun. 24, 2014.

An example in which the first device 20 sets a time period restriction will now be described with reference to FIG. 18.

Figure 18:
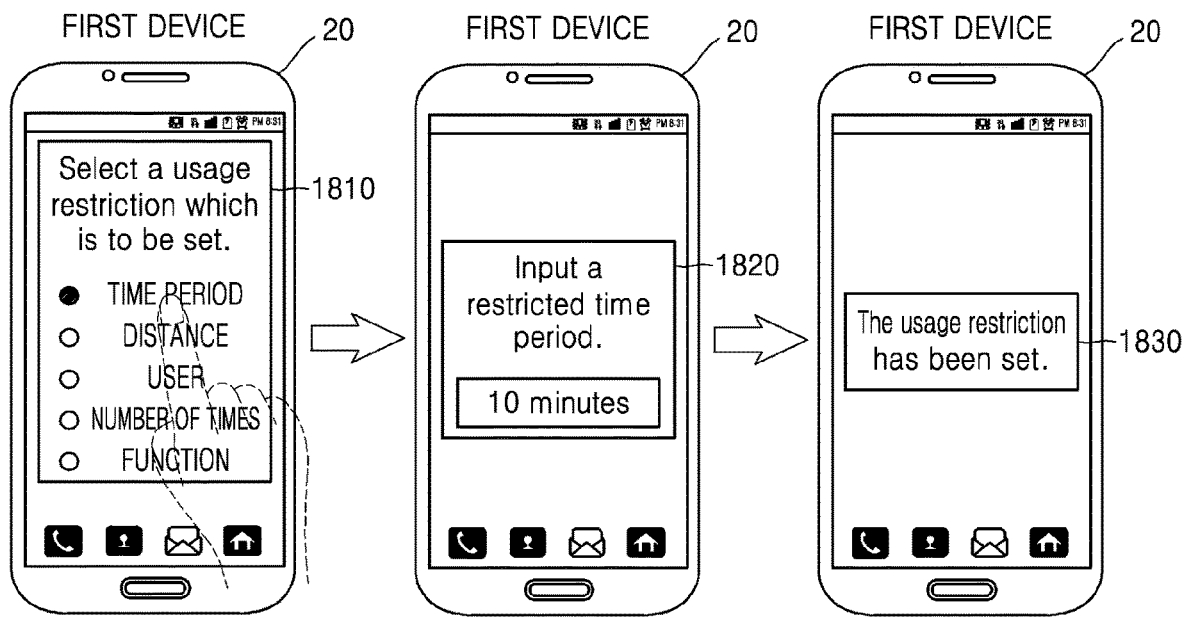
FIG. 18 is a view for explaining an example in which a first device sets a time period restriction, according to an exemplary embodiment.

FIG. 18 is a view for explaining an example in which a first device 20 sets a time period restriction, according to an exemplary embodiment.

Referring to FIG. 18, to set a time period restriction, the first device 20 outputs pop-up windows 1810, 1820, and 1830 to the screen thereof.

First, the first device 20 may output the pop-up window 1810, showing a list of settable usage restrictions, to the screen thereof. Although a time period, a distance, a user, a number of times, and a function are illustrated as the settable usage restrictions in FIG. 18, it is understood that one or more other exemplary embodiments are not limited thereto.

The first user 50 may select an item "time period" from the list of settable usage restrictions displayed on the pop-up window 1810. In response, the first device 20 may output the pop-up window 1820, via which the first user 50 can input a time period restriction, to the screen thereof.

When the first user 50 inputs a restricted time period via the user input unit 6010, the first device 20 may display the time period input by the first user 50 on the pop-up window 1820 and set the input time period as a usage restriction.

When the usage restriction has been set, the first device 20 may output the pop-up window 1830, informing that the usage restriction has been set, to the screen thereof.

Referring back to FIG. 17, in operation 1720, the first device 20 may set a distance-restriction condition. The distance-restriction condition may denote a condition that limits a distance at which the second device 30 is allowed to use the functions capable of controlling operations of the to-be-controlled device 40.

For example, the distance-restriction condition may denote an area within a preset radius of the location of the first device 20. In this case, and by way of example, assuming that the first device 20 is currently positioned at an X location and the distance-restriction condition is 100 m, the second device 30 may control the to-be-controlled device 40 only in an area within a 100 m radius of the X location.

As another example, the distance-restriction condition may denote an area within a preset radius of a location of the second device 30 at a time point when function information has been transmitted to the second device 30. In this case, and by way of example, assuming that the second device 30 is positioned at a Y location at the moment when the first device 20 transmits function information to the second device 30 and that the distance-restriction condition is 50 m, the second device 30 may control the to-be-controlled device 40 only as long as the second device 30 is within a 50 m radius of the Y location.

An example in which the first device 20 sets a distance-restriction condition will now be described with reference to FIG. 19.

Figure 19:
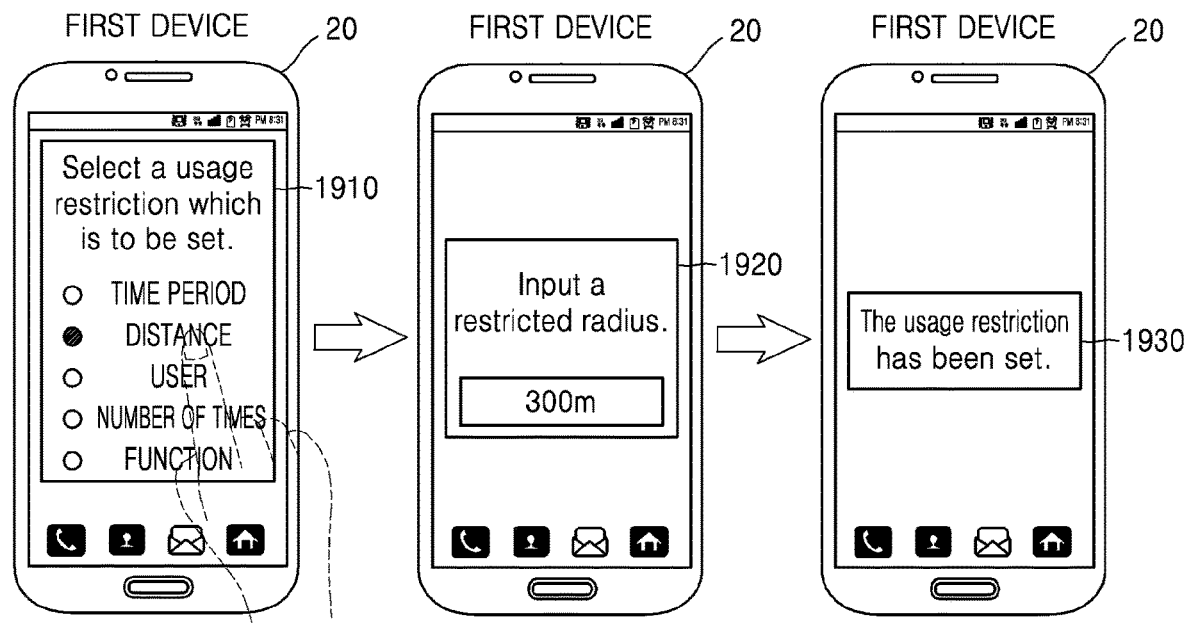
FIG. 19 is a view for explaining an example in which a first device sets a distance restriction, according to an exemplary embodiment.

FIG. 19 is a view for explaining an example in which a first device 20 sets a distance-restriction condition, according to an exemplary embodiment.

Referring to FIG. 19, to set a distance-restriction condition, the first device 20 outputs pop-up windows 1910, 1920, and 1930 to the screen thereof.

First, the first device 20 may output the pop-up window 1910, showing a list of settable usage restrictions, to the screen thereof. Although a time period, a distance, a user, a number of times, and a function are illustrated as the settable usage restrictions in FIG. 19, it is understood that one or more other exemplary embodiments are not limited thereto.

The first user 50 may select an item "distance" from the list of settable usage restrictions displayed on the pop-up window 1910, and thus the first device 20 may output the pop-up window 1920, via which the first user 50 can input a restricted radius, to the screen thereof.

When the first user 50 inputs a restricted radius via the user input unit 6010, the first device 20 may display the input radius on the pop-up window 1920 and set the input radius as the distance-restriction condition.

When such a usage restriction has been set, the first device 20 may output the pop-up window 1930, informing that the usage restriction has been set, to the screen thereof.

Referring back to FIG. 17, in operation 1730, the first device 20 may set a condition that specifies users who are allowed to use a function capable of controlling an operation of the to-be-controlled device 40.

After the function information of the smart key 10 is transmitted to the first device 30, an unwanted person may attempt to use a function capable of controlling an operation of the to-be-controlled device 40. Hence, the first device 20 sets a condition that limits users able to use a function capable of controlling an operation of the to-be-controlled device 40, and thus a person other than the second user 60 may be prevented from using the function capable of controlling an operation of the to-be-controlled device 40.

For example, the first device 20 may set a user-restriction condition by acquiring fingerprint information of the second user 60. As another example, the first device 20 may set a user-restriction condition by acquiring an ID and a password of the second user 60.

Examples in which the first device 20 may set a condition that specifies users who are allowed to use the functions capable of controlling operations of the to-be-controlled device 40 will now be described with reference to FIGS. 20 and 21.

Figure 20:
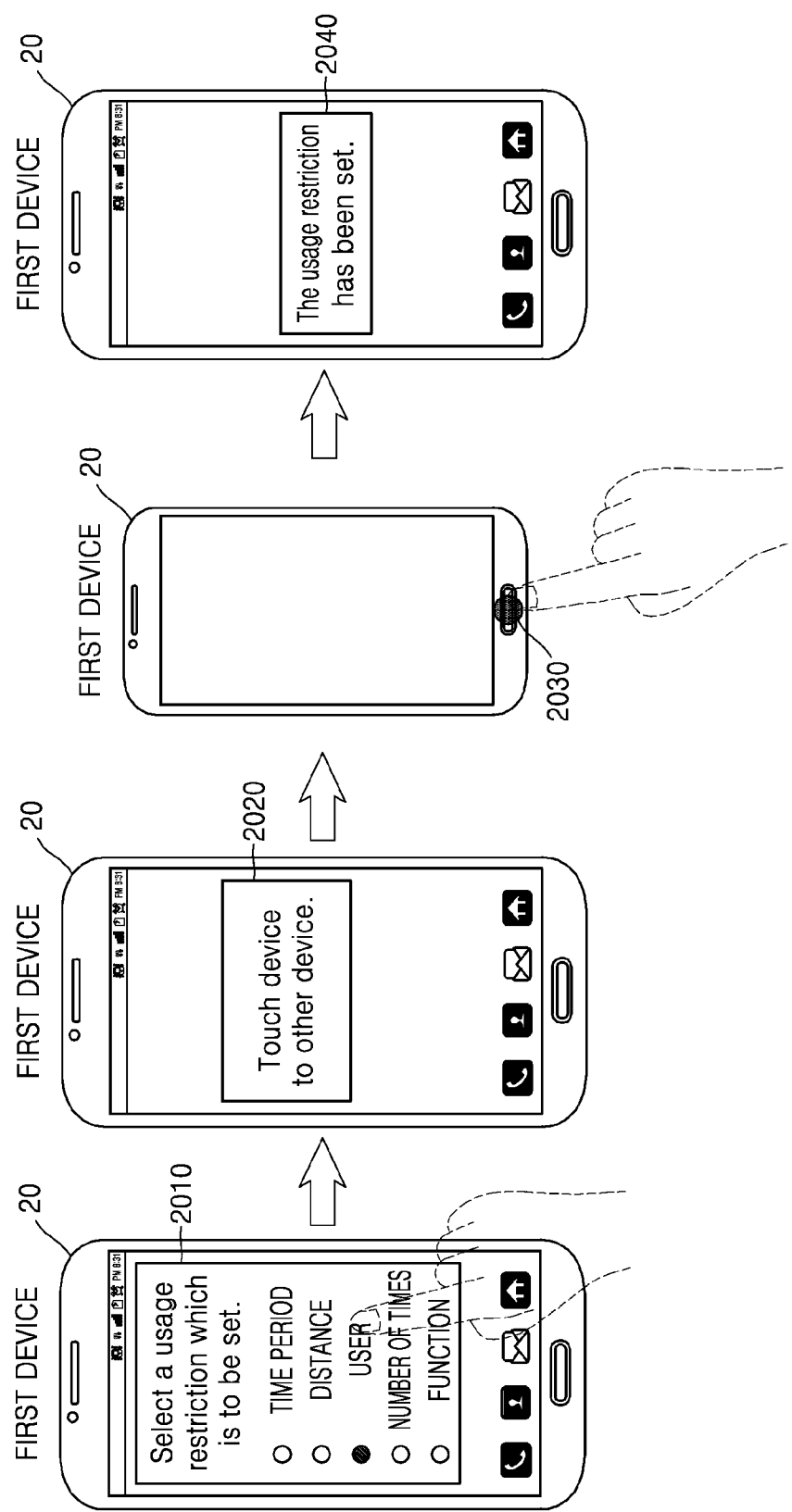
FIG. 20 is a view for explaining an example in which a first device sets a user restriction, according to an exemplary embodiment.

FIG. 20 is a view for explaining an example in which a first device 20 sets a user-restriction condition, according to an exemplary embodiment.

Referring to FIG. 20, to set a user-restriction condition, the first device 20 outputs pop-up windows 2010, 2020, and 2040 to the screen thereof.

First, the first device 20 may output the pop-up window 2010, showing a list of settable usage restrictions, to the screen thereof. Although a time period, a distance, a user, a number of times, and a function are illustrated as the settable usage restrictions in FIG. 20, it is understood that one or more other exemplary embodiments are not limited thereto.

The first user 50 may select an item "user" from the list of settable usage restrictions displayed on the pop-up window 2010, and thus the first device 20 may output the pop-up window 2020, including a message instructing the second user 60 to touch a fingerprint recognition sensor 2030, to the screen thereof.

When the second user 60 touches the fingerprint recognition sensor 2030 while the pop-up window 2020 is being displayed, the first device 20 may acquire fingerprint information of the second user 60. The first device 20 may set the user-restriction condition, based on the acquired fingerprint information.

When such a usage restriction has been set, the first device 20 may output the pop-up window 2040, informing that the usage restriction has been set, to the screen thereof.

Figure 21:
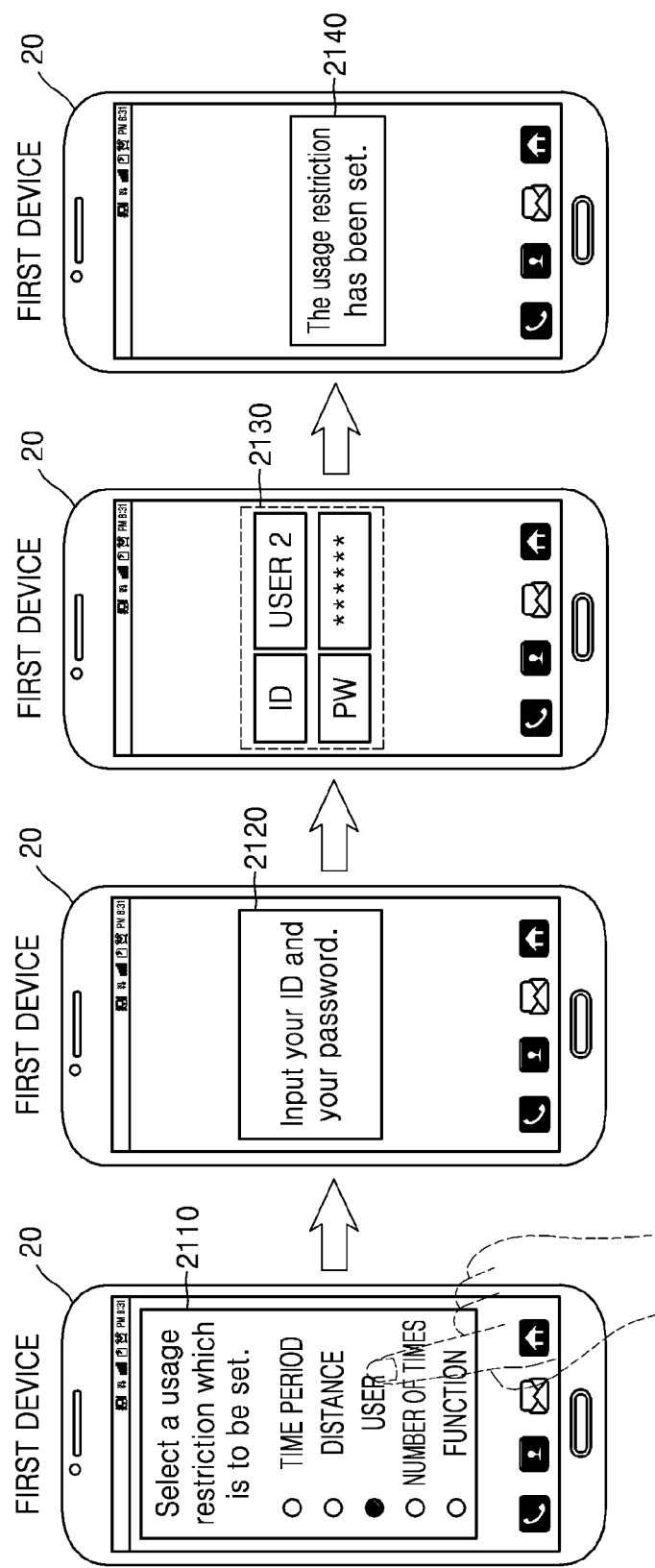
FIG. 21 is a view for explaining another example in which a first device sets a user restriction, according to an exemplary embodiment.

FIG. 21 is a view for explaining another example in which a first device 20 sets a user-restriction condition, according to an exemplary embodiment.

Referring to FIG. 21, to set a condition that restricts second devices 30, the first device 20 outputs pop-up windows 2110, 2120, 2130, and 2140 to the screen thereof.

First, the first device 20 may output the pop-up window 2110, showing a list of settable usage restrictions, to the screen thereof. Although a time period, a distance, a user, a number of times, and a function are illustrated as the settable usage restrictions in FIG. 21, it is understood that one or more other exemplary embodiments are not limited thereto.

The first user 50 may select an item "user" from the list of settable usage restrictions displayed on the pop-up window 2110, and thus the first device 20 may output the pop-up window 2120, including a message instructing the second user 60 to input his or her ID and password, to the screen thereof.

When the second user 60 inputs his or her ID and password to the pop-up window 2130, the first device 20 may set a user-restriction condition based on the input ID and password.

When such a usage restriction has been set, the first device 20 may output the pop-up window 2140, informing that the usage restriction has been set, to the screen thereof.

Referring back to FIG. 17, in operation 1740, the first device 20 may set a number-of-times restriction condition. The number-of-times restriction condition may denote a condition that limits the number of times the second device 30 is allowed to use the functions capable of controlling operations of the to-be-controlled device 40.

For example, assuming that the number-of-times restriction condition is two times, the second device 30 is able to control the to-be-controlled device 40 twice.

An example in which the first device 20 sets a number-of-times restriction condition will now be described with reference to FIG. 22.

Figure 22:
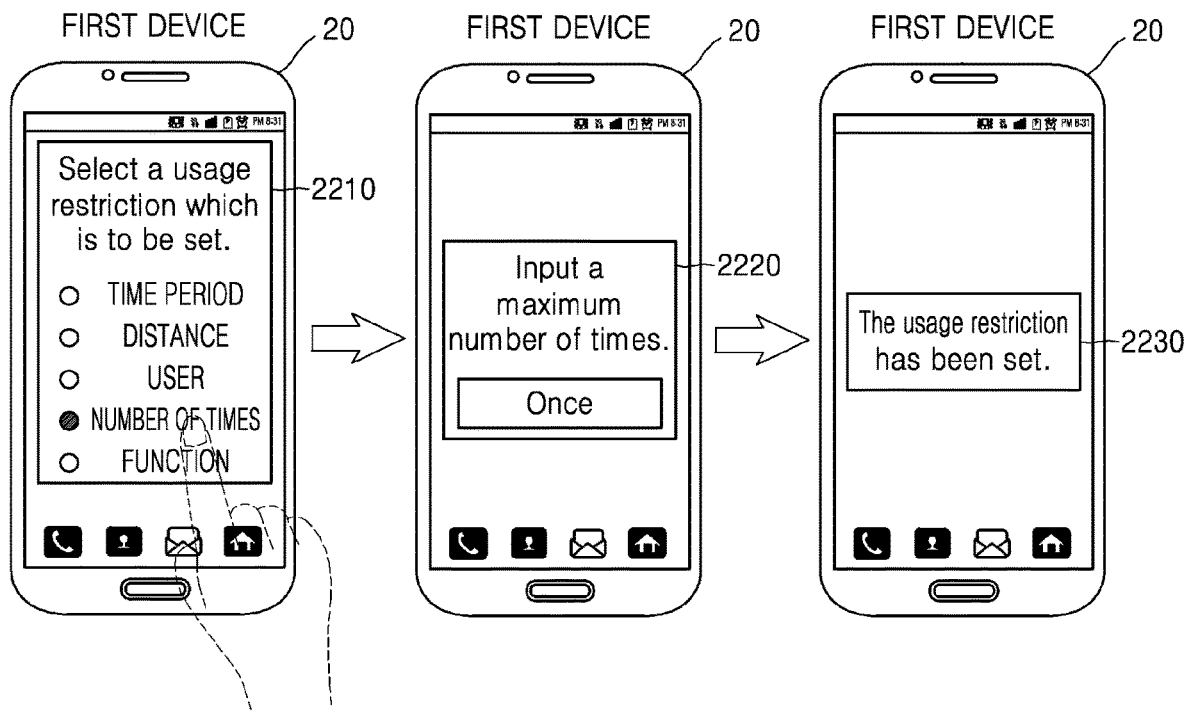
FIG. 22 is a view for explaining an example in which a first device sets a number-of-times restriction, according to an exemplary embodiment.

FIG. 22 is a view for explaining an example in which a first device 20 sets a number-of-times restriction condition, according to an exemplary embodiment.

Referring to FIG. 22, to set a number-of-times restriction condition, the first device 20 outputs pop-up windows 2210, 2220, and 2230 to the screen thereof.

First, the first device 20 may output the pop-up window 2210, showing a list of settable usage restrictions, to the screen thereof. Although a time period, a distance, a user, a number of times, and a function are illustrated as the settable usage restrictions in FIG. 22, it is understood that one or more other exemplary embodiments are not limited thereto.

The first user 50 may select an item "number of times" from the list of settable usage restrictions displayed on the pop-up window 2210, and thus the first device 20 may output the pop-up window 2220, via which the first user 50 can input a restricted number of times, to the screen thereof.

When the first user 50 inputs a restricted number of times via the user input unit 6010, the first device 20 may display the input number of times on the pop-up window 2220 and set the input number of times as a usage restriction.

When the usage restriction has been set, the first device 20 may output the pop-up window 2230, informing that the usage restriction has been set, to the screen thereof.

Referring back to FIG. 17, in operation 1750, the first device 20 may set a condition that restricts usable functions. The usable functions denote functions that the second device 30 is allowed to use from among all of the functions of the smart key 10.

For example, it is assumed that the to-be-controlled device 40 is a vehicle and a function of opening or closing a door of the vehicle, a function of starting the vehicle, a function of turning on or off the headlights, and a function of opening or closing the trunk are included in the functions capable of controlling operations of the to-be-controlled device 40. In this case, when a function restriction set by the first device 20 limits the second device 30 to using only a function of starting the vehicle, the second device 30 is unable to open or close a door of the vehicle, turn on or off the headlights, and open or close the trunk.

An example in which the first device 20 sets a function restriction will now be described with reference to FIG. 23.

Figure 23:
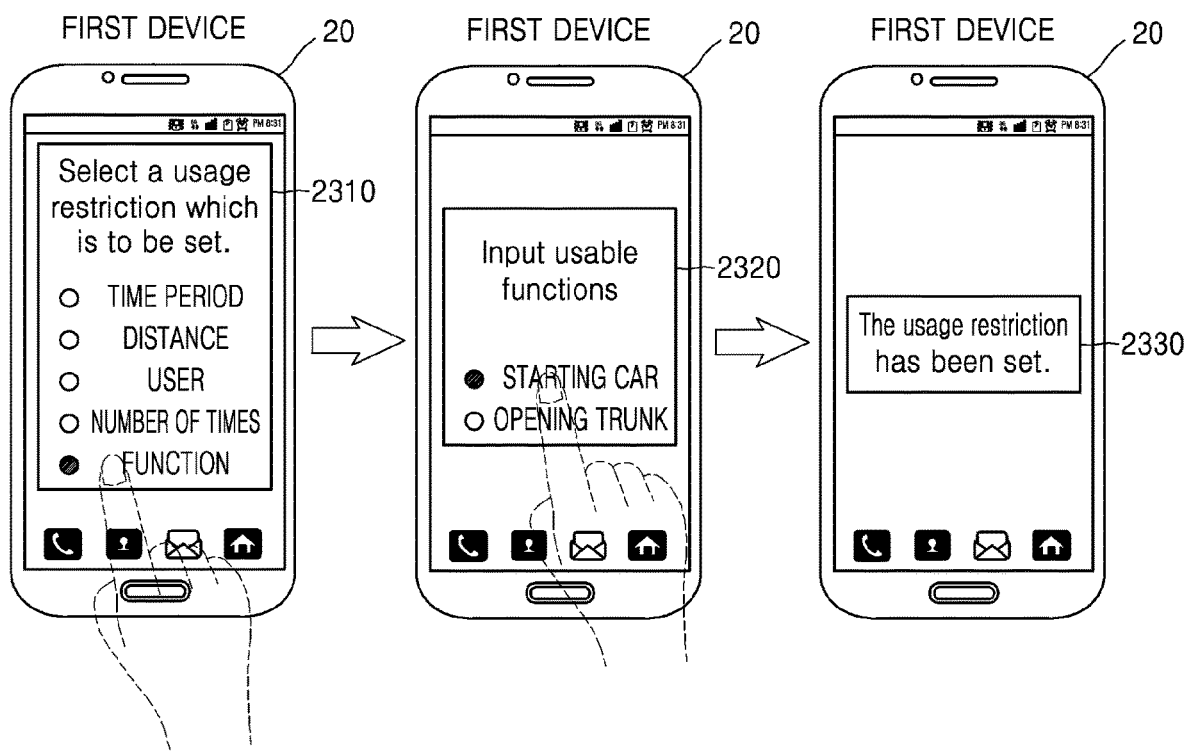
FIG. 23 is a view for explaining an example in which a first device sets a function restriction, according to an exemplary embodiment.

FIG. 23 is a view for explaining an example in which a first device 20 sets a function restriction, according to an exemplary embodiment.

Referring to FIG. 23, to set a function restriction, the first device 20 outputs pop-up windows 2310, 2320, and 2330 to the screen thereof.

First, the first device 20 may output the pop-up window 2310, showing a list of settable usage restrictions, to the screen thereof. Although a time period, a distance, a user, a number of times, and a function are illustrated as the settable usage restrictions in FIG. 23, it is understood that one or more other exemplary embodiments are not limited thereto.

The first user 50 may select an item "function" from the list of settable usage restrictions displayed on the pop-up window 2310, and thus the first device 20 may output the pop-up window 2320, via which the first user 50 can input usable functions, to the screen thereof.

When the first user 50 selects a function 'starting the vehicle' from among the functions displayed on the pop-up window 2320, the first device 20 may set a usage restriction so that the second device 30 may use only the function of starting the vehicle from among the functions capable of controlling operations of the to-be-controlled device 40.

When the usage restriction has been set, the first device 20 may output the pop-up window 2330, informing that the usage restriction has been set, to the screen thereof.

Referring back to FIG. 17, in operation 1760, the first device 20 may determine a usage restriction by combining at least one of the conditions set in operations 1710-1750. In other words, each of the conditions set in operations 1710-1750 may constitute the usage restriction, or at least two of the conditions set in operations 1710-1750 may be combined to constitute the usage restriction.

When a plurality of smart keys 10 transmit function information to the first device 20, the first device 20 may set usage restrictions corresponding to respective functions of the smart keys 10 that are capable of controlling operations of the to-be-controlled devices 40.

An example in which the first device 20 sets a usage restriction with respect to a function of each of a plurality of smart keys will now be described with reference to FIG. 24. An example in which the first device 20 sets a usage restriction by combining at least two conditions will now be described with reference to FIG. 25. An example in which the first device 20 sets a usage restriction with respect to a function of each of a plurality of smart keys by combining at least two conditions will now be described with reference to FIG. 26.

Figure 24:
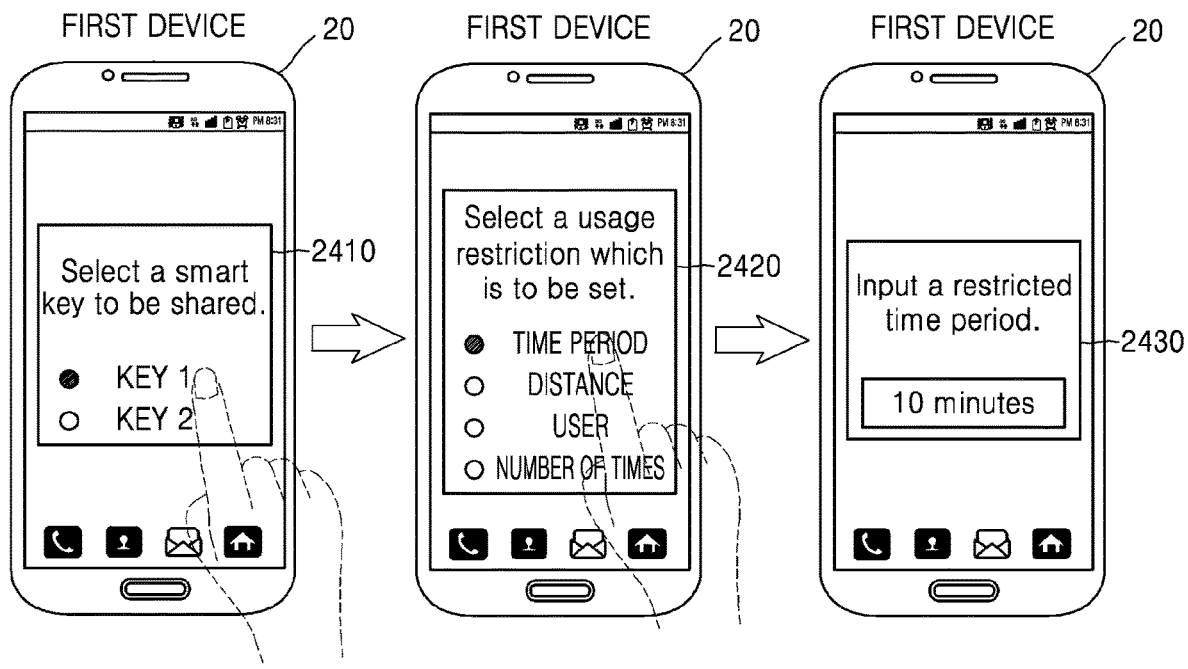
FIG. 24 is a view for describing an example in which a first device sets a usage restriction for a function of each of a plurality of smart keys, according to an exemplary embodiment.

FIG. 24 is a view for describing an example in which a first device 20 sets a usage restriction condition with respect to a function of each of a plurality of smart keys, according to an exemplary embodiment.

Referring to FIG. 24, to set a usage restriction with respect to a function of each of a plurality of smart keys, the first device 20 outputs pop-up windows 2410, 2420, and 2430 to the screen thereof.

First, the first device 20 may output, to the screen thereof, the pop-up window 2410, showing a list of smart keys that transmitted respective function information thereof to the first device 20. For example, assuming that a first smart key and a second smart key having transmitted their function information to the first device 20 have ID values of 'KEY 1' and 'KEY 2', respectively, the ID values 'KEY 1' and 'KEY 2' may be displayed on the pop-up window 2410. Furthermore, the pop-up window 2410 may display respective names designated for the smart keys by the first user 50.

The first user 50 may select the ID value "KEY1" from among the ID values of the smart keys displayed on the pop-up window 2410, and thus the first device 20 may output the pop-up window 2420, showing a list of settable usage restrictions, to the screen thereof.

The first user 50 may select an item "time period" from the list of settable usage restrictions displayed on the pop-up window 2420, and thus the first device 20 may output the pop-up window 2430, via which the first user 50 can input a restricted time period, to the screen thereof.

When the first user 50 inputs a restricted time period via the user input unit 6010, the first device 20 may display the input time period on the pop-up window 2430 and set the input time period as a usage restriction.

Accordingly, the first device 20 may set a usage restriction including a time limit with respect to a function of the first smart key.

Figure 25:
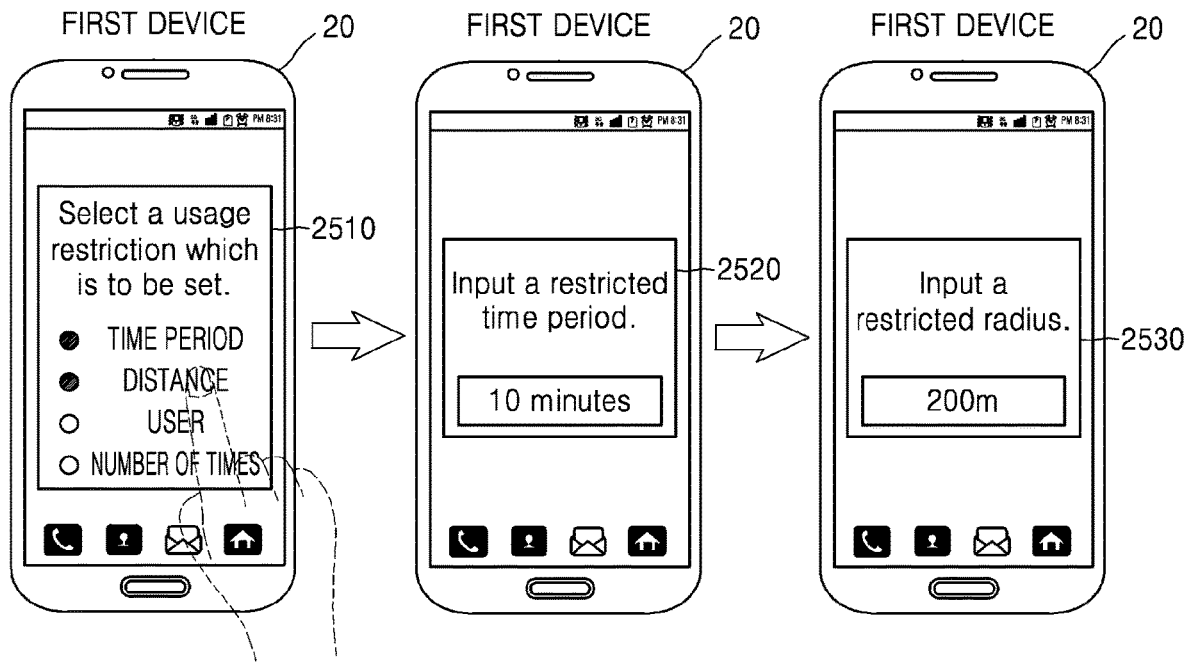
FIG. 25 is a view for explaining an example in which a first device sets a usage restriction by combining at least two conditions, according to an exemplary embodiment.

FIG. 25 is a view for explaining an example in which a first device 20 sets a usage restriction condition by combining at least two conditions, according to an exemplary embodiment.

Referring to FIG. 25, to set a usage restriction, the first device 20 outputs pop-up windows 2510, 2520, and 2530 to the screen thereof.

First, the first device 20 may output the pop-up window 2510, showing a list of settable usage restrictions, to the screen thereof. The first user 50 may select items "time period" and "distance" from the list of settable usage restrictions displayed on the pop-up window 2510, and thus the first device 20 may sequentially output the pop-up window 2520, via which the first user 50 can enter an input limiting the time period, and the pop-up window 2530, via which the first user 50 can enter an input limiting the radius, to the screen thereof. Furthermore, the first device 20 may output a pop-up window, via which the first user 50 can enter both an input limiting a time period and an input limiting the radius, to the screen thereof.

When the first user 50 enter an input limiting the time period via the user input unit 6010, the first device 20 may display the input time period on the pop-up window 2520 and set the input time period as a usage restriction. When the first user 50 enters an input limiting the radius via the user input unit 6010, the first device 20 may display the input radius on the pop-up window 2530 and set the input radius as a usage restriction.

Accordingly, the first device 20 may set a usage restriction including a time limit and a distance limit.

Figure 26:
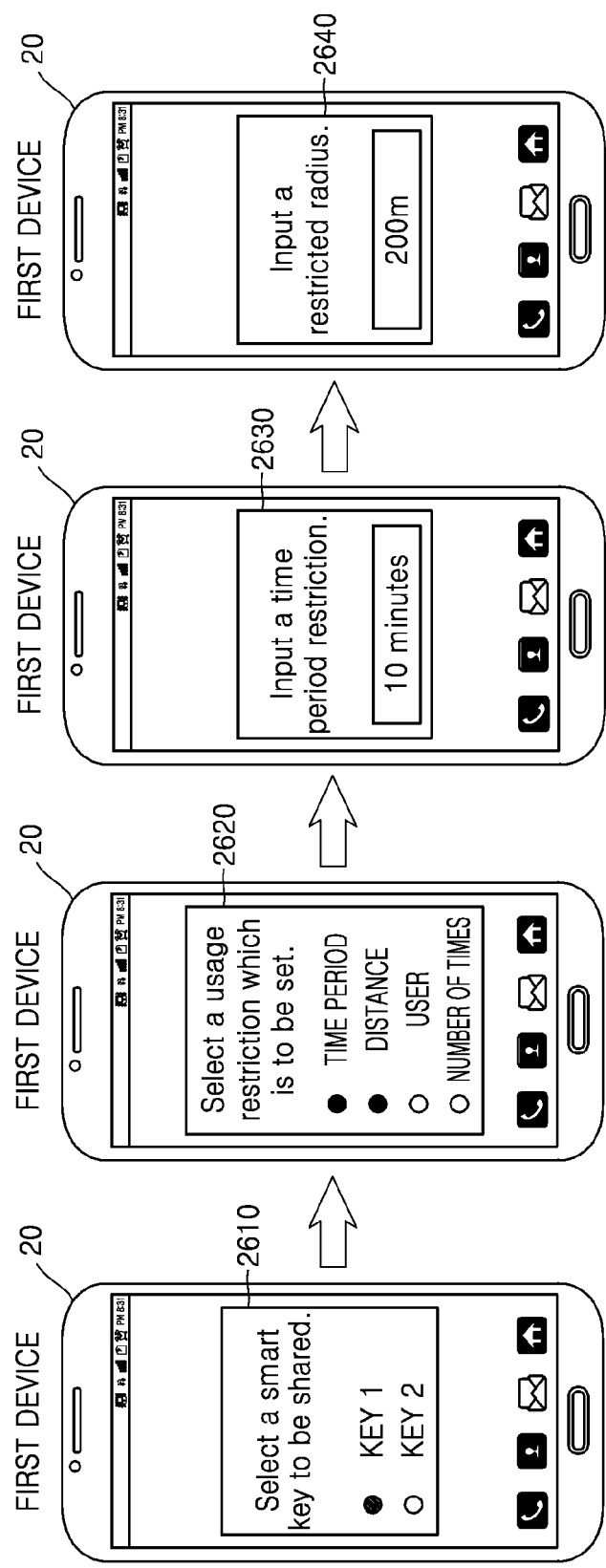
FIG. 26 is a view for describing an example in which a first device sets a usage restriction with respect to a function of each of a plurality of smart keys by combining at least two conditions, according to an exemplary embodiment.

FIG. 26 is a view for describing an example in which a first device 20 sets a usage restriction condition with respect to a function of each of a plurality of smart keys by combining at least two conditions, according to an exemplary embodiment.

Referring to FIG. 26, to set a usage restriction, the first device 20 outputs pop-up windows 2610, 2620, 2630, and 2640 to the screen thereof.

First, the first device 20 may output, to the screen thereof, the pop-up window 2610, showing a list of smart keys that transmitted respective function information thereof to the first device 20. For example, assuming that a first smart key and a second smart key having transmitted their function information to the first device 20 have ID values of 'KEY 1' and 'KEY 2', respectively, the ID values of 'KEY 1' and 'KEY 2' may be displayed on the pop-up window 2610. Furthermore, the pop-up window 2610 may display respective names designated for the smart keys by the first user 50.

The first user 50 may select the ID value "KEY1" from among the ID values of the smart keys displayed on the pop-up window 2610, and thus the first device 20 may output the pop-up window 2620, displaying a list of settable usage restrictions, to the screen thereof.

The first user 50 may select items "time period" and "distance" from the list of settable usage restrictions displayed on the pop-up window 2620, and thus the first device 20 may sequentially output the pop-up window 2630, via which the first user 50 can enter an input limiting the time period, and the pop-up window 2640, via which the first user 50 can enter an input limiting the radius, to the screen thereof. Furthermore, the first device 20 may output a pop-up window, via which the first user 50 can enter both an input limiting the time period and an input limiting the radius, to the screen thereof.

When the first user 50 enters an input limiting the time period via the user input unit 6010, the first device 20 may display the input time period on the pop-up window 2630 and set the input time period as a usage restriction. When the first user 50 enters an input limiting the radius via the user input unit 6010, the first device 20 may display the input radius on the pop-up window 2640 and set the input radius as a usage restriction.

Accordingly, the first device 20 may set a usage restriction including a time limit and a distance limit, with respect to a function of the first smart key.

Referring back to FIG. 15, in operation 1550, the first device 20 stores the preset usage restriction. For example, the first device 20 may store a usage restriction in a storage unit thereof.

An example in which the first device 20 stores set usage restrictions will now be described with reference to FIGS. 27 and 28.

Figure 27:
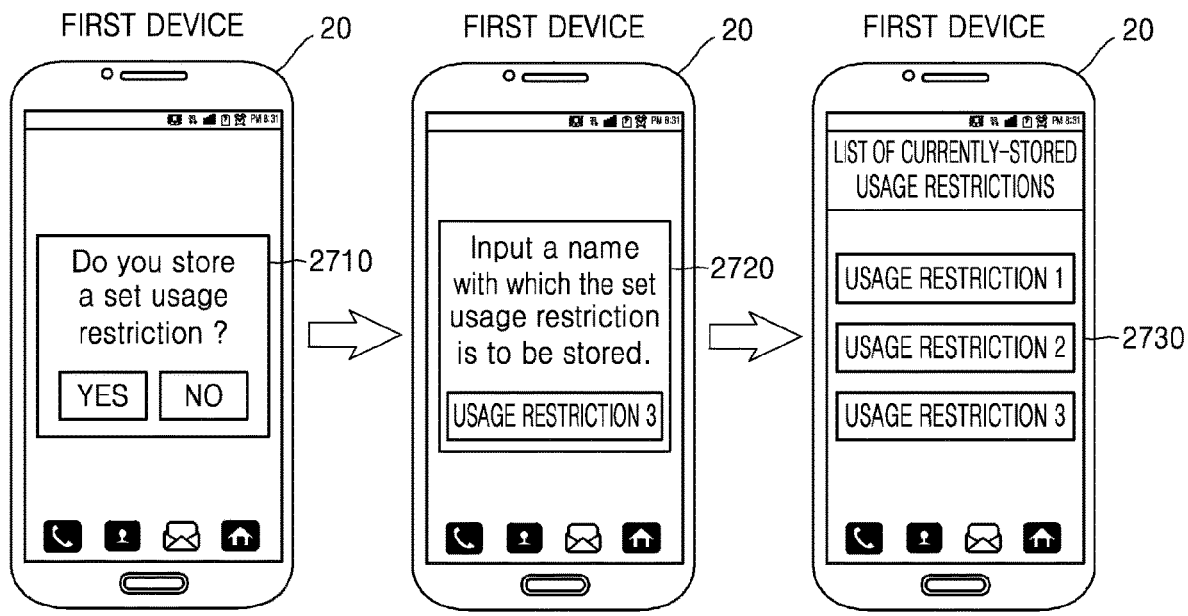
FIG. 27 is a view for explaining an example in which a first device stores set usage restrictions, according to an exemplary embodiment.

FIG. 27 is a view for explaining an example in which a first device 20 stores set usage restrictions, according to an exemplary embodiment.

Referring to FIG. 27, to set usage restrictions, the first device 20 outputs pop-up windows 2710, 2720, and 2730 to the screen thereof.

First, the first device 20 may output the pop-up window 2710, asking whether to store a set usage restriction, to the screen thereof. When the first user 50 selects 'YES', the first device 20 may output the pop-up window 2720 for receiving an input of a name with which the set usage restriction is to be stored.

When 'usage restriction 3' is input according to a user input received via the user input unit 6010, the first device 20 stores the set usage restriction under the name 'usage restriction 3'. When the storage of the set usage restriction has been completed, the first device 20 may output a list 2730 of currently-stored usage restrictions to the screen thereof. Thereafter, when the first user 50 transmits function information of the smart key 10 to the second device 30, the first user 50 may select one set usage restriction from the list 2730 output to the screen of the first device 20 and thus transmit function information including the selected set usage restriction to the second device 30.

Figure 28:
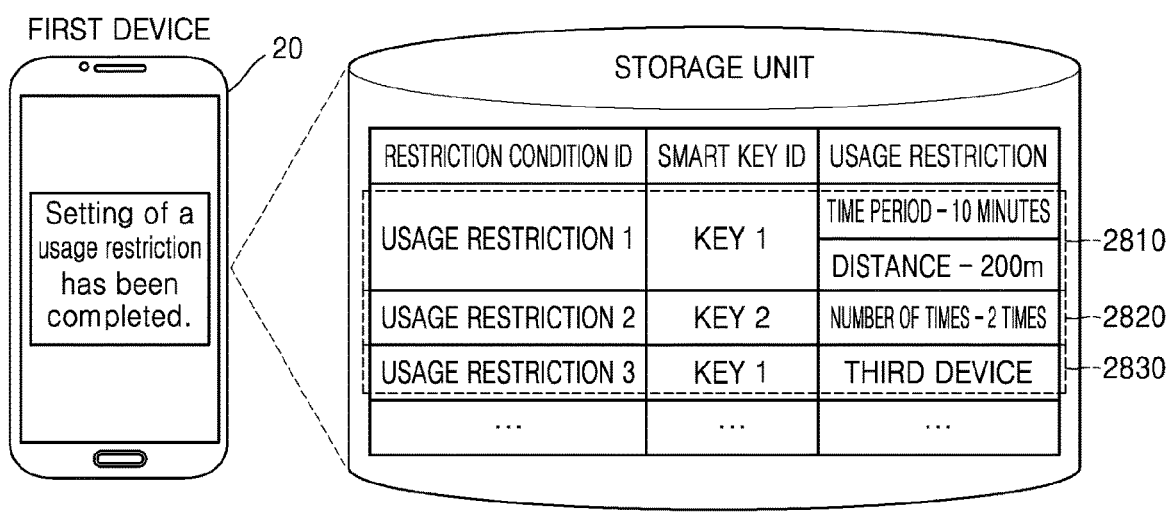
FIG. 28 is a view for explaining an example in which a first device stores set usage restrictions in a storage unit thereof, according to an exemplary embodiment.

FIG. 28 is a view for explaining an example in which a first device 20 stores set usage restrictions in a storage unit thereof, according to an exemplary embodiment.

Referring to FIG. 28, the first device 20 and a storage unit (e.g., storage) included in the first device 20 are illustrated. The storage unit may correspond to the memory 6070, which will be described below with reference to FIG. 63, and may be a storage device separately included in the first device 20.

The first device 20 may store usage restrictions in the storage unit thereof. At this time, the first device 20 may map the ID values of smart keys 10 with usage restrictions of the smart keys 10 as indicated by reference numerals 2810, 2820, and 2830, and store a result of the mapping. Hence, even when receiving pieces of function information from a plurality of smart keys, the first device 20 may manage the pieces of function information of the plurality of smart keys such that usage restriction conditions are included in the pieces of function information. The first device 20 may store and manage a plurality of usage restrictions 2810 and 2830 set with respect to one smart key such that the usage restrictions 2810 and 2830 may be separated from each other.

As described above with reference to operations 760 and 770 of FIG. 7 and operations 1260 and 1270 of FIG. 12, the first device 20 may transmit the ID value and function information of each smart key to the second device 30, and the second device 30 may store the received ID values and the received function information.

For example, the first device 20 may transmit the ID value and the function information of the smart key 10 to the second device 30 via wired and/or wireless communications. As another example, the first device 20 may transmit an ID value and function information of a smart key to a server, and the server may transmit the ID value and the function information of the smart key to the second device 30. As another example, when a hardware device (for example, a memory device) separated from the first device 20 is combined with the second device 30, the second device 30 may receive function information from the first device 20. As another example, the first user 50 may give a hardware device (for example, a portion of the smart key 10) separated from the smart key 10 to the second user 60, and the second user 60 may control the to-be-controlled device 40 by using the received hardware device.

Examples in which the first device 20 transmits an ID value and function information of a smart key to the second device 30 and the second device 30 stores the received ID value and function information will now be described below with reference to FIGS. 29-34.

Figure 29:
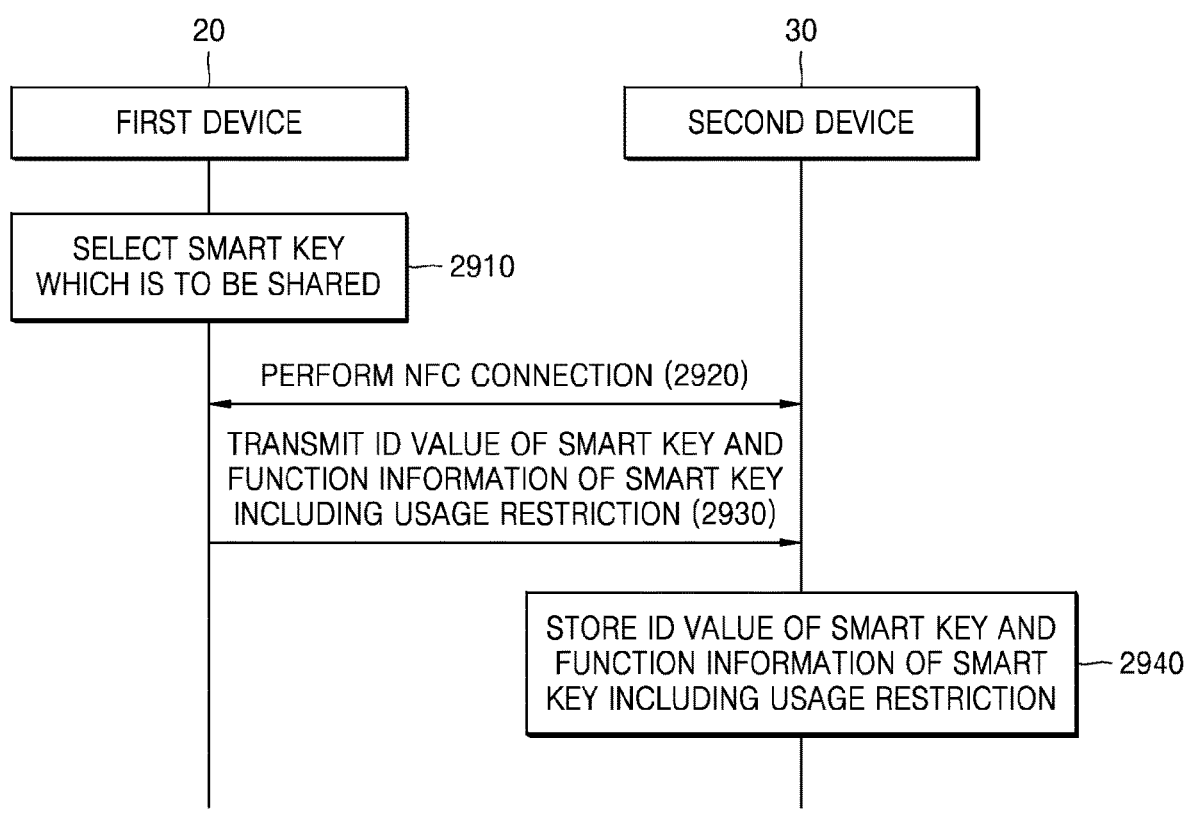
FIGS. 29 and 30 are views for explaining an example in which a first device transmits an ID value and function information of a smart key to a second device and the second device stores the received ID value and function information, according to an exemplary embodiment.
Figure 30:
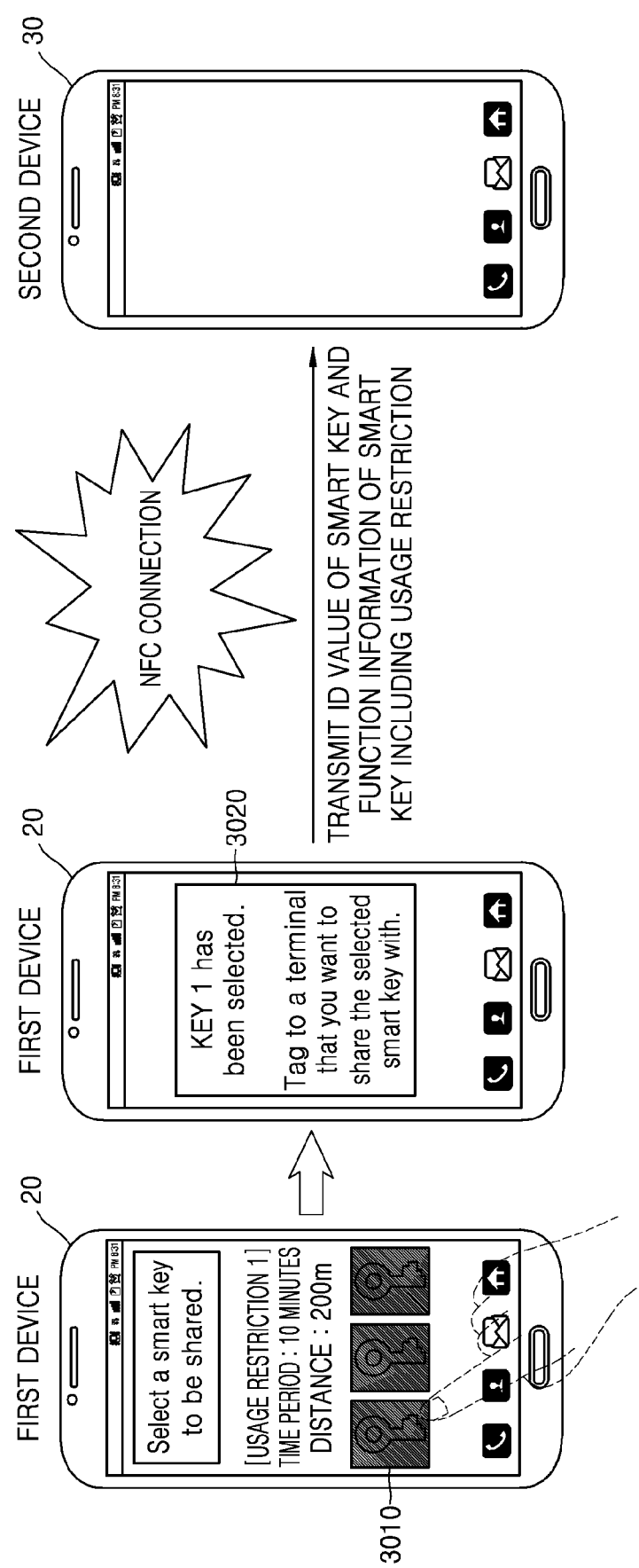

FIGS. 29 and 30 are views for explaining an example in which a first device 20 transmits an ID value and function information of a smart key 10 to a second device 30 and the second device 30 stores the received ID value and function information, according to an exemplary embodiment.

As described above with reference to FIG. 1, the first device 20 may transmit the ID value and the function information of the smart key 10 to the second device 30 via wired and/or wireless communications. The wired and/or wireless communications between the first device 20 and the second device 30 of FIGS. 29 and 30 may be the same as or similar to the wired and/or wireless communications between the smart key 10 and the first device 20 of FIG. 1. Hence, the examples of the wired and/or wireless communications between the smart key 10 and the first device 20 of FIG. 1 may also apply to the wired and/or wireless communications between the first device 20 and the second device 30 of FIGS. 29 and 30. For example, the first device 20 may transmit the ID value and the function information of the smart key 10 to the second device 30 by establishing an NFC connection between the second device 30 and the first device 20.

FIG. 29 is a flowchart of an example in which, once an NFC connection has been established between the second device 30 and the first device 20, the first device 20 transmits the ID value and the function information of the smart key 10 to the second device 30.

The example of FIG. 29 includes operations serially performed by the first device 20 and the second device 30 of FIG. 1. Thus, the above descriptions of the operations of the first device 20 and the second device 30 of FIG. 1 may also apply to the example illustrated in FIG. 29.

In operation 2910, the first device 20 may select a smart key 10, the function information of which is to be shared. In other words, when the first device 20 stores pieces of function information of a plurality of smart keys, the first device 20 may select a smart key corresponding to function information that is to be transmitted to the second device 30, from among the plurality of smart keys. If the first device 20 stores function information of a single smart key, operation 2910 may be omitted.

In operation 2920, the second device 30 is NFC tagged or connected to the first device 20.

In operation 2930, the first device 20 transmits an ID value of the smart key 10 and function information of the smart key 10 to the second device 30. The function information that is transmitted to the second device 30 may include a usage restriction.

In operation 2940, the second device 30 stores the ID value and the function information received from the first device 20.

FIG. 30 illustrates an example in which the operations illustrated in FIG. 29 are performed.

When the first user 50 clicks a smart key icon 3010 output to the screen of the first device 20, the first device 20 may output a pop-up window 3020 including a message requesting whether to establish an NFC connection. In the present example, it is assumed that a usage restriction has already been set and stored for the selected smart key 10.

When the second device 30 is NFC tagged to the first device 20 while the pop-up window 3020 requesting NFC connection is being displayed, the first device 20 transmits the ID value and the function information of the selected smart key 10 to the second device 30. The second device 30 may store the received ID value and the received function information.

Figure 31:
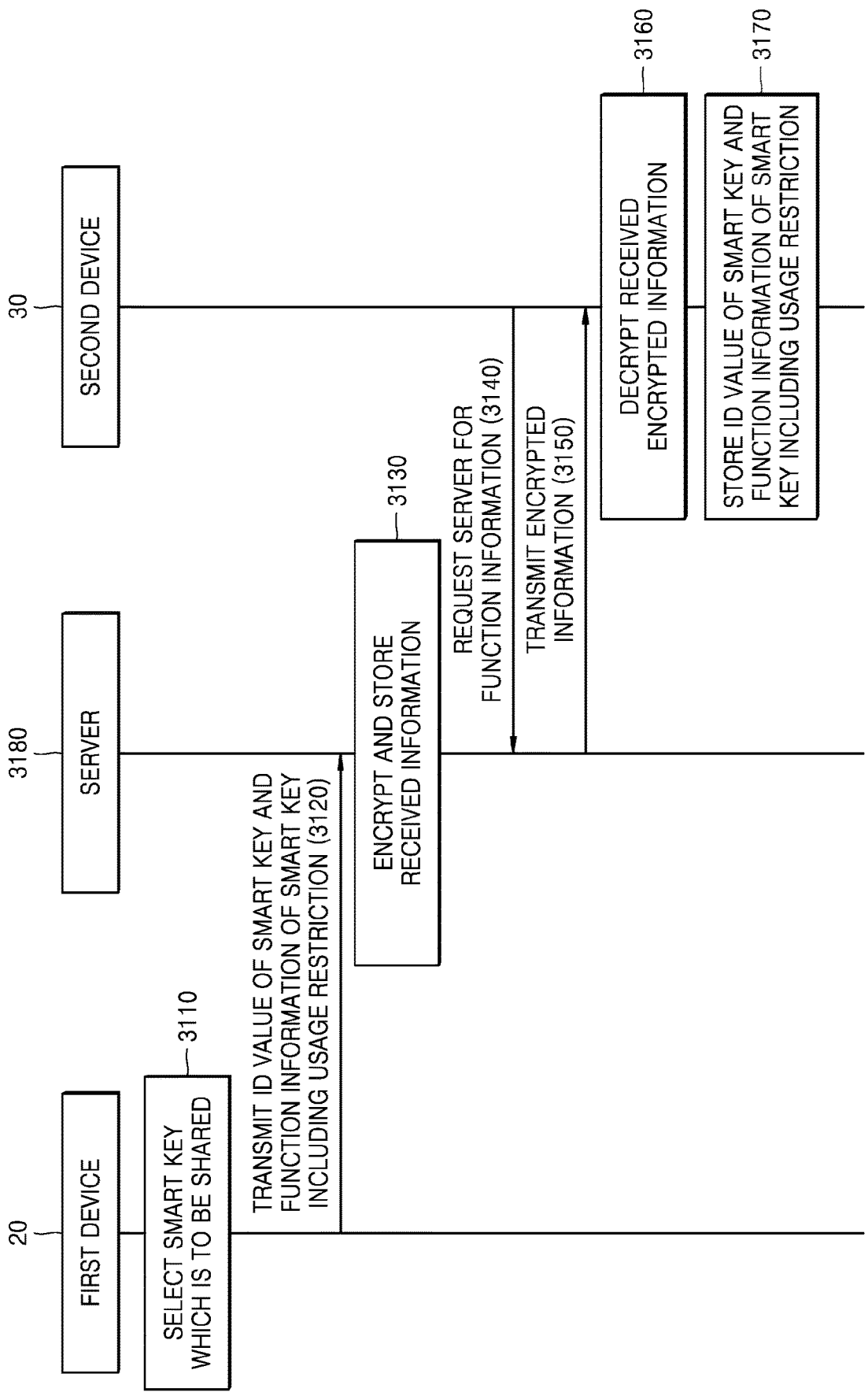
FIGS. 31 and 32 are views for explaining another example in which a first device transmits an ID value and function information of a smart key to a second device and the second device stores the received ID value and function information, according to an exemplary embodiment.
Figure 32:
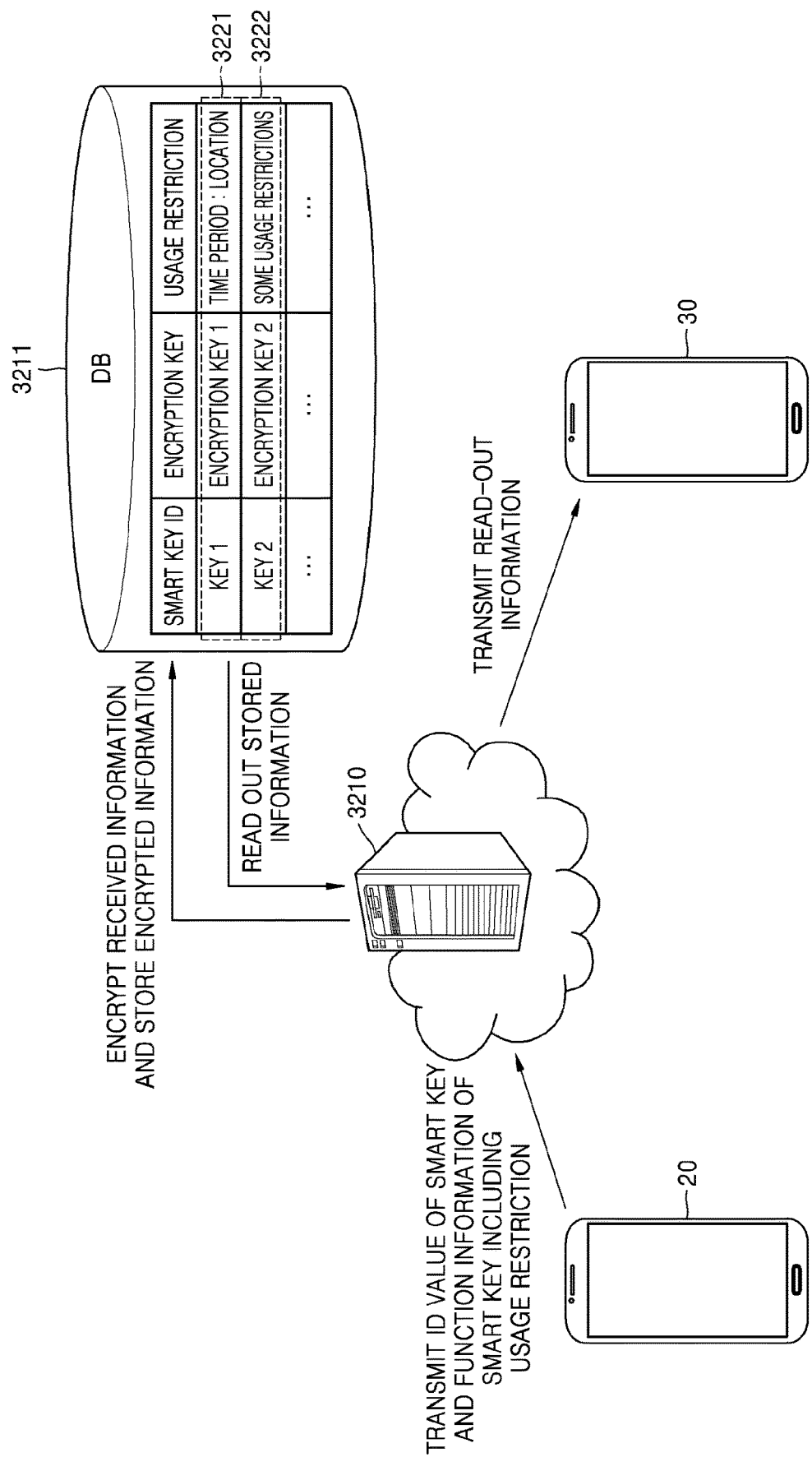

FIGS. 31 and 32 are views for explaining another example in which a first device 20 transmits an ID value and function information of a smart key 10 to a second device 30 and the second device 30 stores the received ID value and function information, according to an exemplary embodiment.

As above with reference to operation 760 of FIG. 7 and operation 1260 of FIG. 12, the first device 20 may directly transmit the ID value and the function information of the smart key 10 to the second device 30.

Alternatively, as will be described below with reference to FIGS. 31 and 32, the first device 20 may transmit the ID value and the function information of the smart key 10 to the second device 30 via a server 3180. For example, the first device 20 may transmit the ID value and the function information of the smart key 10 to the server 3180, and the server 3180 may transmit the ID value and the function information received from the first device 20 to the second device 30.

FIG. 31 is a flowchart of an example in which the first device 20 transmits the ID value and the function information of the smart key 10 to the second device 30 via the server 3180.

In operation 3110, the first device 20 may select a smart key 10, the function information of which is to be shared. In other words, when the first device 20 stores pieces of function information of a plurality of smart keys, the first device 20 may select a smart key corresponding to function information that is to be transmitted to the second device 30, from among the plurality of smart keys. If the first device 20 stores function information of a single smart key, operation 2910 may be omitted.

In operation 3120, the first device 20 transmits the ID value of the smart key 10 and the function information of the smart key 10 to the server 3180. The function information that is transmitted to the server 3180 may include a usage restriction.

In operation 3130, the server 3180 stores information (e.g., the ID value and the function information) received from the first device 20. In this case, the server 3180 may encrypt and store the information received from the first device 20. For example, the server 3180 may encrypt the ID value and the function information by using a symmetric-key algorithm or an asymmetric-key algorithm.

If the server 3180 does not encrypt the ID value and the function information received from the first device 20, operation 3160, which will be described below, may be omitted.

In operation 3140, the second device 30 requests the server 3180 for the function information of the smart key 10. For example, the second device 30 may request the server 3180 to transmit the ID value of the smart key 10 and the function information of the smart key 10, based on a request of the second user 60 received via the user input unit 6010.

Even if the second device 30 has not sent a request to the server 3180 for the function information of the smart key 10, the server 3180 may automatically transmit (for example, push) the ID value and the function information of the smart key 10 to the second device 30. For example, when the first device 20 has transmitted the ID value and the function information of the smart key 10 to the server 3180, the server 3180 may automatically transmit the ID value and the function information of the smart key 10 to the second device 30, even when no request has been sent by the second device 30.

In operation 3150, the server 3180 transmits encrypted information (i.e., an encrypted ID value and encrypted function information) to the second device 30. As described above with reference to operation 3130, when the server 3180 does not encrypt the ID value and the function information, the server 3180 may transmit the ID value and the function information received from the first device 20 to the second device 30 without any modification thereto.

In operation 3160, the second device 30 decrypts the encrypted information received from the server 3180. As described above with reference to operation 3130, when the server 3180 does not encrypt the ID value and the function information, operation 3160 may be omitted.

In operation 3170, the second device 30 stores the ID value of the smart key 10 and the function information of the smart key 10. The function information may include a usage restriction.

FIG. 32 illustrates an example in which the operations illustrated in FIG. 30 are performed.

When the first user 50 selects a smart key, the function information of which is desired to be shared, via the first device 20 and requests sharing of the selected smart key via the first device 20, the first device 20 transmits an ID value of the selected smart key and function information thereof including a usage restriction to a server 3210.

The server 3210 may access a database (DB) 3211, encrypt the function information including the usage restriction, and store the encrypted function information such that the encrypted function information may be mapped with the ID value as indicated by reference numeral 3221 or 3222. The DB 3211 may be included in the server 3210.

When the second device 30 requests for stored information, the server 3210 reads the stored information from the DB 3211. When the server 3210 has received the ID value and the function information from the first device 20, the server 3210 automatically reads information from the DB 3211. The server 3210 transmits read information (i.e., encrypted function information and an encrypted ID value) to the second device 30.

Figure 33:
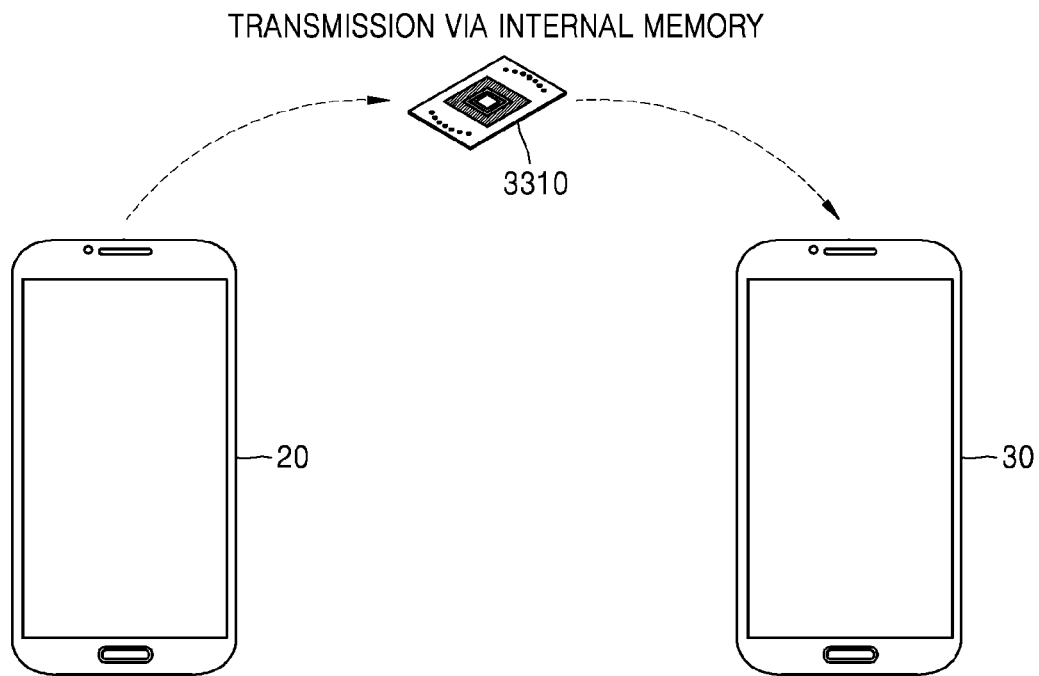
FIG. 33 is a view for explaining another example in which a first device transmits an ID value and function information of a smart key to a second device and the second device stores the received ID value and function information, according to an exemplary embodiment.

FIG. 33 is a view for explaining another example in which a first device 20 transmits an ID value and function information of a smart key 10 to a second device 30 and the second device 30 stores the received ID value and function information, according to an exemplary embodiment.

Referring to FIG. 33, the first device 20, a memory device 3310 combined with the first device 20, and the second device 30 are illustrated.

The first device 20 may store the ID value of the smart key 10 and the function information of the smart key 10 in the memory device 3310. In this case, the first device 20 may store function information including a usage restriction or function information including no usage restrictions, in the memory device 3310.

The user of the second device 30 (i.e., the second user 60) may combine the memory device 3310 separated from the first device 20 with the second device 30. Hence, the ID value and the function information of the smart key 10 may be transmitted to the second device 30.

Figure 34:
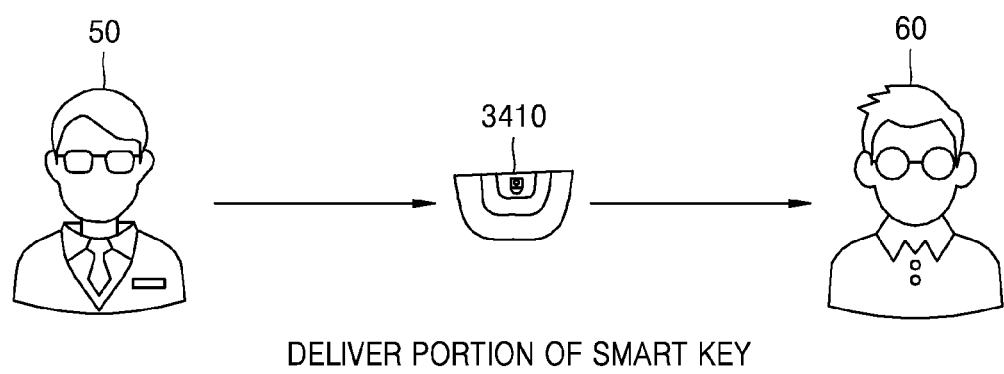
FIG. 34 is a view for explaining another example in which a first device transmits an ID value and function information of a smart key to a second device and the second device stores the received ID value and function information, according to an exemplary embodiment.

FIG. 34 is a view for explaining another example in which a first device 20 transmits an ID value and function information of a smart key 10 to a second device 30 and the second device 30 stores the received ID value and function information, according to an exemplary embodiment.

Referring to FIG. 34, the first user 50, a portion 3410 of the smart key 10, and the second user 60 are illustrated. As illustrated in FIG. 34, the portion 3410 may denote a physical portion of the smart key 10.

The portion 3410 may store the ID value and the function information of the smart key 10. In this case, the portion 3410 may store function information including usage restrictions or function information including no usage restrictions. In other words, the portion 3410 may be set such that only some of the functions capable of controlling operations of the to-be-controlled device 40 may be used, or such that the functions capable of controlling operations of the to-be-controlled device 40 may be used only in a certain environment (for example, a restriction regarding a period of time, a distance, or a number of times). Alternatively, the portion 3410 may be set such that the functions capable of controlling operations of the to-be-controlled device 40 may be used without any restriction.

The first user 50 may deliver the portion 3410 to the second user 60, and the second user 60 may control an operation of the to-be-controlled device 40 by using the received portion 3410.

As described above with reference to FIG. 1, the second device 30 may control an operation of the to-be-controlled device 40 by using the ID value and the function information of the smart key 10 received from the first device 20. In this case, when the function information includes a usage restriction, the second device 30 may control an operation of the to-be-controlled device 40 according to the usage restriction. For example, when the second device 30 outputs a signal for controlling an operation of the to-be-controlled device 40 and the to-be-controlled device 40 senses the signal output by the second device 30, the to-be-controlled device 40 may perform an operation according to the sensed signal.

Examples in which the second device 30 controls an operation of the to-be-controlled device 40 will now be described with reference to FIGS. 35-52.

Figure 35:
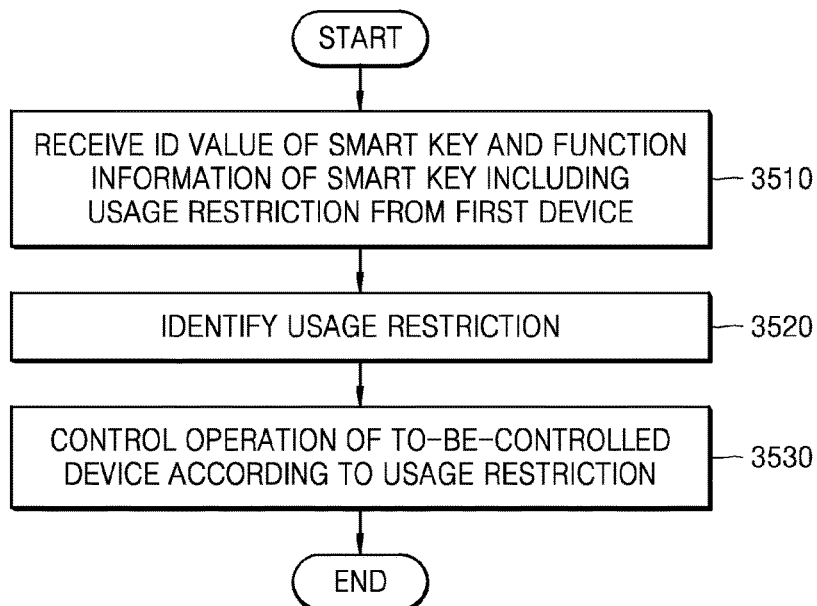
FIG. 35 is a flowchart of an example in which a second device controls a to-be-controlled device, according to an exemplary embodiment.

FIG. 35 is a flowchart of an example in which a second device 30 controls a to-be-controlled device 40, according to an exemplary embodiment.

The example of FIG. 35 includes operations serially performed by the second device 30 of FIG. 1. Thus, the above descriptions of the operations of the second device 30 of FIG. 1 may also apply to the example illustrated in FIG. 35.

In operation 3510, the second device 30 receives, from the first device 20, an ID value of the smart key 10 and function information of the smart key 10 including a usage restriction.

In operation 3520, the second device 30 identifies the usage restriction.

In operation 3530, the second device 30 controls an operation of the to-be-controlled device 40 according to the usage restriction.

Examples of usage restrictions that can be set by the first device 20 have been described above with reference to FIG. 17. An example in which the second device 30 controls an operation of the to-be-controlled device 40 according to various usage restrictions will now be described with reference to FIGS. 36-52.

Figure 36:
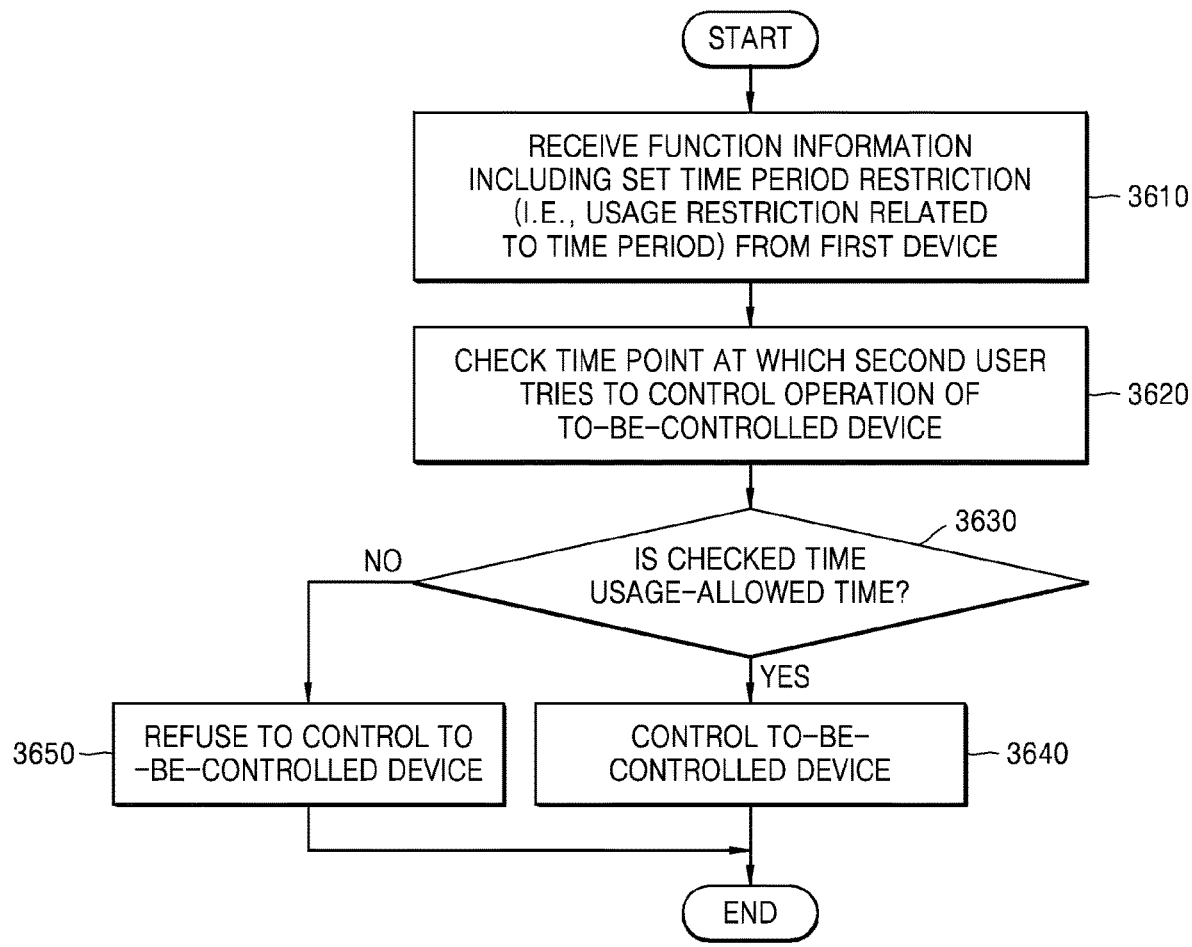
FIG. 36 is a flowchart of an example in which a second device controls an operation of a to-be-controlled device when a usage restriction is a time period restriction, according to an exemplary embodiment.

FIG. 36 is a flowchart of an example in which a second device 30 controls an operation of a to-be-controlled device 40 when a usage restriction is a time period restriction, according to an exemplary embodiment.

The example of FIG. 36 includes operations serially performed by the second device 30 of FIG. 1. Thus, the above descriptions of the operations of the second device 30 of FIG. 1 may also apply to the example illustrated in FIG. 36.

In operation 3610, the second device 30 receives function information including a set time period restriction (i.e., a usage restriction regarding a time period) from the first device 20.

In operation 3620, the second device 30 checks the time point at which the second user 60 tries to control an operation of the to-be-controlled device 40. In other words, at the moment when the second user 60 tries to control an operation of the to-be-controlled device 40 (i.e., to use a function capable of controlling an operation of the to-be-controlled device 40) by using the second device 30, the second device 30 checks the time of the moment.

In operation 3630, the second device 30 determines whether the time point checked in operation 3620 is an allowed time. In other words, the second device 30 determines whether the time checked in operation 3620 conforms to the time restriction condition.

If it is determined that the time checked in operation 3620 is an allowed time, operation 3640 is performed. Otherwise, operation 3650 is performed.

In operation 3640, the second device 30 controls the to-be-controlled device 40. For example, the second device 30 may control the to-be-controlled device 40 by generating a signal corresponding to a function requested by the second user 60 and outputting the generated signal.

In operation 3650, the second device 30 refuses to control the to-be-controlled device 40. Herein, "the second device 30 refuses to control the to-be-controlled device 40" means that someone/something requests for the second device 30 to control the to-be-controlled device 40, but the second device 30 rejects the request. For example, the second device 30 may refuse to control the to-be-controlled device 40 by not generating the signal corresponding to the function requested by the second user 60.

The example of FIG. 36 will now be described in more detail with reference to FIGS. 37 and 38.

Figure 37:
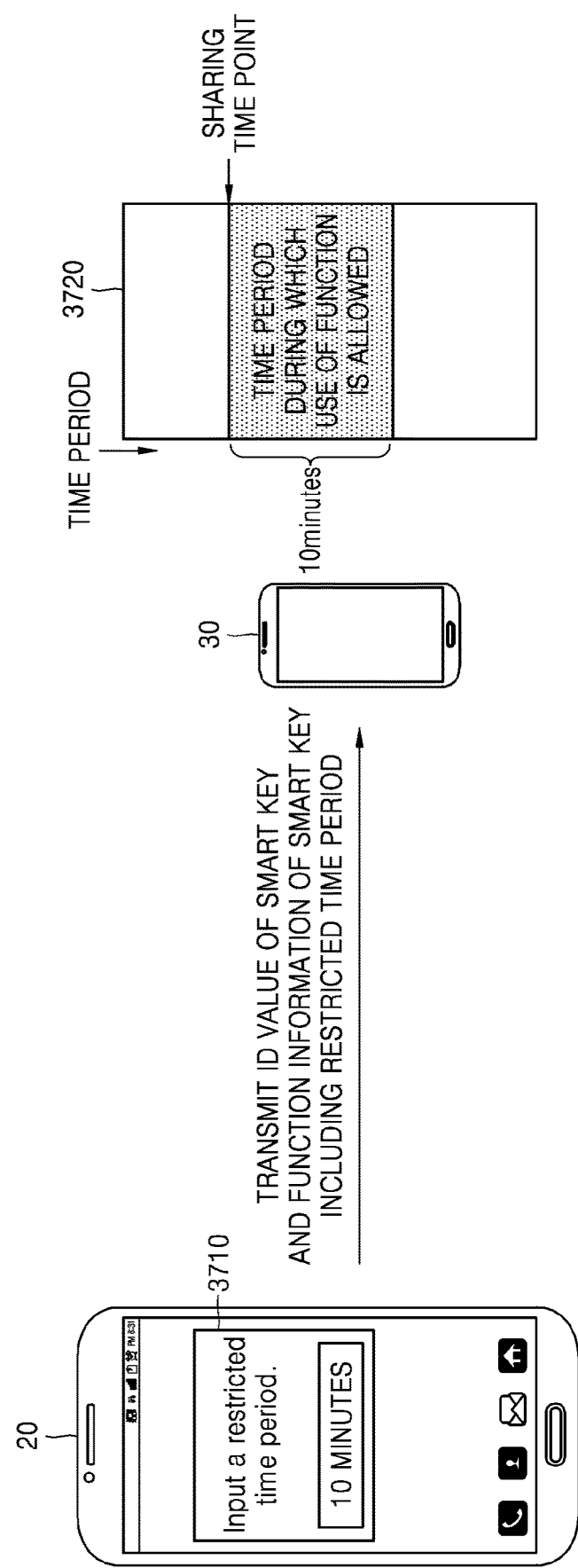
FIGS. 37 and 38 are views for explaining an operation of a second device when a time period restriction is set, according to an exemplary embodiment.
Figure 38:
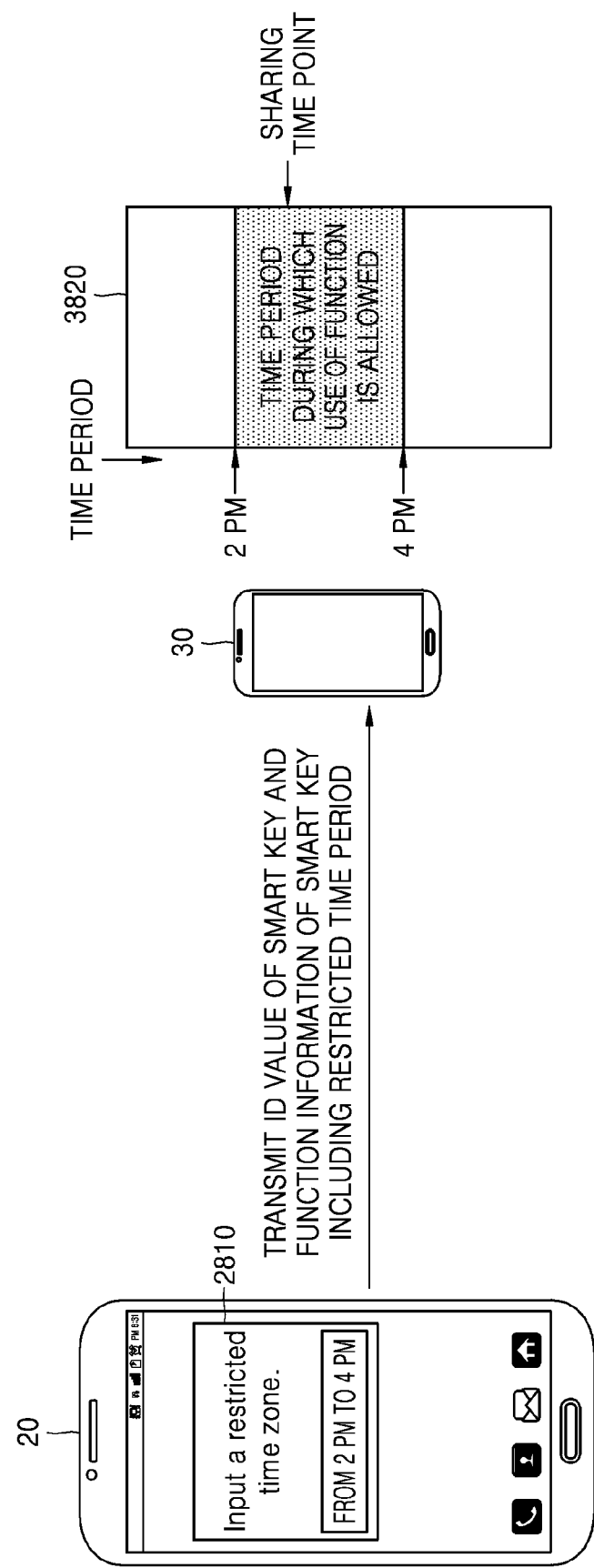

FIGS. 37 and 38 are views for explaining an operation of a second device 30 when a time period restriction is set, according to an exemplary embodiment.

FIG. 37 illustrates an example in which the time period restriction of FIG. 36 specifies a time period starting from a time point at which function information has been transmitted to the second device 30. FIG. 38 illustrates an example in which the time period restriction of FIG. 36 specifies a preset certain time interval.

Referring to FIG. 37, when the first user 50 inputs 10 minutes as a usage-restricted time period to a pop-up window 3710 output to the first device 20, the first device 20 transmits to the second device 30 an ID value of the smart key 10 and function information of the smart key 10 including the usage-restricted time period.

The second device 30 may use a function capable of controlling an operation of the to-be-controlled device 40 (i.e., control the to-be-controlled device 40) within the set time period. The second device 30 may use the function capable of controlling an operation of the to-be-controlled device 40, for 10 minutes starting from the time point when the ID value and the function information have been transmitted to the second device 30. In other words, as shown in a table 3720, the second device 30 may use the function capable of controlling an operation of the to-be-controlled device 40 for 10 minutes starting from the time point when the function capable of controlling an operation of the to-be-controlled device 40 has been shared by the second device 30 (e.g., the time point when the ID value and the function information have been completely transmitted to or received by the second device 30). However, when 10 minutes pass from the time point when the first device 20 begins sharing the function capable of controlling an operation of the to-be-controlled device 40 with the second device 30 (hereinafter, referred to as a sharing time point), the second device 30 is not be able to use the function capable of controlling an operation of the to-be-controlled device 40.

Referring to FIG. 38, it is assumed that the first user 50 inputs, to a pop-up window 3810, a time interval from 2:00 pm to 4:00 pm as a usage-restricted time period output to the first device 20. In the exemplary embodiment of FIG. 37, the second device 30 is able to use the function capable of controlling an operation of the to-be-controlled device 40 only during a certain period of time starting from the sharing time point (e.g., the time point when the ID value and the function information have been completely transmitted to the second device 30). However, in the exemplary embodiment of FIG. 38, regardless of the sharing time point when the function capable of controlling an operation of the to-be-controlled device 40 has been shared by the second device 30, the second device 30 is able to use the function of the smart key 10 only in a time zone set by the first user 50 (i.e., the time interval from 2:00 pm to 4:00 pm). In other words, as shown in a table 3820 of FIG. 38, a time period during which the second device 30 is able to use the function capable of controlling an operation of the to-be-controlled device 40 is from 2:00 pm to 4:00 pm, and the use of the function of the smart key 10 is not affected by the sharing time point (i.e., the time point when the ID value and the function information have been transmitted to the second device 30).

Figure 39:
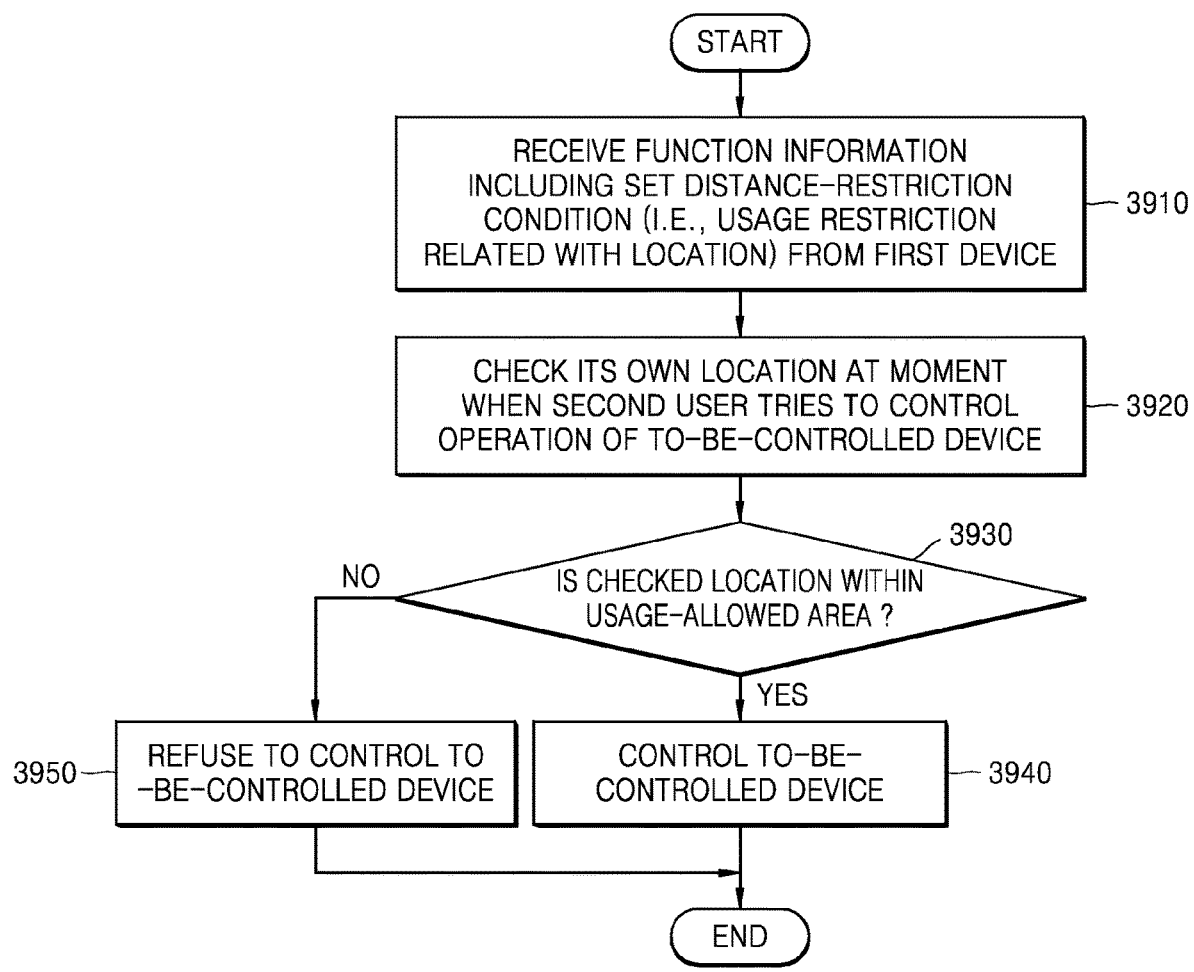
FIG. 39 is a flowchart of an example in which a second device controls an operation of a to-be-controlled device when a usage restriction is a distance restriction, according to an exemplary embodiment.

FIG. 39 is a flowchart of an example in which a second device 30 controls an operation of a to-be-controlled device 40 when a usage restriction is a distance-restriction condition, according to an exemplary embodiment.

The example of FIG. 39 includes operations serially performed by the second device 30 of FIG. 1. Thus, the above descriptions of the operations of the second device 30 of FIG. 1 may also apply to the example illustrated in FIG. 39.

In operation 3910, the second device 30 receives function information including a set distance-restriction condition (i.e., a usage restriction related with a location) from the first device 20.

In operation 3920, the second device 30 checks a location thereof at the moment when the second user 60 tries to control an operation of the to-be-controlled device 40. In other words, at the moment when the second user 60 tries to control an operation of the to-be-controlled device 40 (i.e., to use a function capable of controlling an operation of the to-be-controlled device 40) by using the second device 30, the second device 30 determines where the second device 30 is located.

In operation 3930, the second device 30 determines whether the location checked in operation 3920 is within a usage-allowed area. In other words, the second device 30 determines whether the location checked in operation 3920 conforms to the distance restriction condition.

If it is determined that the location checked in operation 3920 is an allowed location, operation 3940 is performed. Otherwise, operation 3950 is performed.

In operation 3940, the second device 30 controls the to-be-controlled device 40. For example, the second device 30 may control the to-be-controlled device 40 by generating a signal corresponding to the function requested by the second user 60 and outputting the generated signal.

In operation 3950, the second device 30 refuses to control the to-be-controlled device 40. For example, the second device 30 may refuse to control the to-be-controlled device 40 by not generating the signal corresponding to the function requested by the second user 60.

The example of FIG. 39 will now be described in more detail with reference to FIGS. 40-43.

FIGS. 40-43 are views for explaining an operation of a second device 30 when a distance-restriction condition has been set, according to an exemplary embodiment.

Figure 40:
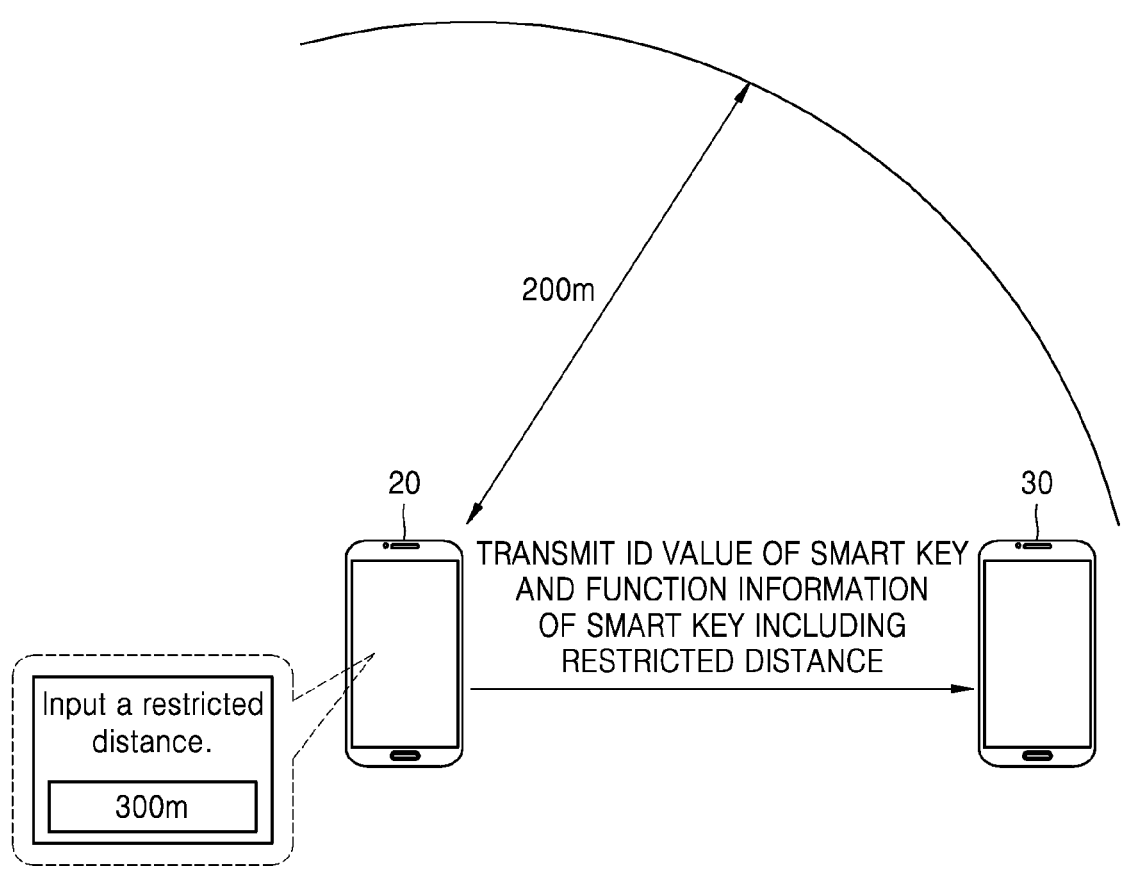
FIGS. 40-43 are views for explaining an operation of a second device when a distance restriction has been set, according to an exemplary embodiment.
Figure 41:
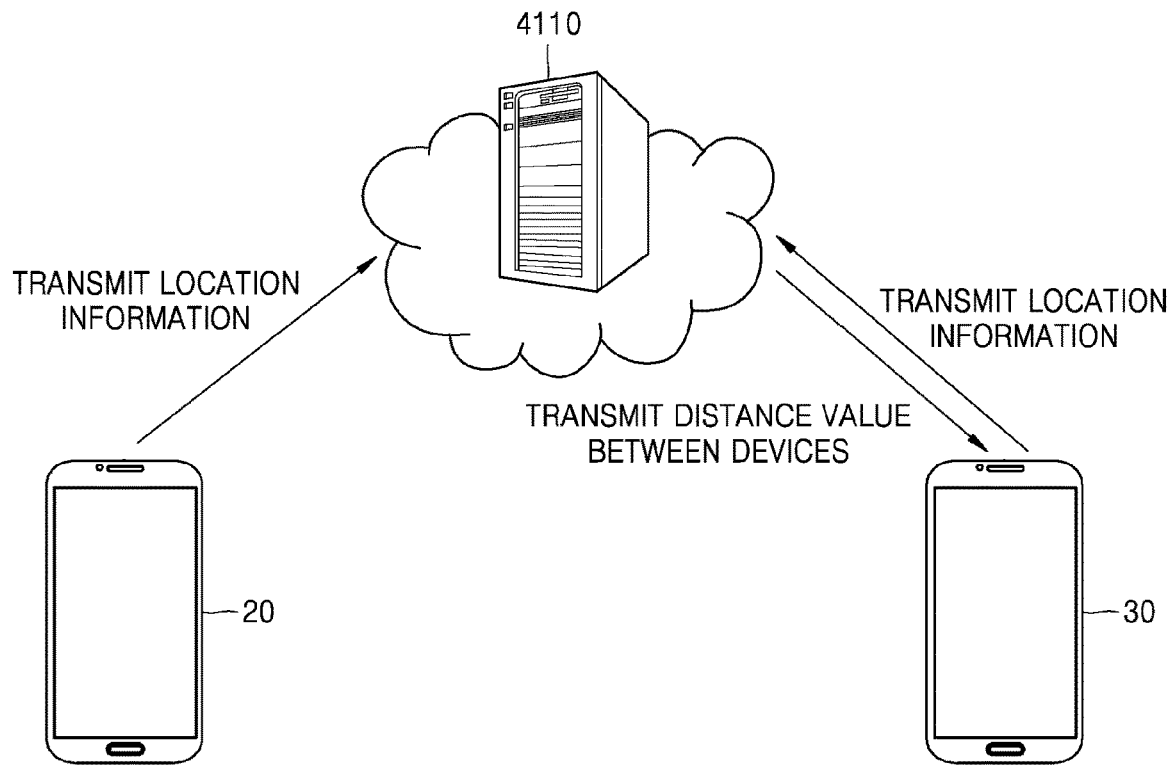
Figure 42:
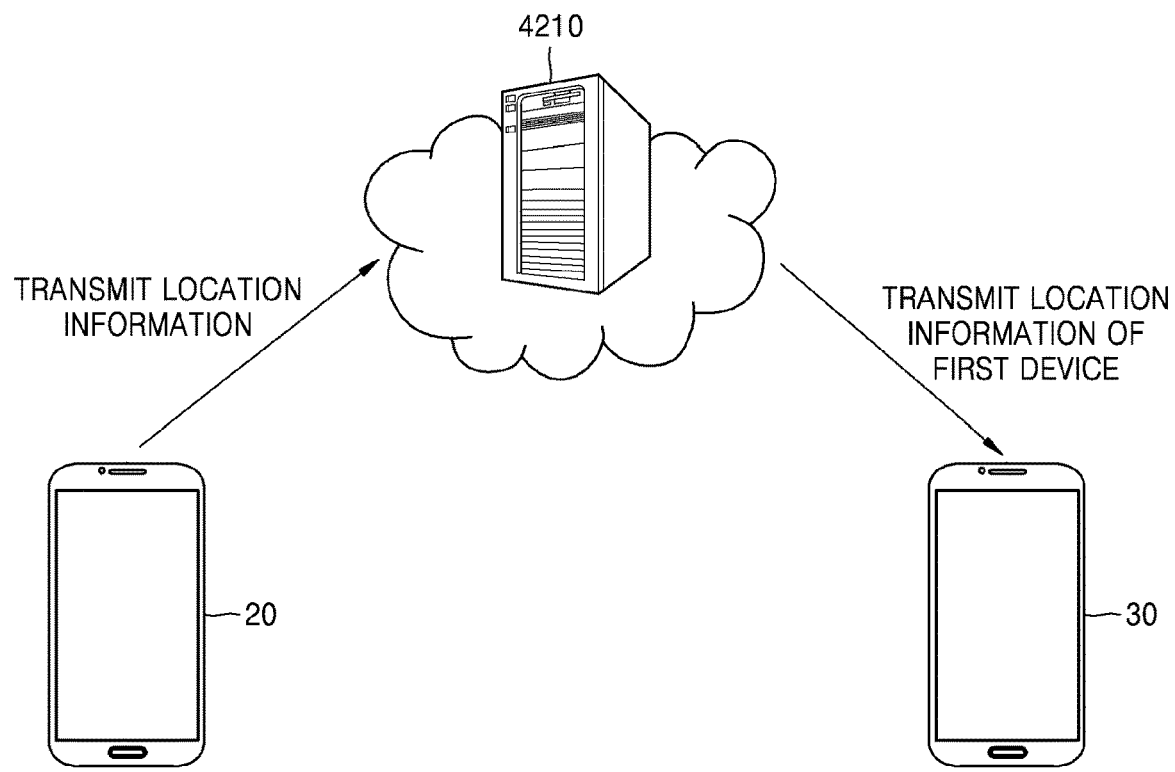
Figure 43:
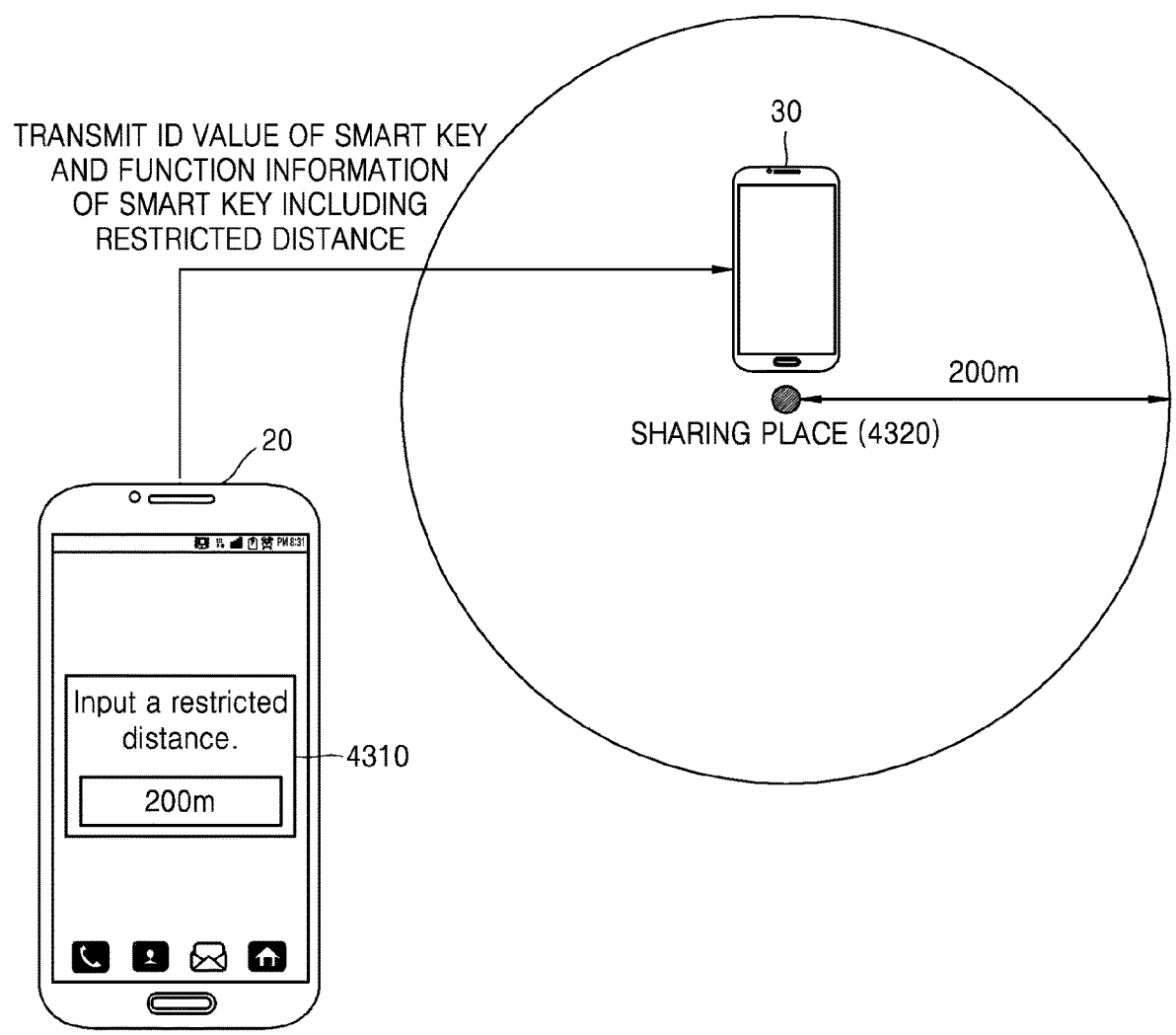

FIGS. 40-42 illustrate an exemplary embodiment in which the distance-restriction condition of FIG. 39 specifies an area within a preset radius around the location of the first device 20. FIG. 43 illustrates an exemplary embodiment in which the distance-restriction condition of FIG. 39 specifies an area within a preset radius around a location of the second device 30 at the moment when function information has been completely transmitted to the second device 30.

Referring to FIG. 40, the first user 50 inputs 200 m as the distance-restriction condition to a pop-up window output to the first device 20. Then, the first device 20 transmits an ID value of the smart key 10 and function information of the smart key 10 including the distance-restriction condition to the second device 30.

Here, the distance-restriction condition means that the second device 30 is able to use a function capable of controlling an operation of the to-be-controlled device 40 (i.e., to control the to-be-controlled device 40) only within a 200 m radius of the location of the first device 20. In other words, when a distance between the first device 20 and the second device 30 exceeds 200 m, the second device 30 is unable to use the function capable of controlling an operation of the to-be-controlled device 40.

As described above, to restrict the use of the function capable of controlling an operation of the to-be-controlled device 40 based on the locations of the first device 20 and the second device 30, location information of the first device 20 and location information of the second device 30 are utilized. FIGS. 41 and 42 illustrate examples in which servers 4110 and 4210 collect the location information of the first device 20 and location information of the second device 30. However, it is understood that one or more other exemplary embodiments are not limited thereto. For example, the first device 20 and/or the second device 30 may serve as the servers 4110 and 4210 of FIGS. 41 and 42.

Referring to FIG. 41, the server 4110 receives a piece of location information from the first device 20 and a piece of location information from the second device 30, and compares the two pieces of location information with each other to calculate a distance between the first device 20 and the second device 30. The first device 20 and the second device 30 may acquire their own pieces of location information by using built-in global positioning system (GPS) modules thereof or acquire their own pieces of location information by using any of various other methods.

The server 4110 transmits a calculated distance value to the second device 30. In other words, in the exemplary embodiment of FIG. 41, the server 4110 collects the location information of the first device 20 and the location information of the second device 30 and transmits, to the second device 30, a distance value indicating a distance between the first device 20 and the second device 30.

Referring to FIG. 42, when the first device 20 transmits the location information to the server 4210, the server 4210 transmits the location information of the first device 20 to the second device 30. When it is assumed that the first device 20 transmits its own location information directly to the second device 30, the server 4210 of FIG. 42 may be omitted.

The second device 30 acquires location information of the second device 30, and compares the location information thereof with the received location information of the first device 20 to calculate a distance between the first device 20 and the second device 30. The second device 30 determines whether to use a function capable of controlling an operation of the to-be-controlled device 40 (i.e., to control the to-be-controlled device 40), based on the calculated distance.

FIG. 43 illustrates an exemplary embodiment in which the second device 30 is able to use the function capable of controlling an operation of the to-be-controlled device 40 only within a certain distance from a certain (e.g., predetermined) place. In the present exemplary embodiment, the certain place is a place where the smart key 10 is shared (i.e., a place where the second device 30 has received the ID value and the function information of the smart key 10).

Referring to FIG. 43, the first user 50 inputs 200 m as a usage-restricted distance to a pop-up window 4310 output to the first device 20. The usage-restricted distance means a maximum distance from the place where the smart key 10 is shared, within which the second device 30 is able to use the function capable of controlling an operation of the to-be-controlled device 40. In other words, when the second device 30 has received the ID value and the function information of the smart key 10 at a sharing place 4320, the second device 30 is able to use the function capable of controlling an operation of the to-be-controlled device 40 only while the second device 30 is within a distance of 200 m from the sharing place 4320.

To this end, the second device 30 stores location information of the sharing place 4320. The second device 30 compares a location thereof at the moment when the second user 60 tries to use the function capable of controlling an operation of the to-be-controlled device 40, with the location information of the sharing place 4320. The second device 30 determines whether to use the function capable of controlling an operation of the to-be-controlled device 40 (i.e., to control the to-be-controlled device 40), based on a result of the comparison.

Figure 44:
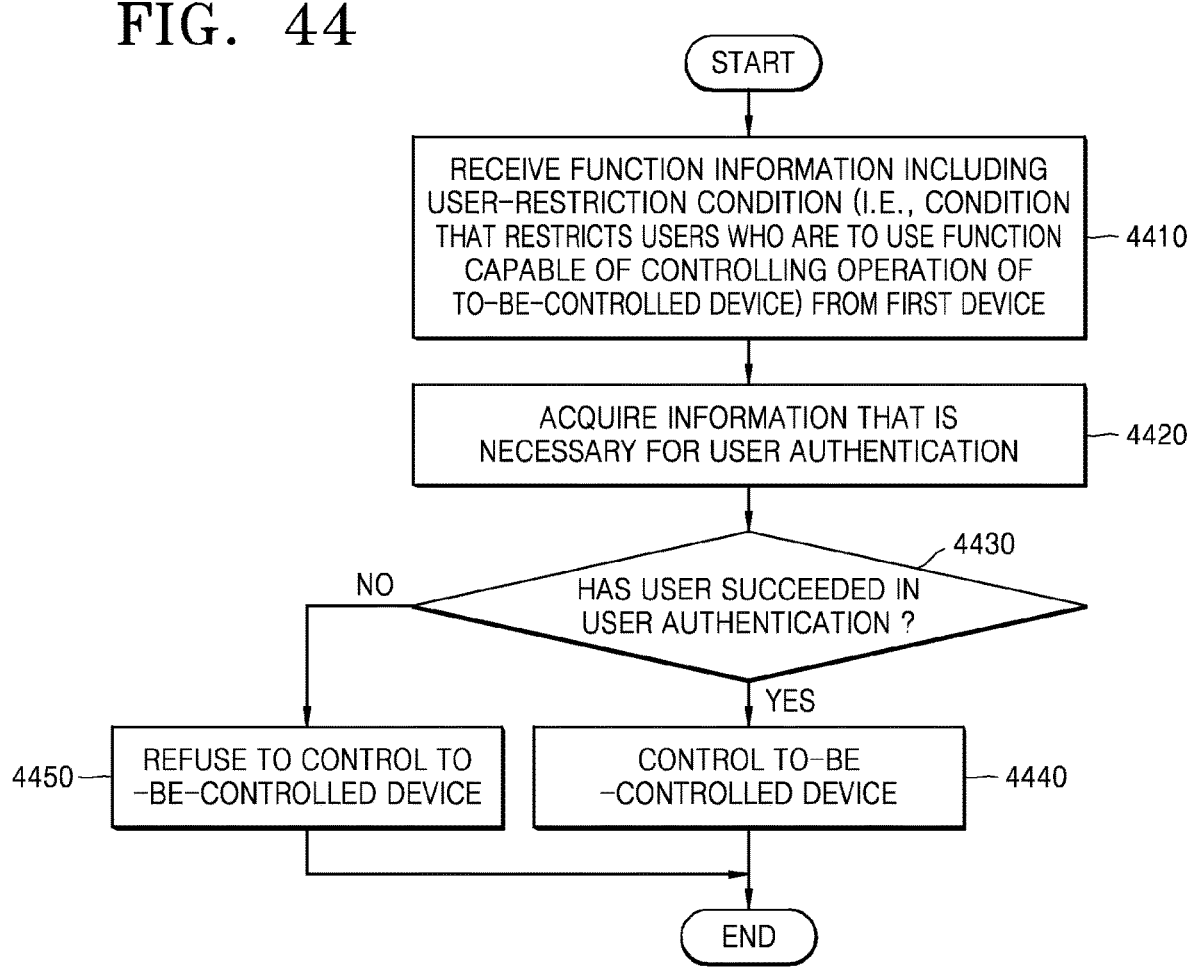
FIG. 44 is a flowchart of an example in which a second device controls an operation of a to-be-controlled device when a usage restriction is a condition that specifies which users may use a function of a smart key, according to an exemplary embodiment.

FIG. 44 is a flowchart of an example in which a second device 30 controls an operation of a to-be-controlled device 40 when a usage restriction is a condition that specifies users who are allowed to use a function of a smart key, according to an exemplary embodiment.

The example of FIG. 44 includes operations serially performed by the second device 30 of FIG. 1. Thus, the above descriptions of the operations of the second device 30 of FIG. 1 may also apply to the example illustrated in FIG. 44.

In operation 4410, the second device 30 receives function information including a user-restriction condition (i.e., a condition that specifies users who are allowed to use the function capable of controlling an operation of the to-be-controlled device 40) from the first device 20.

In operation 4420, the second device 30 acquires information that is used for user authentication. For example, the second device 30 may acquire fingerprint information of the second user 60 via a fingerprint recognition sensor or acquire an ID and a password of the second user 60 via the user input unit 6010.

In operation 4430, the second device 30 authenticates a user by using the information acquired in operation 4420. In other words, the second device 30 may authenticate a user by comparing user information included in the received function information (for example, fingerprint information or an ID and a password acquired by the first device 20) with the information acquired in operation 4420. Furthermore, the second device 30 may authorize a server to perform user authentication.

If the user is identified as an authorized user, operation 4440 is performed. Otherwise, operation 4450 is performed.

In operation 4440, the second device 30 controls the to-be-controlled device 40. For example, the second device 30 may control the to-be-controlled device 40 by generating a signal corresponding to the function requested by the second user 60 and outputting the generated signal.

In operation 4450, the second device 30 refuses to control the to-be-controlled device 40. For example, the second device 30 may refuse to control the to-be-controlled device 40 by not generating the signal corresponding to the function requested by the second user 60.

The example of FIG. 44 will now be described in more detail with reference to FIGS. 45 and 46.

Figure 45:
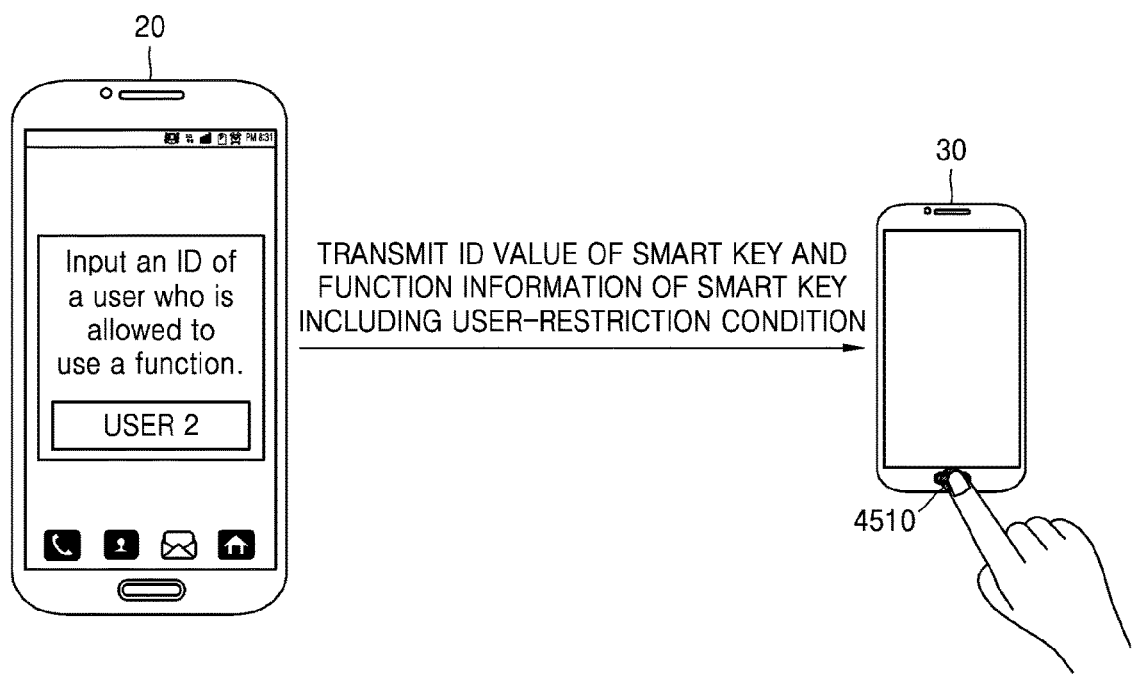
FIGS. 45 and 46 are views for explaining an operation of a second device when a user restriction has been set, according to an exemplary embodiment.
Figure 46:
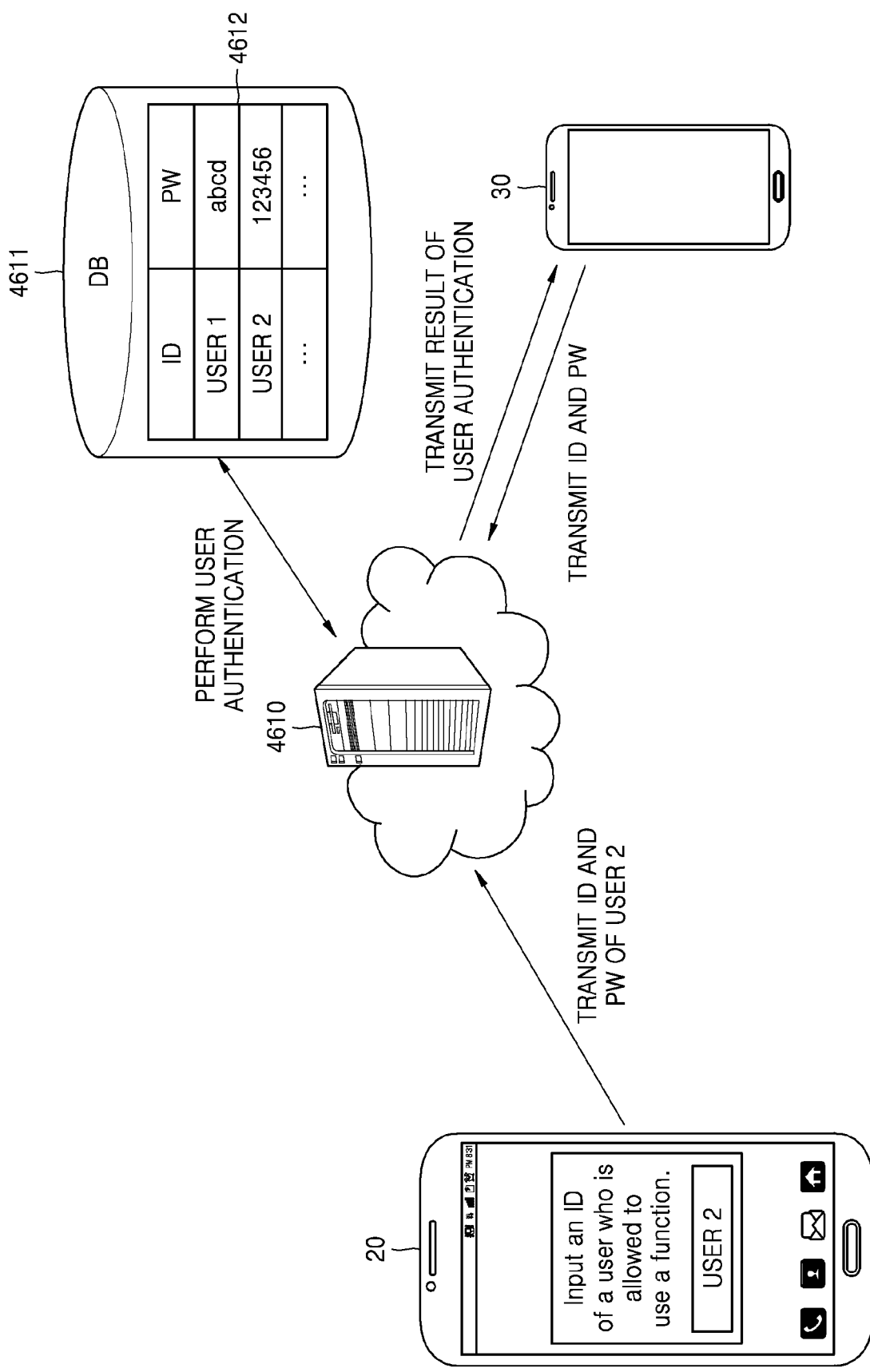

FIGS. 45 and 46 are views for explaining an operation of a second device 30 when a user-restriction condition has been set, according to one or more exemplary embodiments.

FIG. 45 illustrates an exemplary embodiment in which the second device 30 performs user authentication, and FIG. 46 illustrates an exemplary embodiment in which a server 4610 performs user authentication. In the exemplary embodiment of FIG. 45, user authentication is performed using fingerprint information of the second user 60. In the exemplary embodiment of FIG. 46, user authentication is performed using an ID and a password of the second user 60.

Referring to FIG. 45, the first user 50 may input an ID of a user who is allowed to use a function capable of controlling an operation of the to-be-controlled device 40 (i.e., the second user 60), to a pop-up window output to the screen of the first device 20. The first device 20 transmits an ID value of the smart key 10 and function information of the smart key 10 including a user-restriction condition to the second device 30. The function information includes fingerprint information of the second user 60 that is acquired by the first device 20.

When a user tries to use a function capable of controlling an operation of the to-be-controlled device 40, the second device 30 performs user authentication. Only when the user succeeds in the user authentication, the second device 30 allows the user to use the function (i.e., to control the to-be-controlled device 40). Referring to FIG. 45, the second device 30 may perform user authentication by comparing fingerprint information input via a fingerprint recognition sensor 4510 with the fingerprint information of the second user 60 received from the first device 20.

Referring to FIG. 46, when the second device 30 transmits user information (for example, an ID and a password) to the server 4610, the server 4610 performs user authentication by comparing user information received from the first device 20 with the user information received from the second device 30. The server 4610 transmits a result of the user authentication to the second device 30.

For example, when a user tries to use a function capable of controlling an operation of the to-be-controlled device 40 by using the second device 30, the second device 30 requests the server 4610 to perform user authentication. When the user inputs an ID and a password to the second device 30, the second device 30 transmits the input ID and password to the server 4610.

The server 4610 compares the ID and the password received from the second device 30 with IDs and passwords previously stored in a table 4612 of a DB 4611. The IDs and passwords previously stored in the table 4612 of the DB 4611 denote user information transmitted by the first device 20.

When the ID and the password received from the second device 30 correspond to those stored in the table 4612, the server 4610 determines that the user has succeeded in the user authentication. The server 4610 transmits a result of the user authentication to the second device 30.

Figure 47:
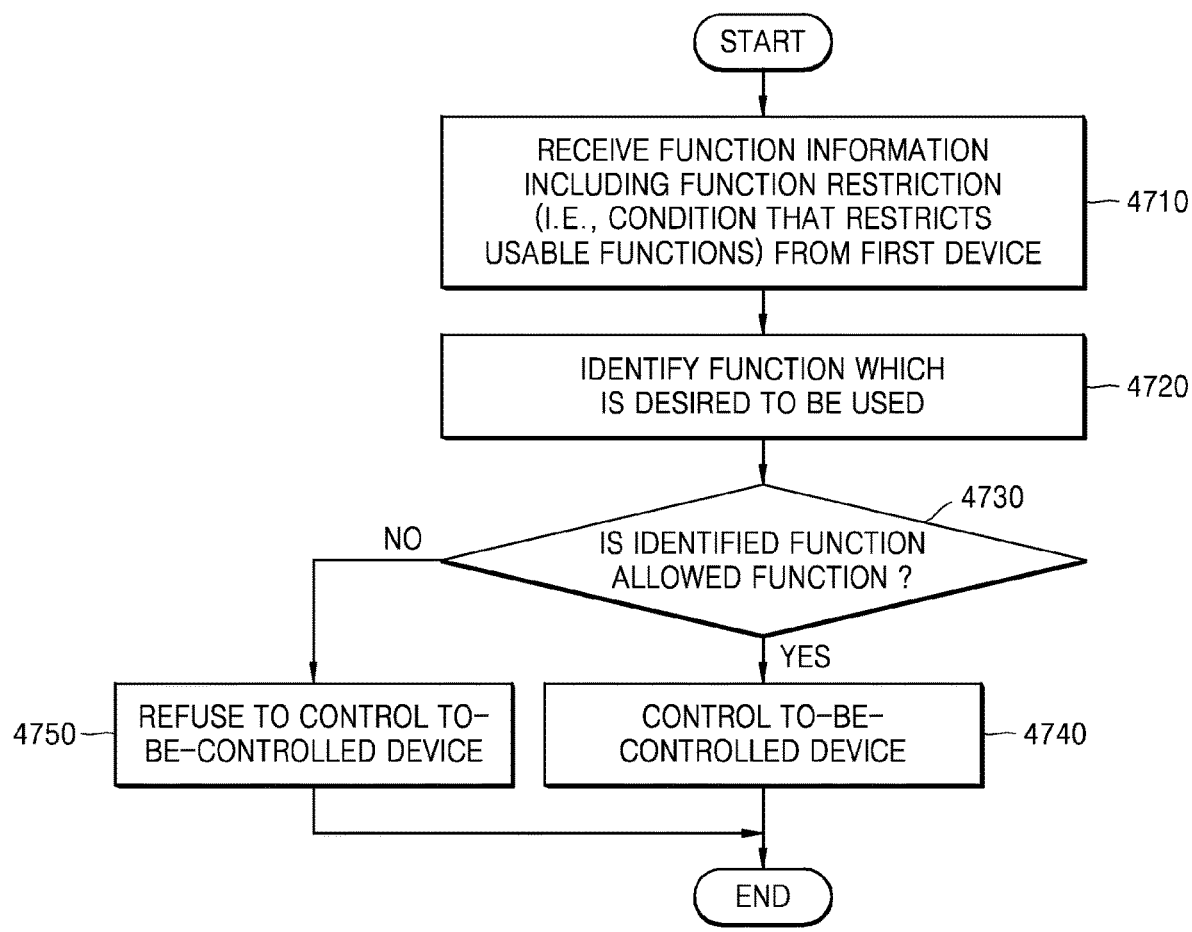
FIG. 47 is a flowchart of an example in which a second device controls an operation of a to-be-controlled device when a usage restriction is a function restriction, according to an exemplary embodiment.

FIG. 47 is a flowchart of an example in which a second device 30 controls an operation of a to-be-controlled device 40 when a usage restriction is a function restriction, according to an exemplary embodiment.

The example of FIG. 47 includes operations serially performed by the second device 30 of FIG. 1. Thus, the above descriptions of the operations of the second device 30 of FIG. 1 may also apply to the example illustrated in FIG. 47.

In operation 4710, the second device 30 receives function information including a function restriction (i.e., a condition that limits which functions may be used from among the functions capable of controlling operations of the to-be-controlled device 40) from the first device 20.

In operation 4720, the second device 30 identifies a function that the second user 60 desires to use. In other words, at the moment when the second user 60 tries to control an operation of the to-be-controlled device 40 (i.e., to use a function capable of controlling an operation of the to-be-controlled device 40) by using the second device 30, the second device 30 identifies a function that the second user 60 desires to use.

In operation 4730, the second device 30 determines whether the function identified in operation 4720 is an allowed function. If it is determined that the function identified in operation 4720 is an allowed function, operation 4740 is performed. Otherwise, operation 4750 is performed. Furthermore, the second device 30 may authorize or use a server to perform the operation 4730.

In operation 4740, the second device 30 controls the to-be-controlled device 40. For example, the second device 30 may control the to-be-controlled device 40 by generating a signal corresponding to the function requested by the second user 60 and outputting the generated signal.

In operation 4750, the second device 30 refuses to control the to-be-controlled device 40. For example, the second device 30 may refuse to control the to-be-controlled device 40 by not generating the signal corresponding to the function requested by the second user 60.

The example of FIG. 47 will now be described in more detail with reference to FIGS. 48 and 49.

Figure 48:
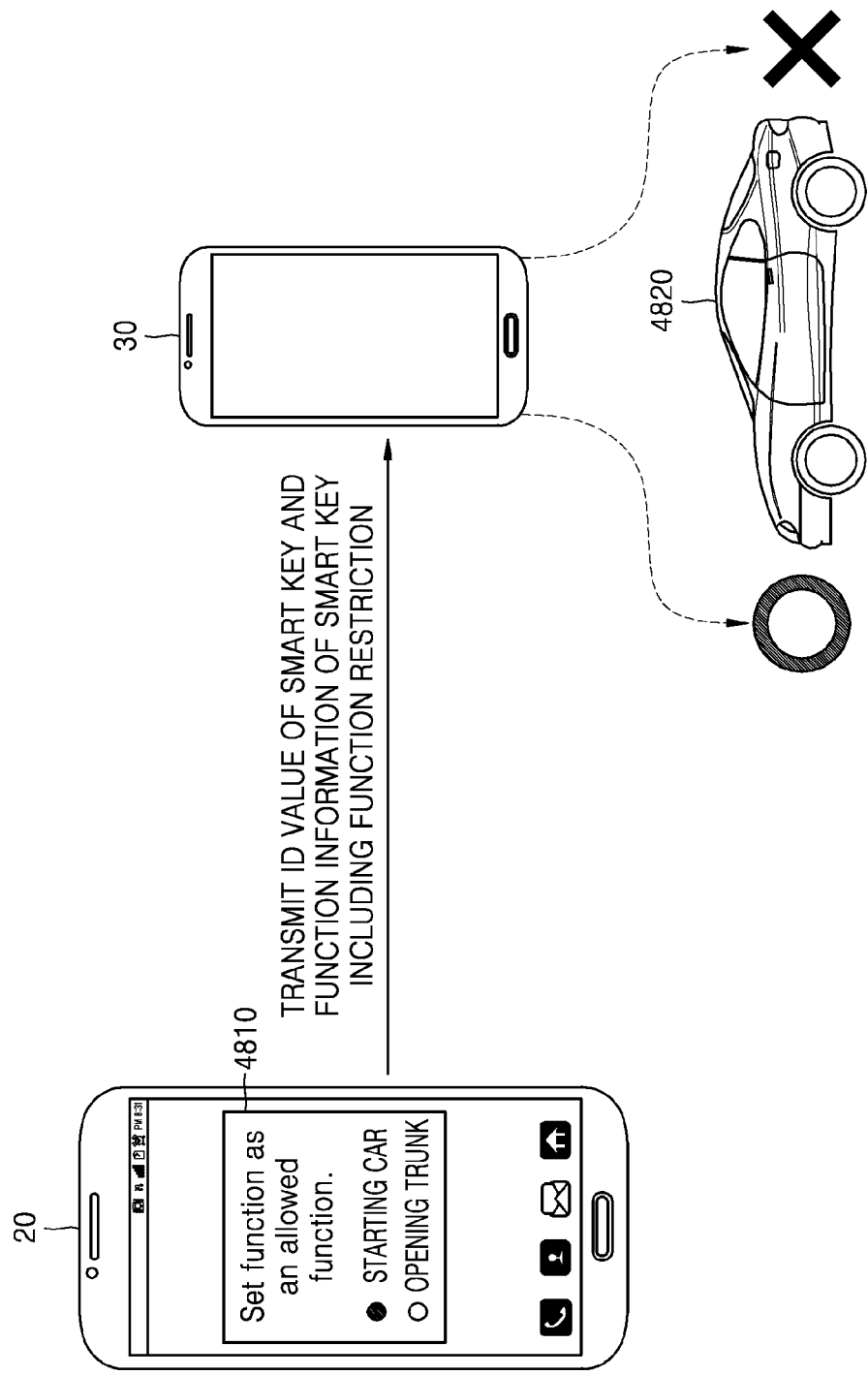
FIGS. 48 and 49 are views for explaining an operation of a second device when a function restriction has been set, according to an exemplary embodiment.
Figure 49:
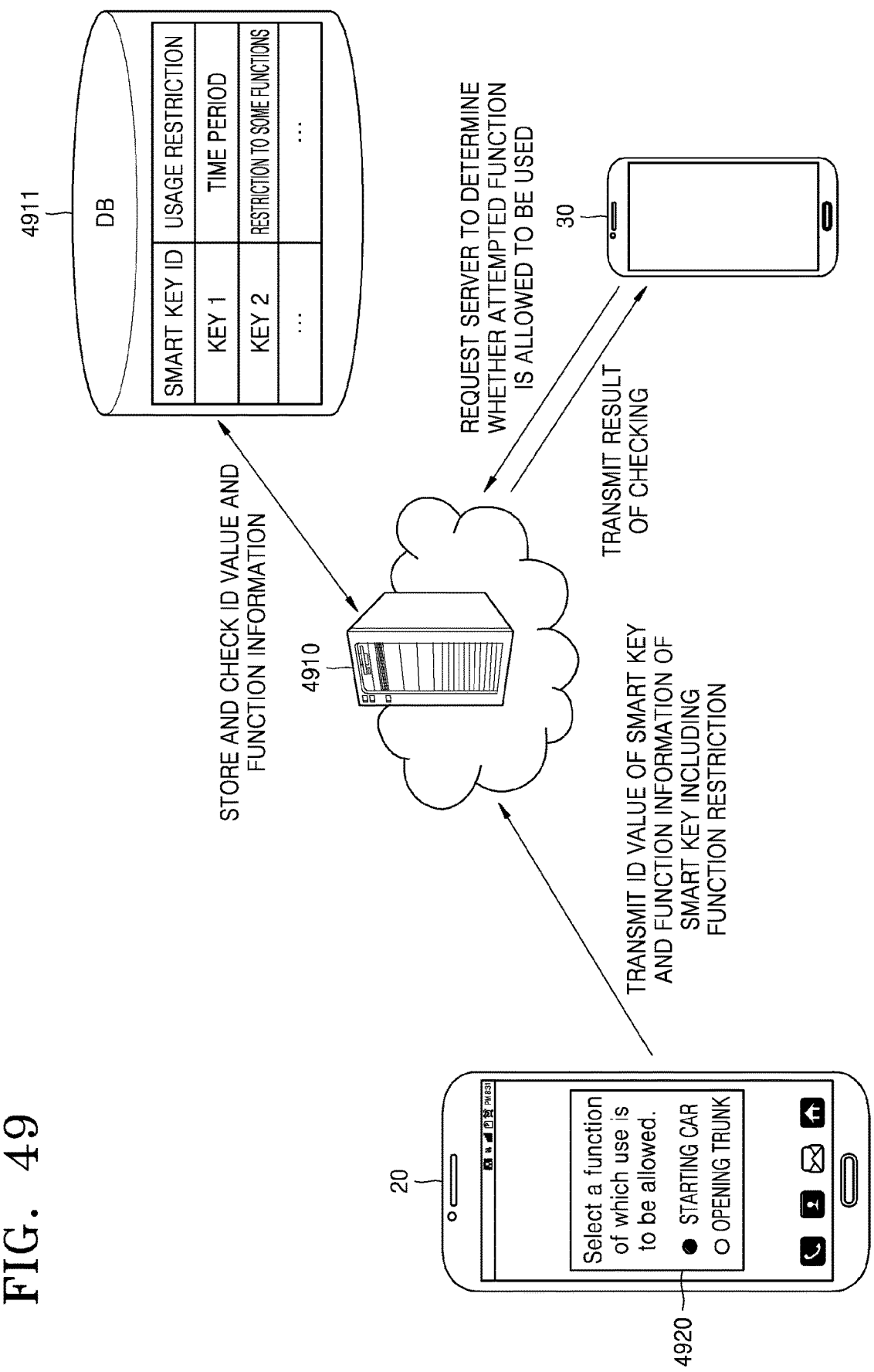

FIGS. 48 and 49 are views for explaining an operation of a second device 30 when a function restriction has been set, according to one or more exemplary embodiments.

FIG. 48 illustrates an exemplary embodiment in which the second device 30 determines whether a function desired to be used is an allowed function, and FIG. 49 illustrates an exemplary embodiment in which a server determines whether the function desired to be used is an allowed function.

Referring to FIG. 48, when the first user 50 sets 'starting the car' as an allowed function via a pop-up window 4810 output to the first device 20, the first device 20 transmits to the second device 30 an ID value of the smart key 10 and function information of the smart key 10 including such a function restriction. Hence, the second user 60 may control an operation of the to-be-controlled device 40, but the second user 60 is only able to start the to-be-controlled device 40 according to the set usage restriction and is unable to open the trunk of the to-be-controlled device 40.

Referring to FIG. 49, when the first user 50 selects 'starting the car' as a function of which use is to be allowed from a pop-up window 4920 output to the first device 20, the first device 20 transmits an ID value of the smart key 10 and function information of the smart key 10 to a server 4910. The server 4910 maps the received ID value with the received function information and stores the mapped ID value and function information in a DB 4911.

When there is an attempt to use a function capable of controlling an operation of the to-be-controlled device 40, the second device 30 requests the server 4910 to determine whether the attempted function is allowed to be used. The server 4910 accesses the DB 4911 and checks a usage restriction of the smart key 10 (i.e., checks if the second device 30 is allowed to use a function of starting the car). The server 4910 transmits a result of the checking to the second device 30.

Figure 50:
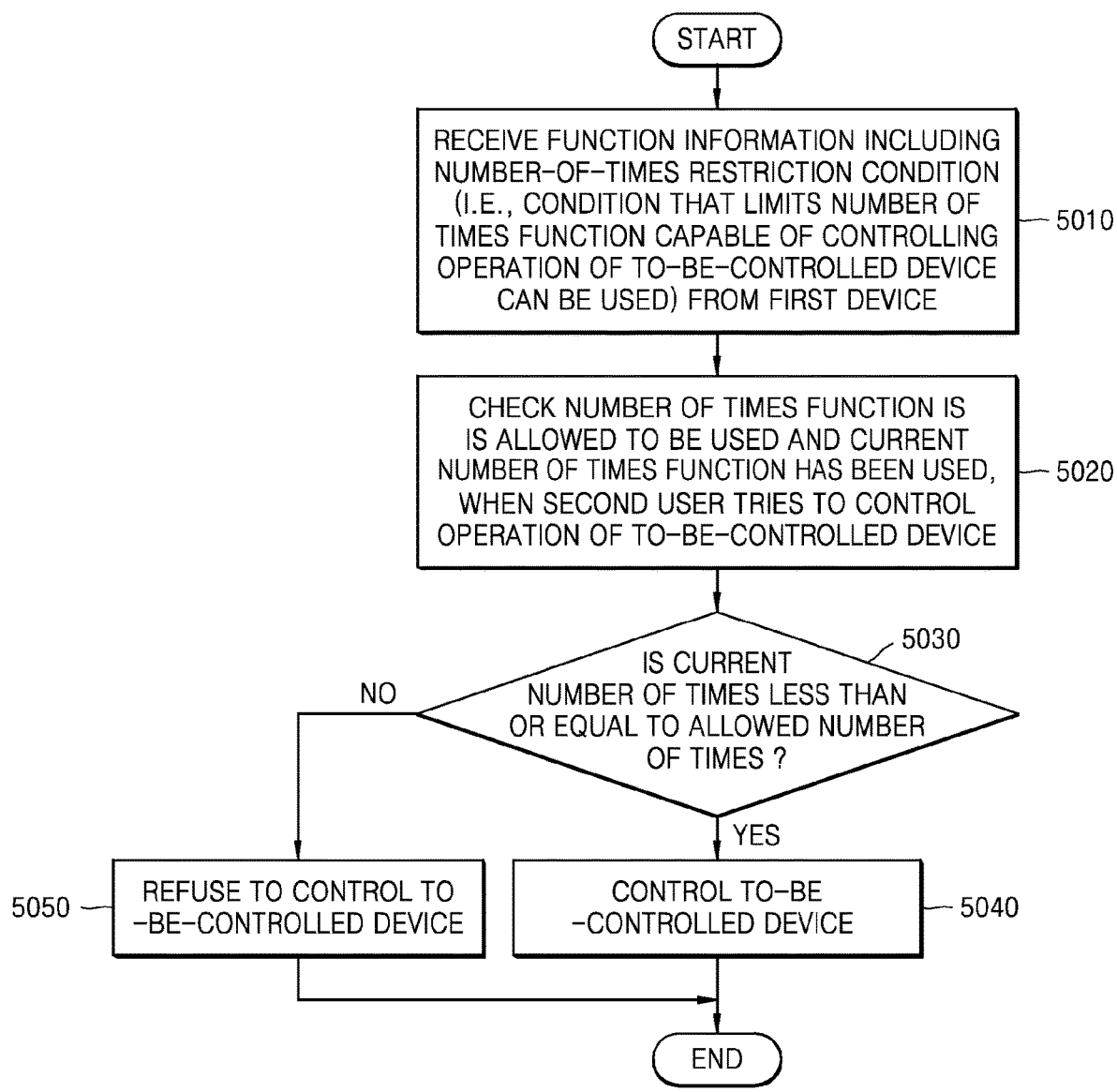
FIG. 50 is a flowchart of an example in which a second device controls an operation of a to-be-controlled device when a usage restriction is a number-of-times restriction, according to an exemplary embodiment.

FIG. 50 is a flowchart of an example in which a second device 30 controls an operation of a to-be-controlled device 40 when a usage restriction is a number-of-times restriction condition, according to an exemplary embodiment.

The example of FIG. 50 includes operations serially performed by the second device 30 of FIG. 1. Thus, the above descriptions of the operations of the second device 30 of FIG. 1 may also apply to the example illustrated in FIG. 50.

In operation 5010, the second device 30 receives function information including a number-of-times restriction condition (i.e., a condition that limits the number of times a function capable of controlling an operation of the to-be-controlled device 40 can be used) from the first device 20.

In operation 5020, the second device 30 checks the number of times the function is allowed to be used and the current number of times the function has been used, when the second user 60 tries to control an operation of the to-be-controlled device 40. In other words, at the moment when the second user 60 tries to control an operation of the to-be-controlled device 40 (i.e., to use a function capable of controlling an operation of the to-be-controlled device 40) by using the second device 30, the second device 30 checks the number of times the function is allowed to be used and the current number of times the function has been used.

In operation 5030, the second device 30 determines whether the current number of times checked in operation 5020 is less than or equal to the allowed number of times. If it is determined that the current number of times checked in operation 5020 is less than or equal to the allowed number of times, operation 5040 is performed. Otherwise, operation 5050 is performed.

In operation 5040, the second device 30 controls the to-be-controlled device 40. For example, the second device 30 may control the to-be-controlled device 40 by generating a signal corresponding to the function requested by the second user 60 and outputting the generated signal.

In operation 5050, the second device 30 refuses to control the to-be-controlled device 40. For example, the second device 30 may refuse to control the to-be-controlled device 40 by not generating the signal corresponding to the function requested by the second user 60.

The example of FIG. 50 will now be described in more detail with reference to FIGS. 51 and 52.

Figure 51:
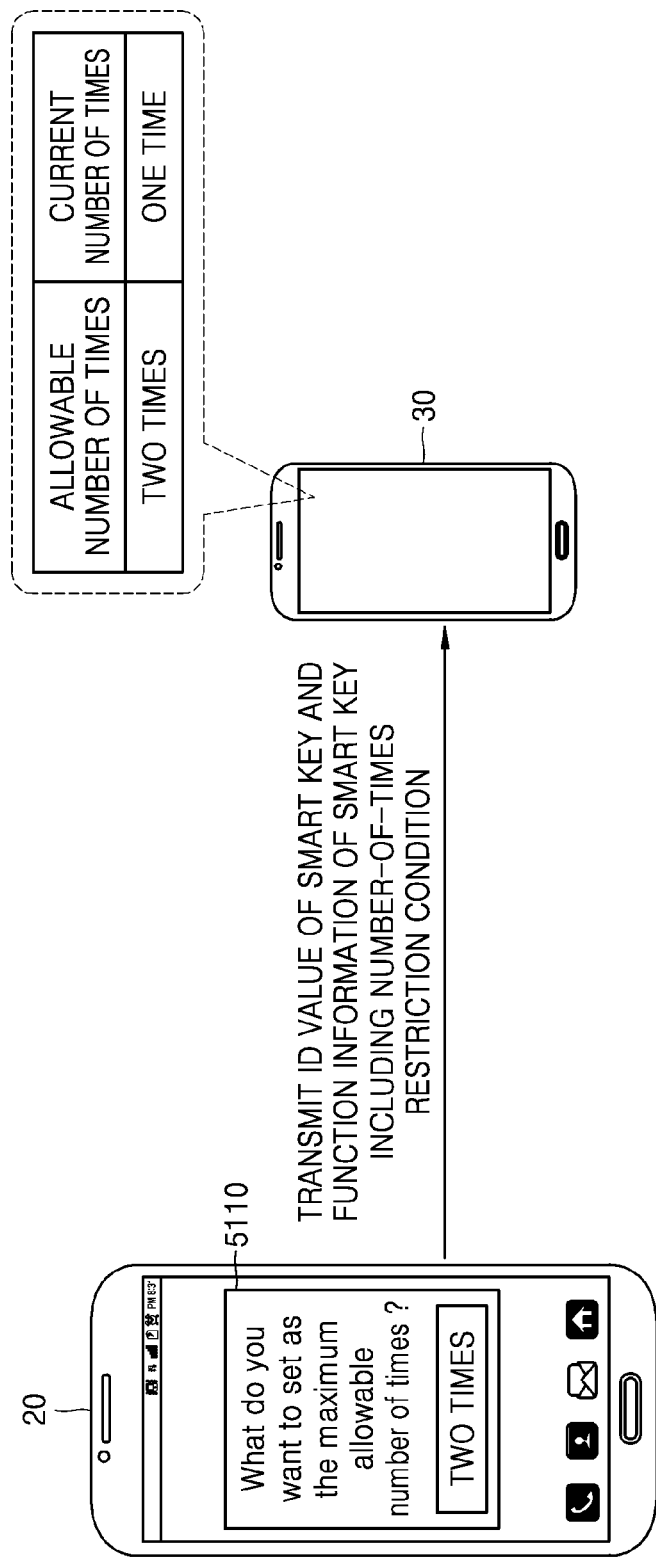
FIGS. 51 and 52 are views for explaining an operation of a second device when a number-of-times restriction has been set, according to an exemplary embodiment.
Figure 52:
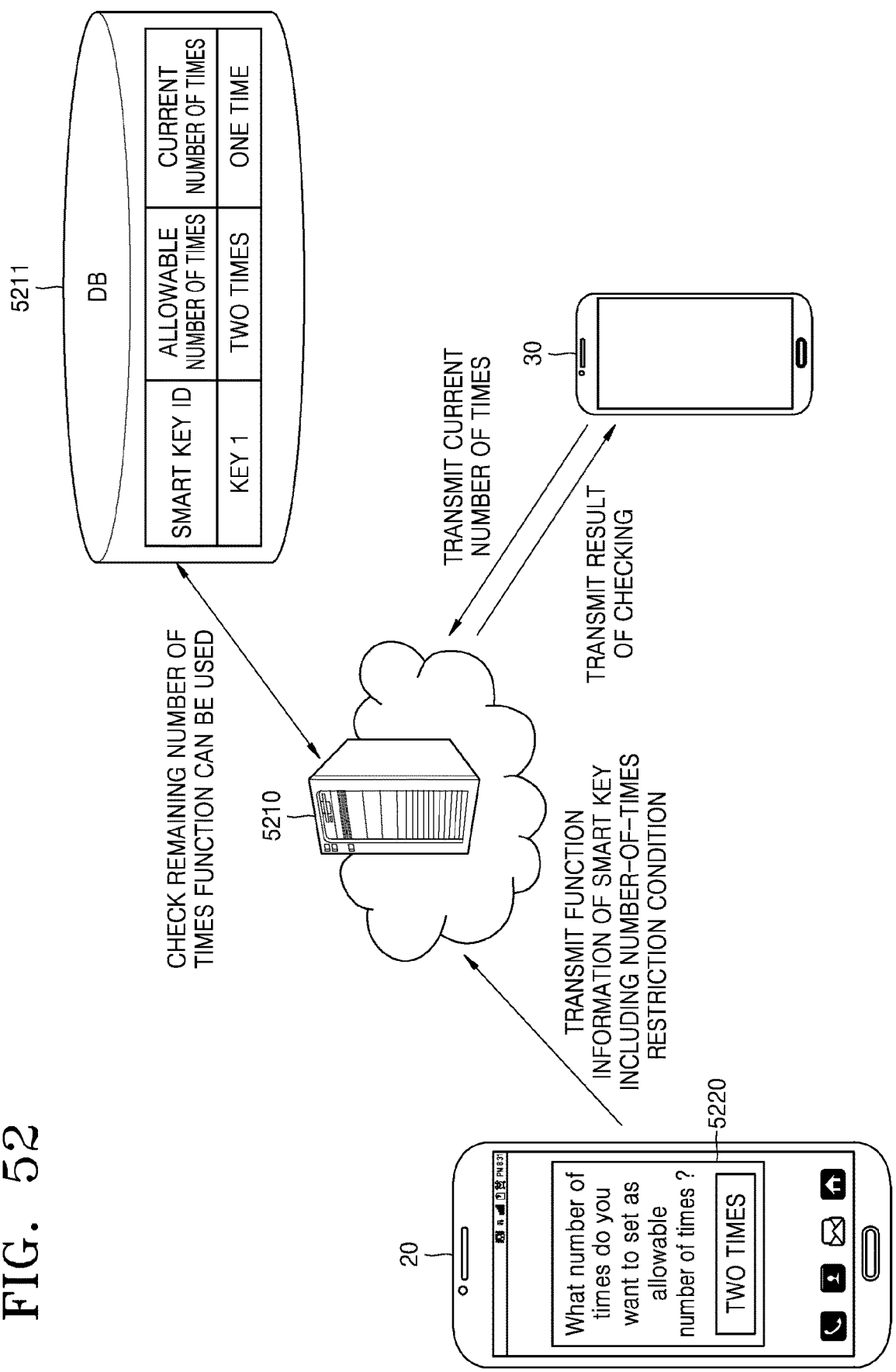

FIGS. 51 and 52 are views for explaining an operation of a second device 30 when a number-of-times restriction condition has been set, according to one or more exemplary embodiments.

FIG. 51 illustrates an exemplary embodiment in which the second device 30 controls the use of a function of a smart key 10 according to a current number of times the function of the smart key 10 has been used. FIG. 52 illustrates an exemplary embodiment in which a server 5210 checks if the current number of times the function has been used is less than or equal to a usage-restricted number of times.

Referring to FIG. 51, when the first user 50 inputs 'two times' as an allowable number of times from a pop-up window 5110 output to the first device 20, the first device 20 transmits to the second device 30 an ID value of the smart key 10 and function information of the smart key 10 including such as number-of-times restriction condition. Thus, the second user 60 is able to control an operation of the to-be-controlled device 40 only two times according to the set usage restriction. The second device 30 stores the allowable number of times and the current number of times in an internal memory thereof. Every time there is an attempt to use the smart key 10, the second device 30 determines whether the attempted use is allowed, based on the information stored in the internal memory.

Referring to FIG. 52, when the first user 50 inputs 'two times' as an allowable number of times from a pop-up window 5220 output to the first device 20, the first device 20 transmits to a server 5210 an ID value of the smart key 10 and function information of the smart key 10 including such a number-of-times restriction condition. The server 5210 maps the received ID value with the received function information and stores the mapped ID value and function information in a DB 5211. When a function capable of controlling an operation of the to-be-controlled device 40 is used by the second device 30, the server 5210 maps the current number of times the function has been used with the ID value of the smart key 10 and stores the same. Every time there is an attempt to use a function capable of controlling an operation of the to-be-controlled device 40, the second device 30 informs the server 5210 of this attempt and requests the server 5210 to determine whether this attempt is allowed.

The server 5210 accesses the DB 5211 and compares the maximum number of times that the smart key 10 may use the function with the current number of times the function has been used, thereby determining whether the current attempt is allowed. The server 5211 transmits a result of the determination to the second device 30.

As described above with reference to FIG. 1, as the second device 30 attempts to use at least one of the functions capable of controlling operations of the to-be-controlled device 40, the first device 20 may receive a function-usage history of the second device 30. When the first device 20 has received the function-usage history from the second device 30, the first device 20 may output the received function-usage history to a screen thereof. An example in which the second device 30 transmits a function-usage history to the first device 20 will now be described with reference to FIG. 53.

Figure 53:
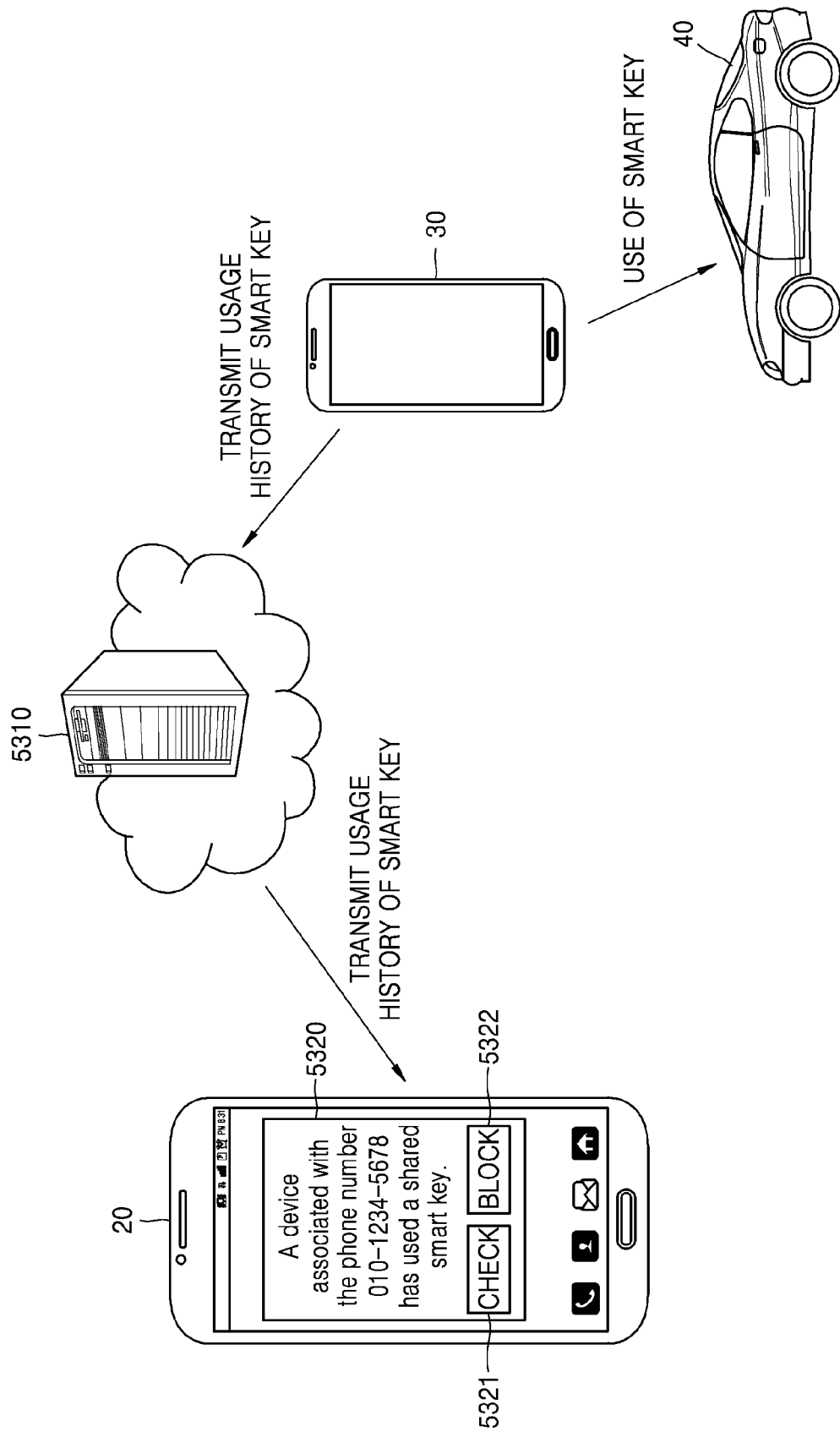
FIG. 53 illustrates an example in which a second device transmits to a first device a use history indicating when and the number of times the second device used functions of a smart key, according to an exemplary embodiment.

FIG. 53 illustrates an example in which a second device 30 transmits to a first device 20 a history indicating when and the number of time the second device 30 has used functions of a smart key 10, according to an exemplary embodiment.

Referring to FIG. 53, it is assumed that the function information of the smart key 10 has already been transmitted to the second device 30. When the second user 60 tries to control an operation of the to-be-controlled device 40 (i.e., to use a function capable of controlling an operation of the to-be-controlled device 40) by using the second device 30, the second device 30 may transmit a usage history of the function to a server 5310. The server 5310 may transmit the received usage history to the first device 20. Furthermore, the second device 30 may transmit the usage history directly to the first device 20.

As illustrated in FIG. 53, the first device 20 may output a pop-up window 5320 including a message informing that the second device 30 has controlled an operation of the to-be-controlled device 40 (i.e., the second device 30 has used a function capable of controlling an operation of the to-be-controlled device 40). The pop-up window 5320 may display an object 5321 enabling the first user 50 to check the usage history of the second device 30, and an object 5322 enabling the first user 50 to block the second device 30 from using a function capable of controlling an operation of the to-be-controlled device 40 when the first user 50 does not want the second device 30 to use the function.

As described above with reference to FIG. 1, in response to function information including a usage restriction received from the first device 20, the second device 30 may request the first device 20 to change the usage restriction. In this case, when the first device 20 accepts the request of the second device 30, the second device 30 may control the to-be-controlled device 40 according to the changed usage restriction. Examples in which the second device 30 requests the first device 20 to change a preset usage restriction will be described below with reference to FIGS. 54 and 55.

Figure 54:
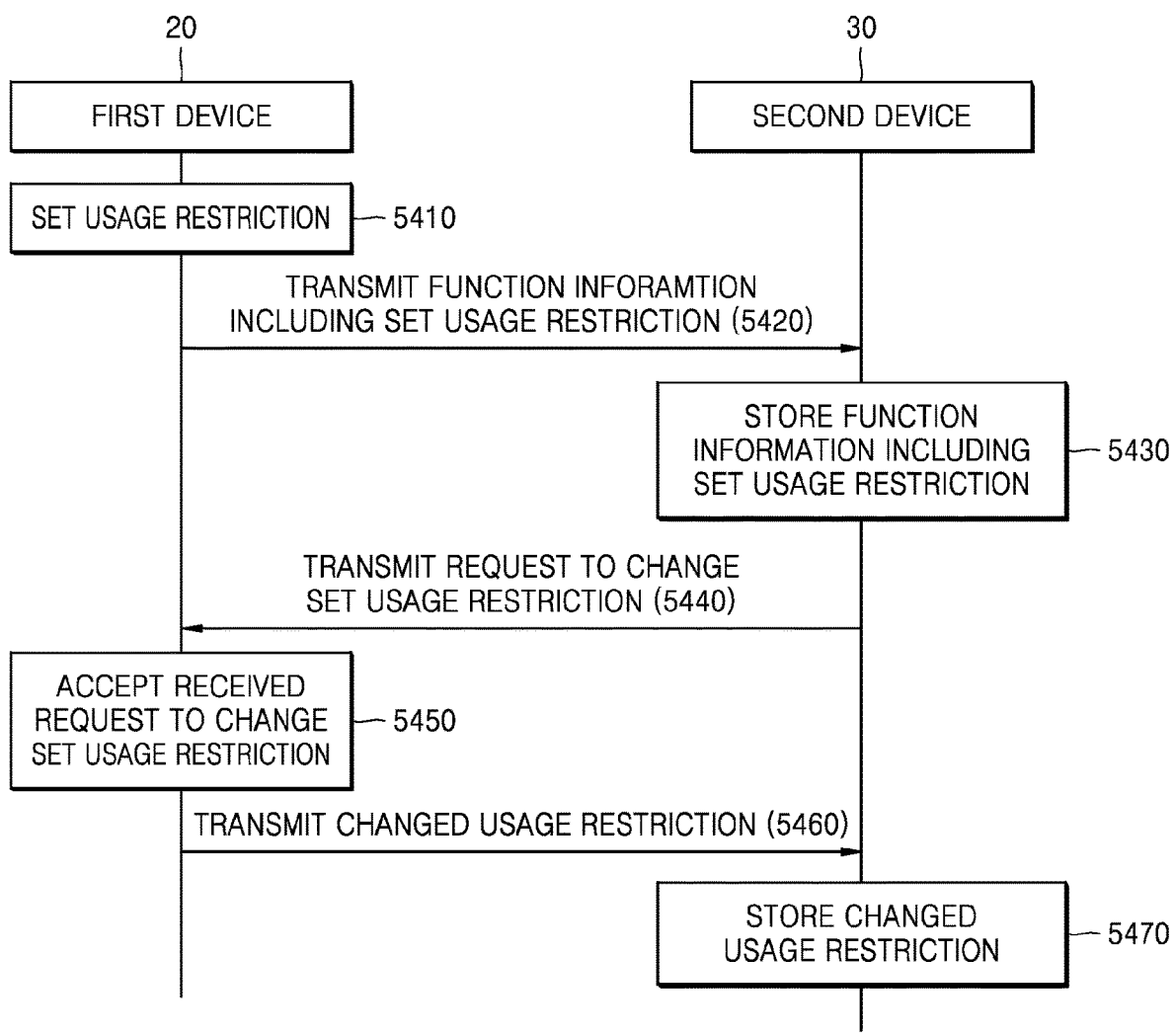
FIG. 54 is a flowchart of an example in which a second device requests a first device to change a preset usage restriction, according to an exemplary embodiment.

FIG. 54 is a flowchart of an example in which a second device 30 requests a first device 20 to change a preset usage restriction, according to an exemplary embodiment.

The example of FIG. 54 includes operations serially performed by the first device 20 and the second device 30 of FIG. 1. Thus, the above descriptions of the operations of the first device 20 and the second device 30 of FIG. 1 may also apply to the example illustrated in FIG. 54.

Operations 5410-5430 of FIG. 54 correspond to operations 740-770 of FIG. 7, respectively. Hence, redundant descriptions of operations 5410-5430 are omitted below. Hereinbelow, it is presumed that operations 710-730 of FIG. 7 have already been performed in the exemplary embodiment of FIG. 54.

In operation 5440, the second device 30 requests the first device 20 to change the usage restriction.

If the first device 20 accepts the change request received from the second device 30 in operation 5450, the first device 20 transmits the changed usage restriction to the second device 30, in operation 5460.

In operation 5470, the second device 30 stores the changed usage restriction.

The example of FIG. 54 will now be described in more detail with reference to FIG. 55.

Figure 55:
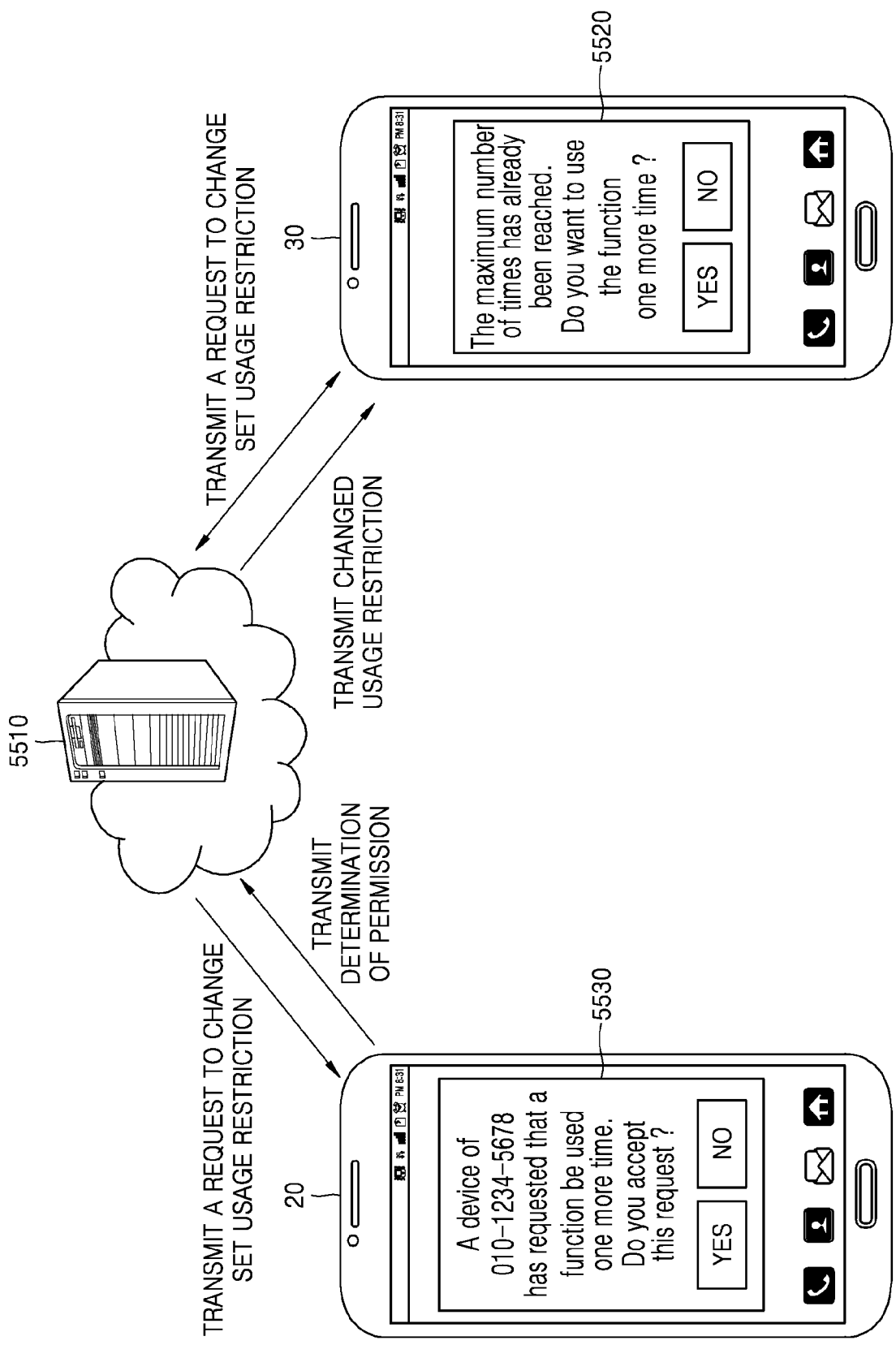
FIG. 55 is a vow for explaining an example in which a second device requests a first device to change a preset usage restriction, according to an exemplary embodiment.

FIG. 55 is a view for explaining an example in which a second device 30 requests a first device 20 to change a preset usage restriction, according to an exemplary embodiment.

Referring to FIG. 55, it is assumed that the second device 30 has used a function capable of controlling an operation of the to-be-controlled device 40 a number of times defined in a number-of-times restriction condition. In this case, the second device 30 may display on a screen thereof a pop-up window 5520 asking whether to request an additional use of a function capable of controlling an operation of the to-be-controlled device 40. When the second user 60 wants to use the function one more time, the second user 60 may request the first device 20 to change the preset usage restriction by clicking 'YES' on the pop-up window 5520. The second device 30 may transmit a request to change the usage restriction to a server 5510, and the server 5510 may transmit the received change request to the first device 20.

The first device 20 may output to the screen thereof a pop-up window 5530 indicating that a request of the second device 30 to use the function one more time has been received and asking whether to allow this request. When the first user 50 clicks 'YES' on the pop-up window 5530, the first device 20 may transmit a signal granting permission to the second device 30. The signal that is transmitted by the first device 20 may include a changed usage restriction. Alternatively, the first device 20 may transmit a determination of permission to a server 5510, and the server 5510 may transmit the received determination of permission to the second device 30.

Referring to FIGS. 1-55, the first device 20 transmits function information to the single second device 30. However, the number of devices that receive function information from the first device 20 is not limited to one in one or more other exemplary embodiments.

Figure 56:
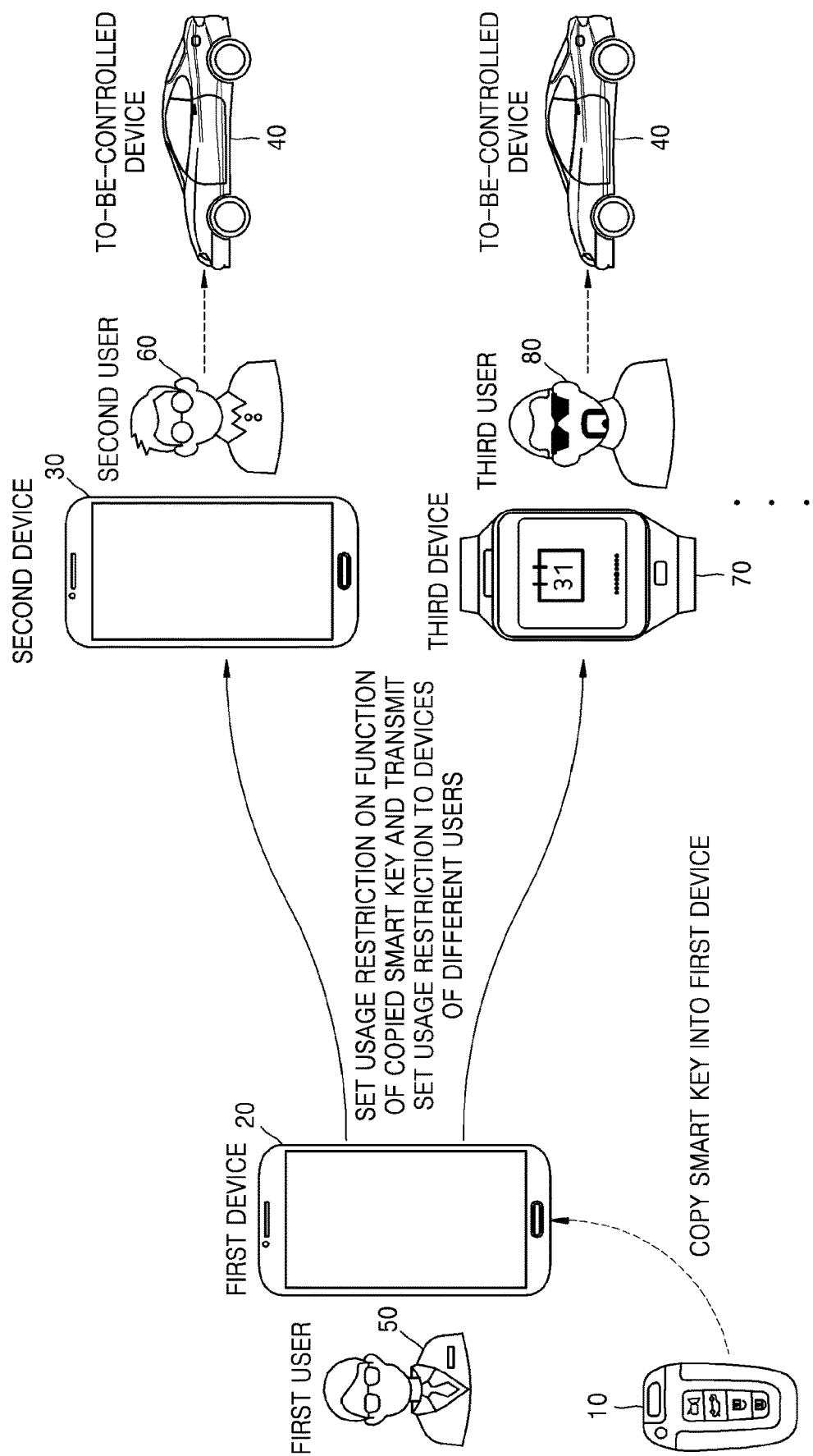
FIGS. 56-58 are views for explaining an example in which a first device transmits function information to a plurality of devices, according to an exemplary embodiment.
Figure 57:
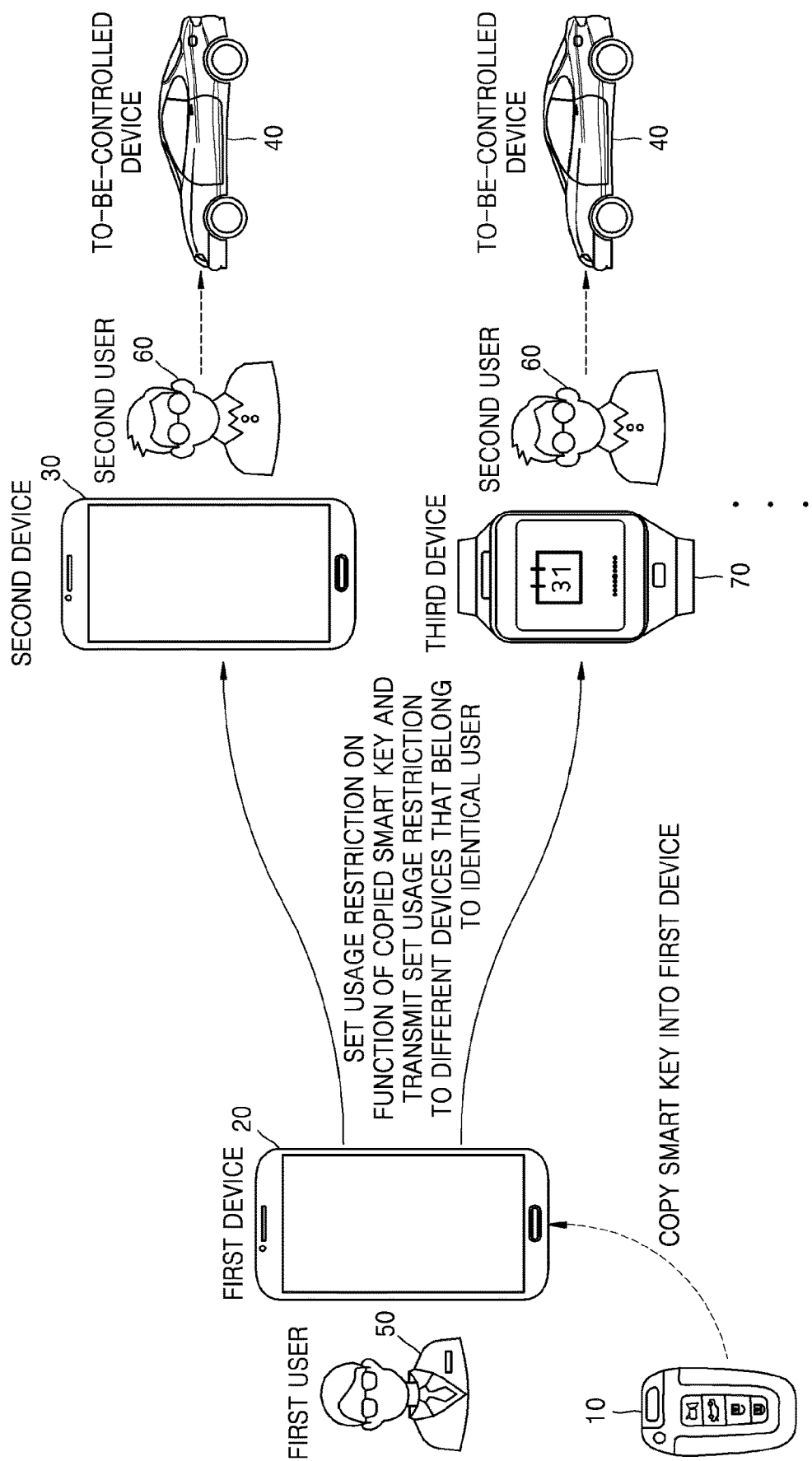
Figure 58:
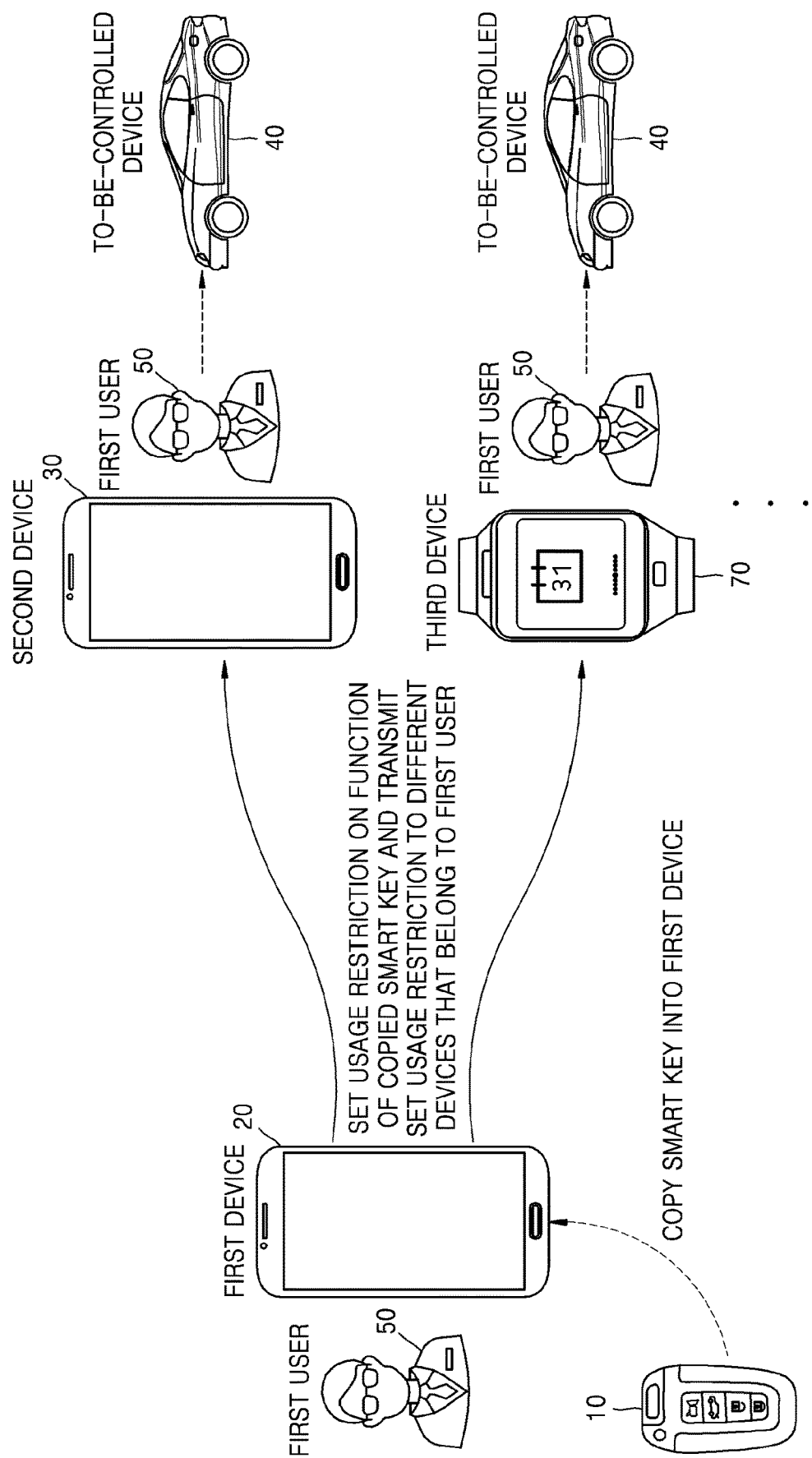

FIGS. 56-58 are views for explaining an example in which a first device 20 transmits function information to a plurality of devices 30 and 70, according to one or more exemplary embodiments.

Referring to FIG. 56, the first device 20 may transmit function information to devices 30 and 70 respectively belonging to different users 60 and 80. In other words, devices that receive function information from the first device 20 may be owned by different users. Accordingly, the second user 60 and the third user 80 may control an operation of the to-be-controlled device 40 by using their own devices.

Referring to FIG. 57, the first device 20 may transmit function information to a plurality of devices, namely, a second device 30 and a third device 70 belonging to an identical user 60. Accordingly, the second user 60 may control an operation of the to-be-controlled device 40 by using the second device 30 or the third device 70.

Referring to FIG. 58, the first device 20 may transmit function information to different devices, namely, the second device 30 and the third device 70, belonging to the first user 50. In other words, the user of the first device 20 may be identical to the user of the first and second devices 30 and 70 that receive the function information from the first device 20. Accordingly, the first user 50 may control an operation of the to-be-controlled device 40 by using the first device 20, the second device 30, or the third device 70.

Figure 59:
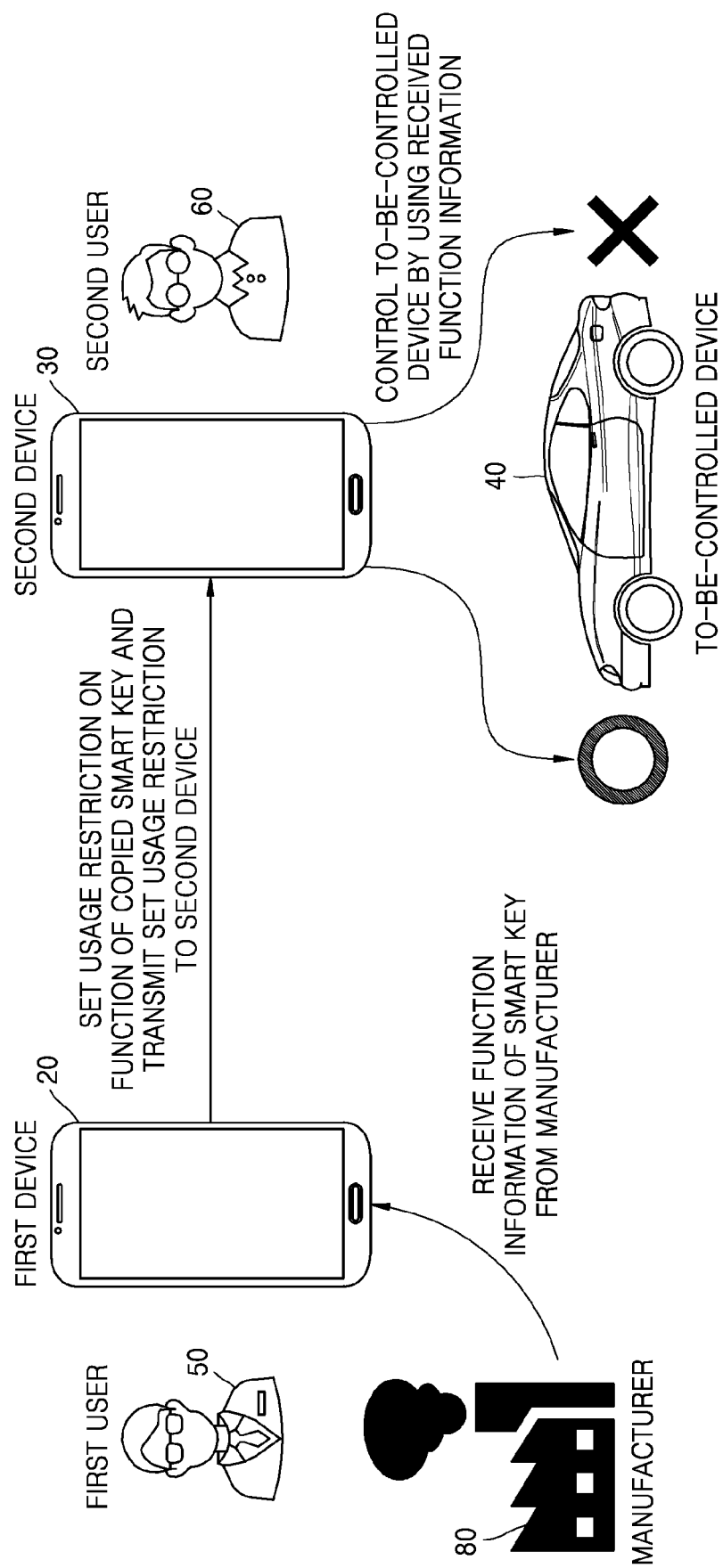
FIG. 59 is a view for explaining an example in which a first device receives function information from a manufacturer of a to-be-controlled device, according to an exemplary embodiment.

FIG. 59 is a view for explaining an example in which a first device 20 receives function information from a manufacturer of a to-be-controlled device 40, according to an exemplary embodiment.

Referring to FIG. 59, the first device 20 may receive the function information of the smart key 10 from a manufacturer 80. The manufacturer 80 may denote a manufacture of the to-be-controlled device 40 or a manufacturer of the smart key 10 that controls the to-be-controlled device 40. For example, when it is assumed that the to-be-controlled device 40 is a vehicle, the manufacturer 80 may be a vehicle manufacturing company or a company that manufactures a smart key at the request of the vehicle manufacturing company.

When the first user 50 purchases the to-be-controlled device 40 from the manufacturer 80, the first user 50 may receive function information of the smart key 10 from the manufacturer 80 and store the received function information in the first device 20. For example, after accessing a server operated by the manufacturer 80 and undergoing user authentication, the first user 50 may download the function information of the smart key 10 from the manufacturer 80 and store the downloaded function information in the first device 20. As another example, the first user 50 may receive a storage medium having the function information of the smart key 10 stored therein from the manufacturer 80 and store the function information in the first device 20 by using the storage medium.

Hence, the first user 50 may store the function information of the smart key 10 in the first device 20 without using the smart key 10. Then, the function information of the smart key 10 is transmitted from the first device 20 to the second device 30. This process is the same as or similar to that described above with reference to FIGS. 1-58.

Figure 60:
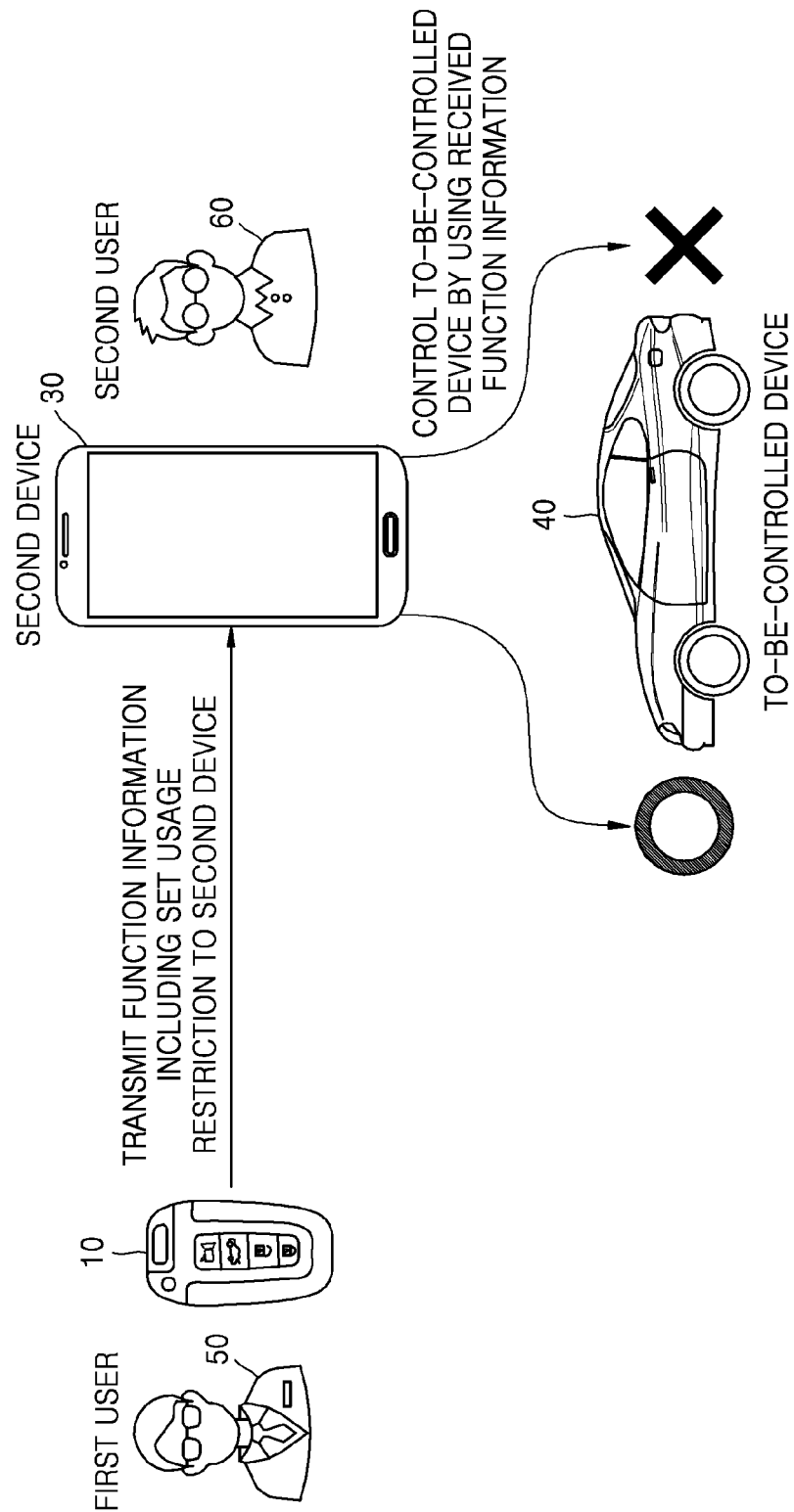
FIG. 60 is a view for explaining an example in which a second device receives function information from a smart key, according to an exemplary embodiment.

FIG. 60 is a view for explaining an example in which a second device 30 receives function information from a smart key 10, according to an exemplary embodiment.

Referring to FIG. 60, function information of the smart key 10 may be provided to the second device 30 without intervention of the first device 20. The function information that is transmitted to the second device 30 may include a set usage restriction. For example, a usage restriction may be set according to a button of the smart key 10 depressed by the first user 50 (for example, a door opening-or-closing button) and a number of times that a button has been depressed, or may be previously stored in the smart key 10.

By way of example, the first user 50 performs an NFC connection between the smart key 10 and the second device 30 by pressing a predetermined button from among buttons included in the smart key 10, and thus the second device 30 may enter a state in which the device 30 is capable of receiving function information from the smart key 10. As described above with reference to FIG. 1, an application capable of receiving the function information may have been already installed in the second device 30. Hence, after the application is executed, the first user 50 performs the NFC connection between the smart key 10 and the second device 30, and thus the second device 30 may enter a state in which the device 30 is capable of receiving function information from the smart key 10.

Thereafter, the first user 50 depresses a door opening-or-closing button from among the buttons included in the smart key 10, and thus function information about a function of opening or closing the door may be transmitted to the second device 30. According to the number of times the first user 50 has depressed the door opening-or-closing button, a restriction on a time period during which the second device 30 is allowed to open or close the door of the vehicle, or a restriction on a number of times the second device 30 is allowed to open or close the door of the vehicle may be set in the transmitted function information. For example, every time the first user 50 depresses the door opening-or-closing button, a time period during which the second device 30 is allowed to open or close the door of the vehicle may increase by 10 minutes. As another example, every time the first user 50 depresses the door opening-or-closing button, a number of times the second device 30 is allowed to open or close the door of the vehicle may increase by 1.

When the second device 30 has received function information from the smart key 10, function types and usage restrictions included in the received function information may be output to the screen of the second device 30. Hence, the first user 50 and the second user 60 may check the functions and the usage restrictions transmitted to the second device 30.

In the above-described example, the function of opening or closing the door is only an example of a function that can be performed by the smart key 10. Hence, when the first user 50 depresses another button included in the smart key 10, information about a function corresponding to the depressed button may be provided to the second device 30.

The above-described methods can be written as computer programs and can be implemented in general-use digital computers that execute the programs using a computer readable recording medium. A structure of the data used in the above-described methods may be recorded in a computer readable recording medium via several means. Examples of the computer readable recording medium include magnetic storage media (e.g., ROM, RAM, USB, floppy disks, hard disks, etc.), optical recording media (e.g., CD-ROMs, or DVDs), etc.

Figure 61:
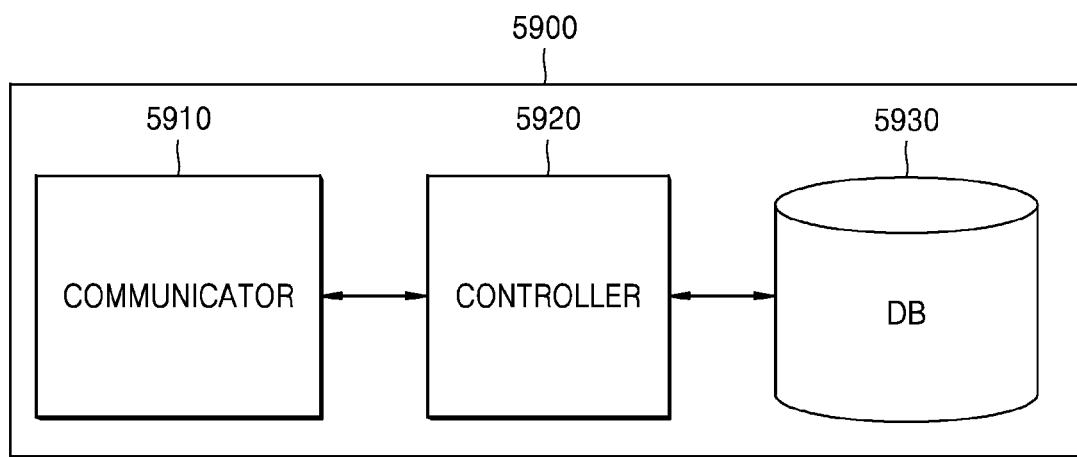
FIG. 61 is a block diagram of a server according to an exemplary embodiment.

FIG. 61 is a block diagram of a server 5900 according to an exemplary embodiment.

The server 5900 of FIG. 61 may correspond to any of the servers described above with reference to FIGS. 1-60.

Referring to FIG. 61, the server 5900 may include a communicator 5910, a controller 5920, and a DB 5930.

The communicator 5910 transmits or receives an ID value and function information of the smart key 10 to or from the smart key 10 and devices. The function information includes a usage restriction. When the second device 30 uses a function capable of controlling an operation of the to-be-controlled device 40 (i.e., controls the to-be-controlled device 40), the communicator 5910 may determine whether the use conforms to the usage restriction.

The DB 5930 stores the ID value of the smart key 10 and the function information of the smart key 10. The function information includes a usage restriction. The DB 5930 also stores user information (for example, fingerprint information or an ID/password) of a second user. Information stored in the DB 5930 is not limited to the above-described information, and the DB 5930 may store all pieces of information that are necessary or used when the smart key 10, the first device 20, and the second device 30 transmit or receive the ID value and the function information of the smart key 10.

The controller 5920 controls all operations of the server 5900. The controller 5920 controls the communicator 5910 and the DB 5930.

Figure 62:
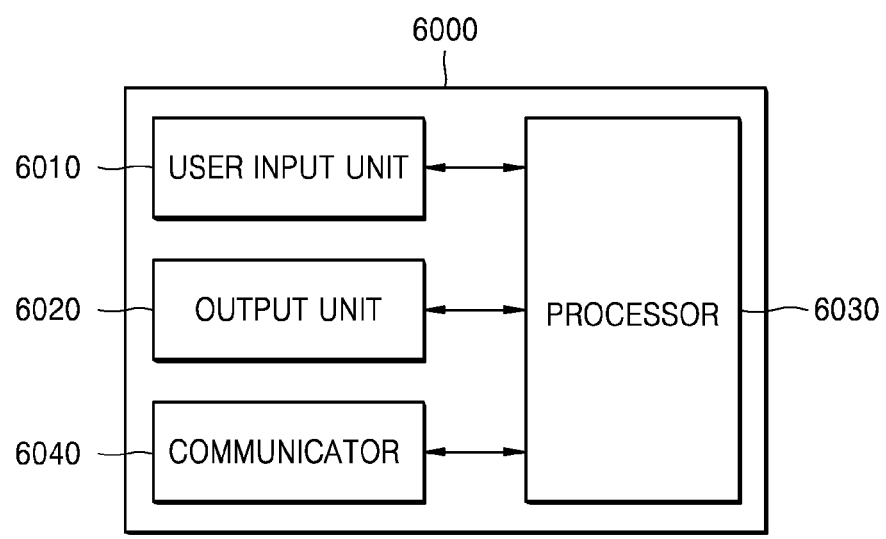
FIGS. 62 and 63 are block diagrams of a device according to an exemplary embodiment.
Figure 63:
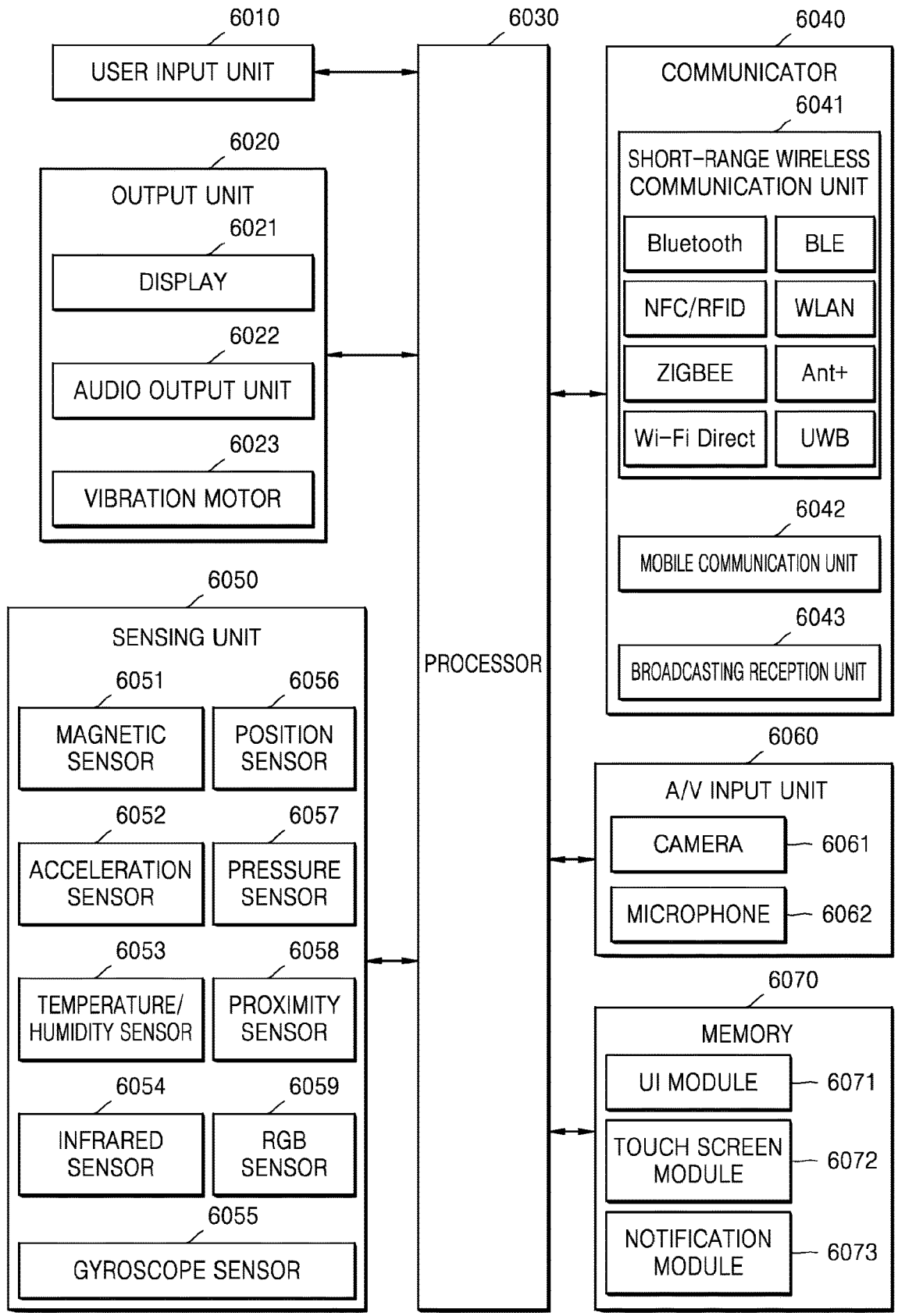

FIGS. 62 and 63 are block diagrams of a device 6000 according to an exemplary embodiment.

The device 6000 of FIGS. 62 and 63 may correspond to any of the devices described above with reference to FIGS. 1-60.

Referring to FIG. 62, the device 6000 may include a user input unit 6010 (e.g., user input device or user inputter), an output unit 6020 (e.g., output device or outputter), a processor 6030, and a communicator 6040. It is understood that more or fewer components than the components illustrated in FIG. 62 may be included the first device 6000 according to one or more other exemplary embodiments.

For example, referring to FIG. 62, the first device 6000 may further include a sensing unit 6050 (e.g., sensor), an audio/video (A/V) input unit 6060 (A/V input device or A/V inputter), and a memory 6070, in addition to the user input unit 6010, the output unit 6020, the processor 6030, and the communicator 6040.

The user input unit 6010 denotes a unit via which a user inputs data for controlling the device 6000. For example, the user input unit 6010 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

For example, the user input unit 6010 may receive a user input for setting a usage restriction. The user input unit 6010 may also receive a user input for determining whether to accept a request to change a usage restriction.

The user input unit 6010 may also receive user information (for example, fingerprint information or an ID/password) for user authentication. The user input unit 6010 may also receive a user input of selecting one from among the functions capable of controlling operations of the to-be-controlled device 40.

The output unit 6020 may output an audio signal, a video signal, and/or a vibration signal, and may include a display 6021, an audio output unit 6022 (e.g., audio output device and/or audio outputter), and a vibration motor 6023.

The display 6021 displays information that is processed by the device 6000. For example, the display 6021 may display a user interface for selecting a virtual image, a user interface for setting an operation of the virtual image, and a user interface for purchasing an item of the virtual image.

When the display 6021 forms a layer structure together with a touch pad to construct a touch screen, the display 6021 may be used as an input device as well as an output device. The display 6021 may include at least one of a liquid crystal display (LCD), a thin film transistor-liquid crystal display (TFT-LCD), an organic light-emitting diode (OLED), an active-matrix OLED (AMOLED), a flexible display, a three-dimensional (3D) display, and an electrophoretic display. According to one or more other exemplary embodiments of the device 6000, the device 6000 may include at least two displays 6021. The at least two displays 6021 may be disposed to face each other by using a hinge.

The audio output unit 6022 may output audio data that is received from the communicator 6040 or stored in the memory 6070. The audio output unit 6022 may also output an audio signal (for example, a call signal receiving sound, a message receiving sound, a notification sound) related with a function of the device 6000. The audio output unit 6022 may include at least one of a speaker, a buzzer, and the like.

The vibration motor 6023 may output a vibration signal. For example, the vibration motor 6023 may output a vibration signal corresponding to an output of audio data or video data (for example, a call signal receiving sound or a message receiving sound). The vibration motor 6023 may also output a vibration signal when the touch screen is touched.

The processor 6030 typically controls all or various operations of the device 6000. For example, the processor 6030 may control the user input unit 6010, the output unit 120, the sensing unit 6050, the communicator 6040, the A/V input unit 6060, and the like by executing programs stored in the memory 6070.

For example, the processor 6030 may set a usage restriction for a function capable of controlling an operation of the to-be-controlled device 40. The usage restriction includes at least one selected from a first condition that restricts a time period during which the second device 30 is allowed to use a function capable of controlling an operation of the to-be-controlled device 40, a second condition that restricts a location of the second device 30 at which the second device 30 is allowed to use a function capable of controlling an operation of the to-be-controlled device 40, a third condition that restricts users who are to use a function capable of controlling an operation of the to-be-controlled device 40, a fourth condition that restricts types of functions allowed to be used by the second device 30 from among the functions capable of controlling operations of the to-be-controlled device 40, and a fifth condition that restricts a number of times the second device 30 is allowed to use a function capable of controlling an operation of the to-be-controlled device 40.

The first condition may specify a certain period of time starting from a time point at which function information has been transmitted to the second device 30, or a preset certain time interval.

The second condition may specify an area within a preset radius around the location of the first device 20 or an area within a preset radius around a location of the second device 30 at the moment when function information has been transmitted to the second device 30.

The processor 6030 may set a usage restriction for each of the functions capable of controlling operations of the to-be-controlled device 40, according to a user input received via the user input unit 6010, and add the usage restrictions to the function information.

The processor 6030 may determine whether a request to change the set usage restrictions according to a user input received via the user input unit 6010 is to be accepted. The change request denotes that the second device 30 requests the first device 20 to change the set usage restrictions.

The processor 6030 may identify a usage restriction included in the function information and may generate a signal for controlling the to-be-controlled device 40.

The sensing unit 6050 may sense the status of the device 6000 or the status of a surrounding of the device 6000 and may transmit information corresponding to the sensed status to the processor 6030.

The sensing unit 6050 may include, but is not limited to, at least one selected from a magnetic sensor 6051, an acceleration sensor 6052, a temperature/humidity sensor 6053, an infrared sensor 6054, a gyroscope sensor 6055, a position sensor (e.g., a GPS) 6056, a pressure sensor 6057, a proximity sensor 6058, and an RGB sensor 6059 (i.e., an illuminance sensor). Functions of most of the sensors would be instinctively understood by one of ordinary skill in the art in view of their names and thus detailed descriptions thereof will be omitted herein.

The communicator 6040 may include at least one component that enables the device 6000 to perform data communication with and another device or the server 5900. For example, the communication unit 6040 may include a short-range wireless communication unit 6041 (e.g., short-range wireless communicator), a mobile communication unit 6042 (e.g., mobile communicator), and a broadcasting reception unit 6043 (e.g., broadcasting receiver).

The short-range wireless communication unit 6041 may include, but is not limited to, a Bluetooth communicator, a Bluetooth Low Energy (BLE) communicator, a near field communication (NFC) unit, a wireless local area network (WLAN) (e.g., Wi-Fi) communicator, a ZigBee communicator, an infrared Data Association (IrDA) communicator, a Wi-Fi direct (WFD) communicator, an ultra wideband (UWB) communicator, an Ant+ communicator, and the like.

The mobile communication unit 6042 may exchange a wireless signal with at least one selected from a base station, an external terminal, and a server on a mobile communication network. The wireless signals may be voice call signals, video call signals, or various types of data for transmission and reception of text/multimedia messages.

The broadcasting reception unit 6043 receives a broadcasting signal and/or broadcasting-related information from an external source via a broadcasting channel. The broadcasting channel may be a satellite channel, a ground wave channel, or the like. According to one or more other exemplary embodiments, the device 6000 may not include the broadcasting reception unit 6043.

The A/V input unit 6060 inputs an audio signal or a video signal, and may include a camera 6061 and a microphone 6062. The camera 6061 may acquire an image frame, such as a still image or a moving picture, via an image sensor in a video call mode or a photography mode. An image captured via the image sensor may be processed by the processor 6030 or a separate image processor.

The image frame obtained by the camera 6061 may be stored in the memory 6070 or transmitted to the outside via the communicator 6040. At least two cameras 6061 may be included according to one or more other exemplary embodiments of the structure of a terminal.

The microphone 6062 receives an external audio signal and converts the external audio signal into electrical audio data. For example, the microphone 6062 may receive an audio signal from an external device or a speaking person. The microphone 6062 may use various noise removal algorithms in order to remove noise that is generated while receiving the external audio signal.

The memory 6070 may store a program used by the processor 6030 to perform processing and control, and may also store data that is input to or output from the device 6000.

The memory 6070 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The programs stored in the memory 6070 may be classified into a plurality of modules according to their functions, for example, a user interface (UI) module 6071, a touch screen module 6072, and a notification module 6073.

The UI module 6071 may provide a UI, GUI, or the like that is specialized for each application and interoperates with the device 6000. The touch screen module 6072 may detect a touch gesture on a touch screen of a user and transmit information regarding the touch gesture to the processor 6030. The touch screen module 6072 according to an exemplary embodiment may recognize and analyze a touch code. The touch screen module 6072 may be configured by separate hardware including a controller.

In order to detect the actual touch or the proximate touch on the touch pad, the touch screen may internally or externally have various sensors. An example of a sensor used to detect the real touch or the proximity touch on the touch screen is a tactile sensor. The tactile sensor denotes a sensor that detects a touch by a specific object to a degree to which a human feels or more. The tactile sensor may detect various types of information, such as the roughness of a touched surface, the hardness of the touching object, the temperature of a touched point, and the like.

Another example of a sensor used to detect the real touch or the proximity touch on the touch screen is a proximity sensor.

The proximity sensor is a sensor that detects the existence of an object that approaches a predetermined detection surface or that exists nearby, by using an electromagnetic force or infrared rays without any mechanical contact. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. Examples of the touch gesture of the user may include tap, touch & hold, double tap, drag, panning, flick, drag & drop, swipe, and the like.

The notification module 6073 may generate a signal for notifying that an event has been generated in the device 6000. Examples of the event generated in the device 6000 may include call signal receiving, message receiving, a key signal input, schedule notification, and the like. The notification module 6073 may output a notification signal in the form of a video signal via the display 6021, in the form of an audio signal via the audio output unit 6022, or in the form of a vibration signal via the vibration motor 6023.

As described above, according to one or more exemplary embodiments, a smart key may be simply shared via a device even when the smart key is not physically shared. In particular, by sharing a smart key for which certain usage restrictions have been set, the smart key may be utilized according to various circumstances and for various purposes.

Exemplary embodiments should be considered in descriptive sense only and not for purposes of limitation. Descriptions of features or aspects within each exemplary embodiment should typically be considered as available for other similar features or aspects in other exemplary embodiments.

While exemplary embodiments have been particularly shown and described above, it will be understood by those of ordinary skill in the art that various changes in form and details may be made therein without departing from the spirit and scope of the present invention as defined by the following claims.

What is claimed is:

1. An electronic device for providing information about a smart key, the electronic device comprising:
a first communication interface;
a second communication interface;
a user input interface;
a memory; and
a processor configured to:
control the first communication interface to transmit a request to the smart key to transmit smart key information;
based on the request to transmit the smart key information, control the first communication interface to receive, from the smart key, the smart key information including identification information of the smart key and function information of the smart key for controlling a vehicle;
control the memory to store the received first smart key information including the identification information of the smart key and the function information of the smart key;
control the user input interface to receive a user input for setting a usage restriction condition of the smart key;
based on the user input received via the user input interface, set the usage restriction condition on the function information of the smart key; and
control the second communication interface to transmit, toward an external electronic device, the smart key information including the identification information of the smart key and the function information of the smart key, and the set usage restriction condition on the function information of the smart key.

2. The electronic device of claim 1, wherein the smart key comprises an external key for controlling the vehicle.

3. The electronic device of claim 1, wherein the function information of the smart key comprises at least one of opening a door of the vehicle, starting the vehicle, turning on a headlight of the vehicle, or opening a trunk of the vehicle.

4. The electronic device of claim 1, wherein the usage restriction condition comprises at least one of:
a first condition that specifies a time period during which the external electronic device is allowed to use the function information;
a second condition that specifies a distance between the smart key and the external electronic device within which the external electronic device is allowed to use the function information;
a third condition that specifies one or more users who are allowed to use the function information;
a fourth condition that specifies a type of function information that the external electronic device is allowed to use; or
a fifth condition that specifies a number of times that the external electronic device is allowed to use the function information.

5. The electronic device of claim 1, wherein
the processor is further configured to control the second communication interface to receive, from the external electronic device, a request to change the usage restriction condition.

6. The electronic device of claim 1, wherein the processor is further configured to control the second communication interface to transmit, to a server, the smart key information including the identification information of the smart key and the function information of the smart key for controlling the vehicle.

7. A method of providing information about a smart key by an electronic device, the method comprising:
transmitting a request to the smart key to transmit smart key information;

based on the request to transmit the smart key information, receiving, from the smart key, the smart key information including identification information of the smart key and function information of the smart key for controlling a vehicle;

storing the received first smart key information including the identification information of the smart key and the function information of the smart key;

receiving a user input for setting a usage restriction condition of the smart key;

based on the received user input, setting the usage restriction condition on the function information of the smart key; and transmitting, toward an external electronic device, the smart key information including the identification information of the smart key and the function information of the smart key, and the set usage restriction condition on the function information of the smart key.

8. The method of claim 7, wherein the smart key comprises an external key for controlling the vehicle.

9. The method of claim 7, wherein the function information of the smart key comprises at least one of opening a door of the vehicle, starting the vehicle, turning on a headlight of the vehicle, or opening a trunk of the vehicle.

10. The method of claim 7, wherein the usage restriction condition comprises at least one of:
 a first condition that specifies a time period during which the external electronic device is allowed to use the function information;
 a second condition that specifies a distance between the smart key and the external electronic device within which the external electronic device is allowed to use the function information;
 a third condition that specifies one or more users who are allowed to use the function information;
 a fourth condition that specifies a type of function information that the external electronic device is allowed to use; or
 a fifth condition that specifies a number of times that the external electronic device is allowed to use the function information.

11. The method of claim 7, further comprising receiving, from the external electronic device, a request to change the usage restriction condition.

12. The method of claim 7, further comprising transmitting, to a server, the smart key information including the identification information of the smart key and the function information of the smart key for controlling the vehicle.

13. A non-transitory computer-readable recording medium having recorded thereon a computer program, which, when executed by a computer, performs the method of claim 7.

14. A non-transitory computer-readable recording medium having recorded thereon a computer program, which, when executed by a computer, performs the method of claim 8.

15. A non-transitory computer-readable recording medium having recorded thereon a computer program, which, when executed by a computer, performs the method of claim 9.

16. A non-transitory computer-readable recording medium having recorded thereon a computer program, which, when executed by a computer, performs the method of claim 10.

17. A non-transitory computer-readable recording medium having recorded thereon a computer program, which, when executed by a computer, performs the method of claim 11.

18. A non-transitory computer-readable recording medium having recorded thereon a computer program, which, when executed by a computer, performs the method of claim 12.

* * * * *